(12) United States Patent
Sato et al.

(10) Patent No.: US 6,497,928 B1
(45) Date of Patent: Dec. 24, 2002

(54) LIQUID CRYSTAL DEVICE, MESOMORPHIC FUNCTIONAL MATERIAL AND LIQUID CRYSTAL APPARATUS

(75) Inventors: Koichi Sato, Atsugi (JP); Shinichi Nakamura, Isehara (JP); Koji Noguchi, Sagamihara (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/571,412

(22) Filed: May 15, 2000

(30) Foreign Application Priority Data

| | | |
|---|---|---|
| May 14, 1999 | (JP) | 11-133654 |
| Aug. 27, 1999 | (JP) | 11-240729 |
| Aug. 27, 1999 | (JP) | 11-241301 |
| Dec. 7, 1999 | (JP) | 11-348051 |
| Apr. 14, 2000 | (JP) | 11-112931 |

(51) Int. Cl.[7] ............. C09K 19/38; C09K 19/32; G02F 1/1335; G02F 1/1337
(52) U.S. Cl. ............. 428/1.1; 252/299.62; 349/88; 349/94; 349/113; 349/139; 428/1.3
(58) Field of Search ............. 252/299.01, 299.62; 428/1.1, 1.3; 349/88, 94, 113, 139, 5

(56) References Cited

U.S. PATENT DOCUMENTS

| | | | |
|---|---|---|---|
| 5,038,166 A | 8/1991 | Isaka et al. | 346/76 |
| 5,059,000 A | 10/1991 | Kaneko et al. | 350/351 |
| 5,066,107 A | 11/1991 | Yoshinaga et al. | 359/45 |
| 5,103,332 A | 4/1992 | Kaneko et al. | 359/98 |
| 5,140,447 A | 8/1992 | Kaneko et al. | 359/43 |
| 5,141,785 A | 8/1992 | Yoshinada et al. | 428/1 |
| 5,164,741 A | 11/1992 | Kaneko et al. | 346/1.1 |
| 5,285,298 A | 2/1994 | Kaneko et al. | 359/43 |
| 5,339,306 A | 8/1994 | Yoshinaga et al. | 369/275.1 |
| 5,688,437 A | 11/1997 | Sato et al. | 252/299.61 |
| 5,730,900 A * | 3/1998 | Kawata | 252/299.01 |
| 5,812,227 A | 9/1998 | Toshida et al. | 349/88 |
| 5,965,591 A | 10/1999 | Kojima et al. | 514/379 |
| 6,061,113 A * | 5/2000 | Kawata | 349/117 |

FOREIGN PATENT DOCUMENTS

| | | |
|---|---|---|
| JP | 2-576 | 1/1990 |
| JP | 8-27824 | 1/1996 |
| JP | 9-21444 | 1/1997 |
| JP | 9-243984 | 9/1997 |

OTHER PUBLICATIONS

Nolan, P., et al., "Reflective mode PDLC displays—Paper white display." '93 *Eurodisplay*, pp. 397–400.*
Ekisho (1997) vol. 1, No. 1, pp. 45–56.*
Applied Physics Letters, vol. 18, No. 4 (Feb. 1971), pp. 127–128.
Macromol Rapid Commun., vol. 18 (1997), pp. 93–98.

* cited by examiner

*Primary Examiner*—Shean C. Wu
(74) *Attorney, Agent, or Firm*—Fitzpatrick, Cella, Harper & Scinto

(57) ABSTRACT

A liquid crystal device has a liquid crystal layer of a liquid crystal composition comprising a discotic mesomorphic compound and a rod-shaped mesomorphic compound. The discotic mesomorphic compound and the rod-shaped mesomorphic compound are essentially mutually different in molecular structure and refractive index anisotropy and are co-present in the liquid crystal layer in a mutual phase separation state, thus improving a light-scattering performance of the liquid crystal device.

68 Claims, 5 Drawing Sheets

LIQUID CRYSTAL DEVICE, MESOMORPHIC FUNCTIONAL MATERIAL AND LIQUID CRYSTAL APPARATUS

FIELD OF THE INVENTION AND RELATED ART

The present invention relates to a liquid crystal device for use in light-valves for flat panel displays, paper displays, projection displays, printers, etc. The present invention also relates to a mesomorphic functional material suitable for constituting the liquid crystal device and a liquid crystal apparatus including the liquid crystal device.

The most popular and extensively used display may be CRTs (cathode ray tubes) which have been heretofore used for displaying motion pictures of television and video tape recorders or as monitor displays for personal computers. Based on the operation characteristic, however, the CRT is accompanied with difficulties such that the recognizability of a static image is lowered due to flickering and scanning fringes caused by an insufficient resolution, and the fluorescent member is deteriorated due to burning or sticking. Further, the CRT has generally consumed a larger electric power, thus beoing required to reduced its power consumption. Further, the CRT structurally has a large rearward space behind the display surface to restrict facilitates for information equipment having the CRT, so that the space economization in offices at home may be obstructed thereby.

As a type of device solving such problems of the CRT, there has been known a liquid crystal device, including a type using a twisted nematic (TN) liquid crystal as disclosed by M. Schadt and W. Helfrich, "Applied Physics Letters", Vol. 18, No. 4 (Feb. 15, 1971), pp. 127–128.

By using a liquid crystal material of the TN-type, VA (vertical alignment)-mode, IPS (in plane switching)-mode, etc., an active (TFT)-type liquid crystal device has been developed and commercialized in recent years, wherein each pixel is provided with and driven with a TFT (thin film transistor). As a result, the problem of crosstalk has been solved. Further, along a rapid progress in production technology in recent years, TFT-type display panels using such a liquid crystal device of 1–13 inch-size have been produced with good productivity.

However, the above-mentioned liquid crystal devices are ordinarily used as a display panel in combination with a backlight (device) by optically modulating a transmitted light passing through the liquid crystal device. Accordingly the backlight for the liquid crystal device is required to emit a strong light. Further, a consumption power of liquid crystal display apparatus is largely occupied by the backlight. Even when a lithium ion-secondary battery is used for such a liquid crystal display apparatus a continuous (successive) operation time for, e.g., mobile computing is approximately several hours at the best. Thus, if backlight devices for various liquid crystal devices can be omitted, low power consumption for many information equipment and office equipment is realized, thus leading to suppression of global warming and a terrestrial enviroment proctection.

In the circumstances, a low power consumption-type reflection liquid crystal device without using a backlight has been developed but still leaves room for improvement in its characteristics at present. Further, various products using a projection-type liquid crystal device as a projector have been commercially available from electrical equipment manufacturers as a large picture-size display. In the field of such a liquid crystal projector, however, a further improvement brightness (luminance) and/or contrast is required.

In order to provide a high-brightness liquid crystal device without using a polarizer, light scattering-type liquid crystal devices, such as one of a polymer-dispersed type and one of a polymer network-type have been developed and proposed (e.g., "'93 Eurodisplay", p. 397–). However, these liquid crystal devices are still desired to improve driving characteristics, scattering performance and other characteristics.

Japanese Laid-Open Patent Application (JP-A) 09-243984 describes a light scattering-type liquid crystal device using a combination of dendrimer or a discotic mesomorphic compound with a rod-shaped mesomorphic compound. However, the discotic mesomorphic compound and the rod-shaped mesomorphic compound have mutually similar chemical structures, thus providing an insufficient phase separation state. As a result a light-scattering performance largely affected by the phase separation state is liable to become insufficient and a switching (optical response) ability of the rod-shaped mesomorphic compound is liable to be impaired.

SUMMARY OF THE INVENTION

In view of the above-mentioned problems, an object of the present invention is to provide a liquid crystal device of low power consumption, high brightness and high performance as an optical modulation device or a display device.

Another object of the present invention is to provide a mesomorphic functional material excellent in properties and suitable for a liquid crystal material of the liquid crystal device.

A further object of the present invention is to provide a liquid crystal apparatus including the liquid crystal device.

As a result of our study, we have found that it is possible to realize a liquid crystal device providing a high light-scattering state effectively utilizing a difference in refractive index characteristic between a discotic mesomorphic compound and a rod-shaped mesomorphic compound (as described later as to Table 1) by placing the mesomorphic compounds in such a state that the discotic mesomorphic compound and the rod-shaped mesomorphic compound essentially having mutually different molecular structures leading to different refractive index anisotropies are co-present in a phase separation state.

Herein, the term "phase separation state" means a state such that under observation through an optical, polarizing microscope, mutually phase separated extures of the liquid crystal layer is observable or confirmable. Specifically, this condition is fulfilled when a domain size of each phase is at least a light wavelength level, typically 1–2 $\mu$m or larger. In some cases, the phase separation state may also be confirmed by effecting thermal analysis using, e.g., a DSC (differential scanning calorimeter) with respect to respective mesomorphic phases to determie an individual phase transition behavior.

According to the present invention, there is provided a liquid crystal device, having a liquid crystal layer of a liquid crystal composition comprising a discotic mesomorphic compound and a rod-shaped mesomorphic compound, wherein the discotic mesomorphic compound and the rod-shaped mesomorphic compound are co-present in the liquid crystal layer in a mutual phase separation state.

In a preferred embodiment, in order to provide the above-mentioned phase separation state, a polymeric discotic mesomorphic compound having a recurring unit comprising a discotic mesomorphic molecular unit is used as the discotic mesomorphic compound.

In another preferred embodiment, in order to form a high light-scattering state, directors of the discotic mesomorphic compound and the rod-shaped mesomorphic compound in the liquid crystal layer are oriented in an identical direction in at least one alignment state.

In a further preferred embodiment, as the rod-shaped mesomorphic compound, a mesomorphic compound having a memory characteristic or nematic phase or a mesomorphic compound in a polymerized state (polymeric mesomorphic compound) is used.

According to another aspect, the present invention provides a liquid crystal composition or mixture as a liquid crystal material for forming the liquid crystal layer in the above-described preferred embodiments.

In this case, as a preferred liquid crystal material, a liquid crystal mixture comprising a polymerizable discotic mesomorphic compound and a rod-shaped mesomorphic compound is used.

According to still another aspect of the present invention, there is provided a liquid crystal apparatus comprising the above liquid crystal device and a drive means for driving the liquid crystal device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

(FIG. 1A) or a discotic mesomorphic compound (FIG. 1B).

DETAILED DESCRIPTION OF THE PREFERRED EMBODIMENTS

Hereinbelow, several preferred embodiments of the present invention will be described with reference to the drawings.

(First Embodiment)

According to a preferred embodiment of the present invention, there is provided a liquid crystal device of a polymer matrix-type (inclusive of a polymer-dispersed liquid crystal type and a polymer network-type) wherein a liquid crystal composition or mixture comprising as the discotic mesomorphic compound a polymeric discotic mesomorphic compound having a recurring unit comprising a discotic mesomorphic molecular unit is used for constituting a liquid crystal layer.

Such a polymer matrix-type liquid crystal device is characterized by exhibiting excellent light-scattering performance as apparent from a comparison between Examples and Comparative Examples appearing hereinafter.

Specifically, in place of a matrix polymer used in a conventional polymer matrix-type liquid crystal device, a polymer discotic mesomorphic compound is used for constituting the liquid crystal composition (mixture) in combination with a rod-shaped mesomorphic compound (or rod-shaped liquid crystal composition) in accordance with the present invention, whereby it is possible to remarkably improve the light-scattering performance. This may be attributable to a high utilizable refractive index anisotropy characteristic due to shape anisotropies of constituent components of the liquid crystal composition. More specifically, in the conventional polymer matrix-typed liquid crystal device, the matrix polymer used in combination with a uniaxially anisotropics rod-shaped mesomorphic compound is isotropic, thus essentially resulting in a light-scattering performance based on a difference in refractive index between the constituent components in only one direction. On the other hand, in the present invention, the polymeric discotic mesomorphic compound (used in place of the matrix polymer) per se generally has a negative refractive index anisotropy, thus being capable of providing larger difference in refractive index in every direction when used in combination with the rod-shaped mesomorphic compound (or rod-shaped liquid crystal composition). We assume that the large refractive index difference contributes to improvement in light-scattering performance.

Hereinbelow, such an improvement in light-scattering performance will be specifically described with reference to FIGS. 1A and 1B.

Figure 1A:
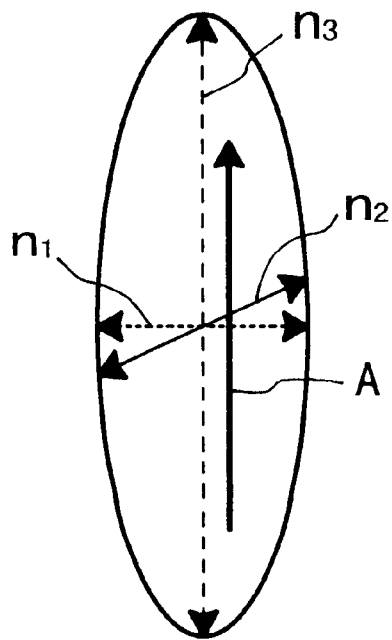
FIGS. 1A and 1B are schematic views each illustrating a refractive index ellipsoid and a preferred director arrangement with respect to a rod-shaped mesomorphic compound.
Figure 1B:
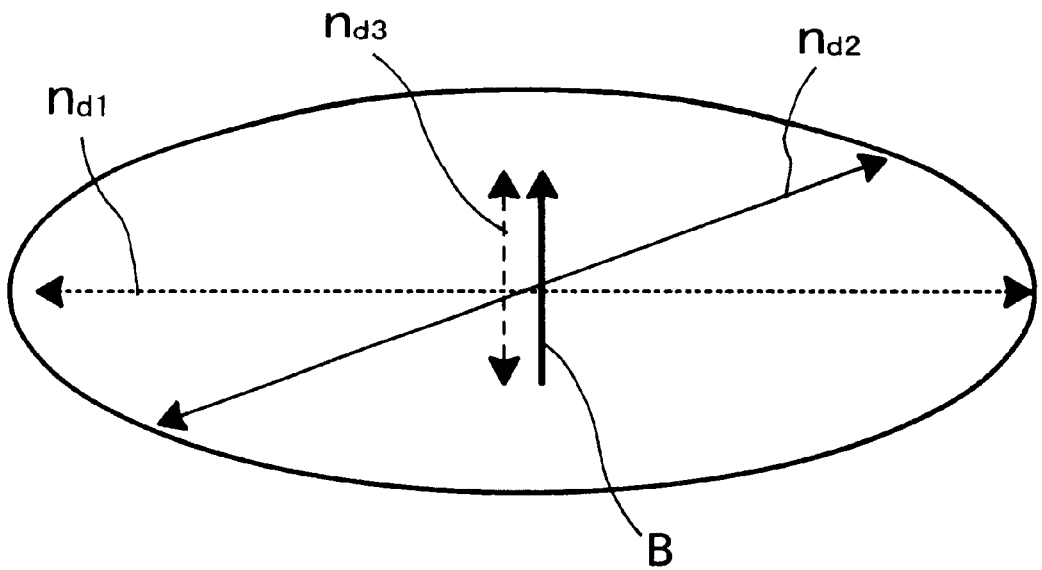

FIGS. 1A and 1B illustrate a refractive index ellipsoid of the rod-shaped mesomorphic compound and a refractive index ellipsoid of the discotic mesomorphic compound, respectively.

Referring to FIG. 1, the rod-shaped mesomorphic compound molecule has a director A and refractive indices $n1$, $n2$ and $n3$ in three directions. Referring to FIG. 1B, the discotic mesomorphic compound molecule has a director B and refractive indices $nd1$, $nd2$ and $nd3$ in three directions.

On the other hand, the matrix polymer (molecule) for use in the conventional polymer matrix-type liquid crystal device exhibits isotropy, i.e., has refractive indices in corresponding (three) directions identical to each other ($n1=n2=n3$).

Representative refractive indices of the above three compounds (rod-shaped mesomorphic compound, discotic mesomorphic compound and matrix polymer) in three typical directions (first to third directions) are shown in Table 1.

TABLE 1

| Compound | Refractive index in | | |
|---|---|---|---|
| | 1st direction | 2nd direction | 3rd direction |
| Rod-shaped mesomorphic compound | 1.5 (n1) | 1.5 (n2) | 1.7 (n3) |
| Discotic | 1.7 (nd1) | 1.7 (nd2) | 1.5 (nd3) |

TABLE 1-continued

| Compound | Refractive index in | | |
|---|---|---|---|
| | 1st direction | 2nd direction | 3rd direction |
| mesomorphic compound Matrix polymer | 1.5 (n1) | 1.5 (n2) | 1.5 (n3) |

Generally, the light-scattering performance largely depends on a degree of difference in refractive index between respective mediums for incident light.

As apparent from the results of Table 1, between the rod-shaped mesomorphic compound and the (conventional) matrix polymer, the difference in refractive index can be caused in only the third direction (i.e., 1.7(n3)–1.5(n3)=0.2). On the other hand, between the rod-shaped mesomorphic compound and the discotic mesomorphic compound used in the present invention, assuming that these mesomorphic compounds are ideally placed in such an alignment state providing the first to third directions for n1, n2 and n3 in coincidence with those for nd1, nd2 and nd3, respectively, the refractive index difference between these mesomorphic compounds can be caused in all the three directions. Even in the case where such an ideal alignment state is not formed, the refractive index difference is liable to be caused in plural directions based on probability of combinations of the refractive indices in respective directions (n1 and nd1, n2 and nd2, n3 and nd3). Accordingly, it is strongly suggested that the resultant light-scattering performance becomes high and such a high light-scattering performance has been confirmed experimentally.

According to a preferred embodiment, there is provided a mesomorphic mixture suitable as a starting material for a liquid crystal mixture constituting the above-mentioned polymer matrix-type liquid crystal device. The mesomorphic mixture comprises a polymerizable discotic mesomorphic compound and a rod-shaped mesomorphic compound. The polymerizable discotic mesomorphic compound refers to a compound having a discotic liquid crystal structural unit and a polymerizable group at any site. The polymerizable group may be not only a group having a double bond suitable for an ordinary addition polymerization but also a reactive group capable of causing polycondensation (condensation polymerization) or a group capable of causing radiation polymerization, thus not restricting its polymerization mechanism.

Examples of the polymerizable discotic liquid crystal structural unit may include those described in JP-A 8-27824 and JP-A 9-21444. Specifically, structures having skeletons and radially substituted groups comprising linear or branched alkyl, alkoxy and/or substituted-benzoyl groups shown below. The polymerizable discotic mesomorphic compound may be obtained by providing a compound having the following discotic liquid crystal structural unit with a polymerizable group as a part of the compound.

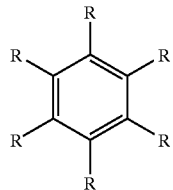

(PAD-1)

R:

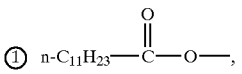

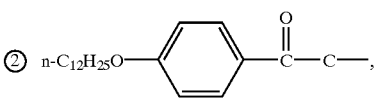

or

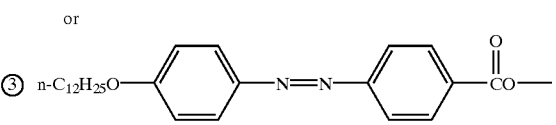

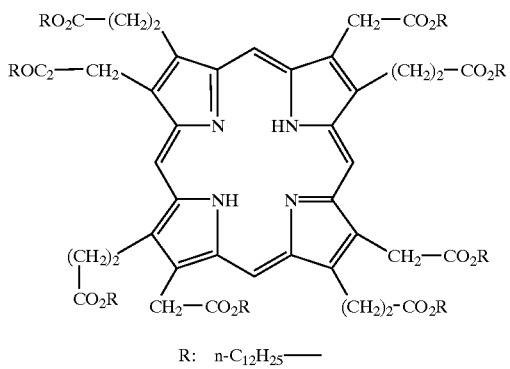

(PAD-2)

R: $n\text{-}C_{12}H_{25}\text{---}$

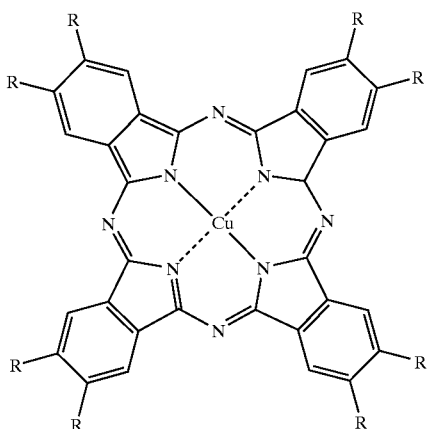

(PAD-3)

R: $C_{12}H_{25}OCH_2\text{---}$ (PAD-4)
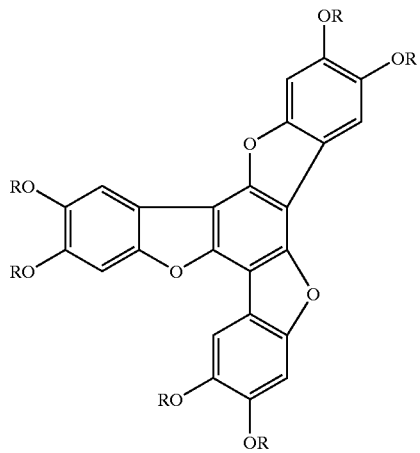
R:
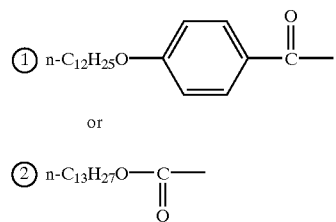
(PAD-5)
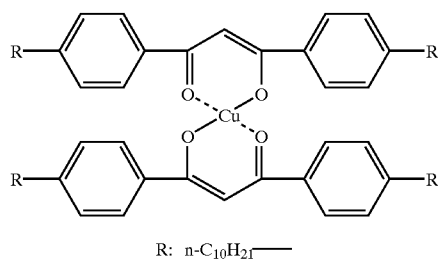
R: n-C$_{10}$H$_{21}$—
(PAD-6)
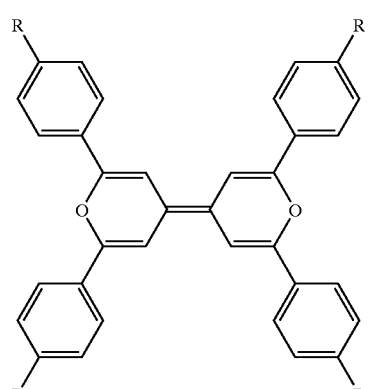
R: n-C$_8$H$_{17}$—
(PAD-7)
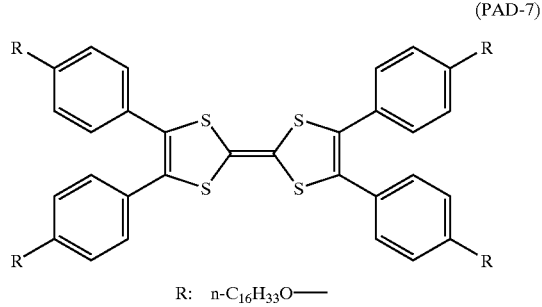
R: n-C$_{16}$H$_{33}$O—
(PAD-8)
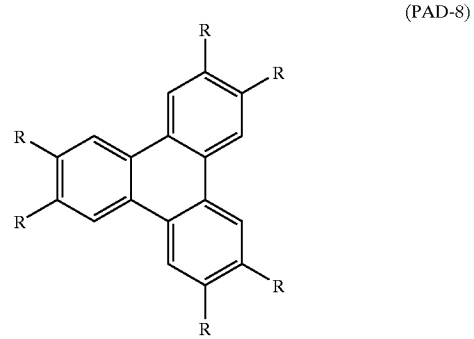
R:
① n-C$_m$H$_{2m+1}$O— (m = 2, 3, ..., 15),
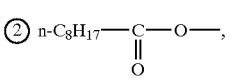
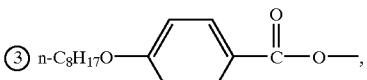
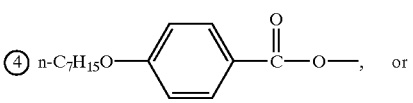
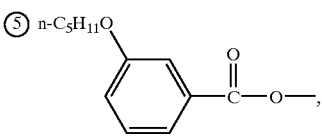
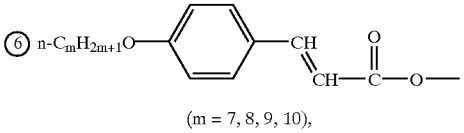
(m = 7, 8, 9, 10),
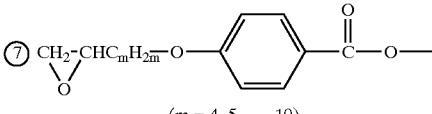
(m = 4, 5, ..., 10),
or
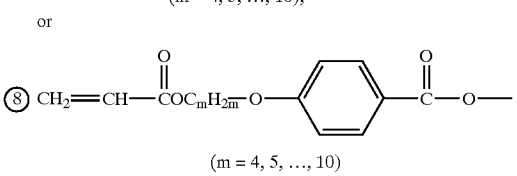
(m = 4, 5, ..., 10)

(PAD-9)

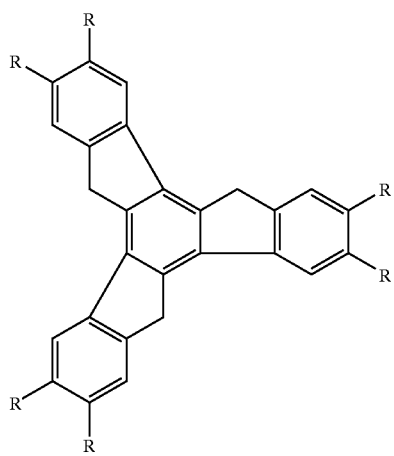

R:
① n-C₁₀H₂₁—C(=O)—O—,

② n-C₁₆H₃₃O—⌬—C(=O)—O—, or

③ CH₃O—⌬—NHC(=O)O—(CH₂)₈—C(=O)O—

(PAD-10)

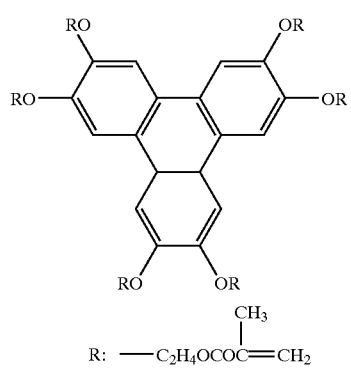

R: —C₂H₄OCOC(CH₃)=CH₂
—C₄H₈OCOCH=CH₂
—C₆H₁₂OCOCH=CH₂
—C₉H₁₈OCOCH=CHCH₃
—C₂H₄OCH=CH₂
—C₄H₈OCH=CH₂
—C₆H₁₂OCONHC₂H₄NCS
—C₉H₁₈OCH=CH₂
—C₂H₄SC₂H₄SH
—C₄H₈CHO
—C₆H₁₂OCH₂CH—CH₂
              \\O/ or

—C₉H₁₈OCH₂CH—CH₂
              \\O/

(PAD-11)

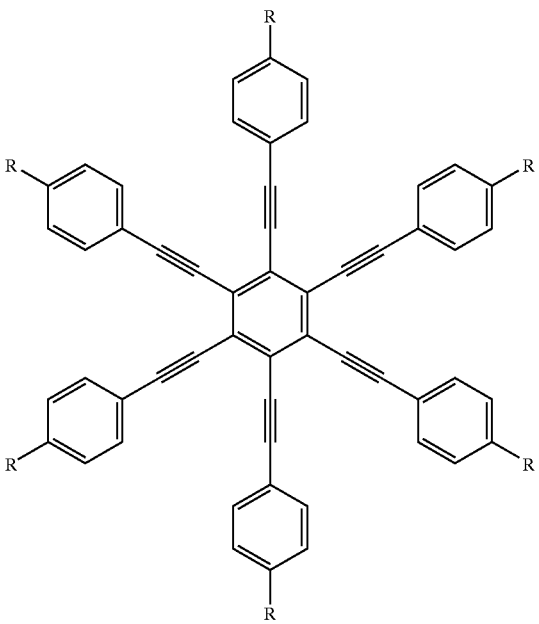

R: C₇H₁₅O—

The rod-shaped mesomorphic compound constituting the mesomorphic mixture according to the present invention in mixture with the above-mentioned polymerizable discotic mesomorphic compound may be a compound assuming a mesomorphic (liquid crystal) phase, such as nematic phase, cholesteric phase, smectic phase, chiral smectic phase, etc., and at least one species of the rod-shaped mesomorphic compound may be contained in the mesomorphic mixture. The rod-shaped mesomorphic compound may preferably be a liquid crystal composition comprising a combination of plural species of rod-shaped mesomorphic compounds in order to broaden a mesomorphic (liquid crystal) temperature range or optimize various physical properties.

By polymerizing the polymerizable discotic mesomorphic compound after adding, e.g., a polymerization initiator into the above-mentioned mesomorphic mixture, as desired, it is possible to prepare the liquid crystal mixture as a suitable functional material for constituting the polymer matrix-type liquid crystal device.

Herein, the mesomorphic mixture containing the polymerizable discotic mesomorphic compound before the polymerization may be a mixture which does not assume a mesomorphic phase by itself but may preferably assume a mesomorphic phase since it is possible assume a mesomorphic phase since it is possible to impart some alignment characteristic based on mesomorphism by effecting an alignment treatment and also possible to form a desired ordered structure. The mesomorphic mixture may be a uniform (or homogeneous) composition or in a non-uniform mixture state but may preferably be made uniform by subjecting it to, e.g., heat treatment under certain conditions in view of improvement in productivity for producing a uniform device with good reproducibility at the time of production of the liquid crystal device described hereinafter. As described above, the mesomorphic mixture may preferably provide the liquid crystal mixture as a functional material for the polymer matrix-type liquid crystal device through the polymerization of the polymerizable discotic mesomorphic compound. Accordingly, the polymerizable discotic mesomorphic compound may be contained in the mesomorphic mixture in an amount of 1–99 wt. %, preferably 5–95 wt. %, more preferably 10–90 wt. %. On the other hand, the rod-shaped mesomorphic compound may similarly be contained in the mesomorphic mixture in an amount of 1–99 wt. %, preferably 5–95 wt. %, more preferably 10–90 wt. %. Further, in the mesomorphic mixture used in the present invention, it is possible to incorporate a polymerizable monomer having no discotic mesomorphism and, as desired, possible to add an antioxidant, radical scavenger, photoreaction initiator, polymerization inhibitor or accelerator, colorant, etc.

The mesomorphic mixture as a suitable functional material for constituting the liquid crystal device may preferably be prepared through polymerization of the polymerizable discotic mesomorphic compound contained therein and may preferably comprise a liquid crystal mixture of a polymeric compound having a discotic mesomorphic molecular unit in its recurring unit with a rod-shaped liquid crystal composition. In order to provide an appropriate scattering state to the polymer matrix-type liquid crystal device, the polymeric compound (having a discotic mesomorphic molecular unit in its recurring unit) and the rod-shaped liquid crystal composition may preferably be in a phase separation state in a minute region but may include a slight non-phase separation portion. The polymeric compound corresponds to the above-mentioned polymeric compound comprising a compound having a discotic liquid crystal structural unit constituting its recurring unit and may be a compound assuming a mesomorphic phase or no mesomorphic phase. In order to form a preferred scattering state, the polymeric compound may desirably assume a discotic mesomorphic (liquid crystal) phase and may preferably have a negative refractive index anisotropy. Accordingly, the polymeric compound may preferably comprise at least 50 wt. % of discotic mesomorphic molecular unit. The discotic mesomorphic compound (liquid crystal) may preferably have a negative refractive index anisotropy. The rod-shaped liquid crystal composition comprises at least species of the rod-shaped mesomorphic compound and exhibits a mesomorphic phase, preferably nematic phase, cholesteric phase, smectic phase or chiral smectic phase.

The functional material as the liquid crystal composition of the present invention may preferably be prepared polymerizing a polymerizable compound comprising the polymerizable discotic mesomorphic compound constituting the above-mentioned mesomorphic mixture with ultraviolet (UV) light to form a polymeric compound having a recurring unit including the discotic mesomorphic molecular unit, i.e., a discotic mesomorphic mixture, with the result that the rod-shaped mesomorphic compound is phase-separated in the mesomorphic mixture. In order to provide a preferred scattering state, it is possible to control a diameter of droplet by regulating a phase before or during polymerization similarly as in the ordinary polymer matrix (polymer-dispersed or polymer network)-type liquid crystal device.

Examples of the polymeric discotic mesomorphic compound having a discotic mesomorphic molecular unit-containing recurring unit may include compounds described in, e.g., "Macromol. Rapid Common.", vol. 18, pp. 93–98 (1997) or "EKISHO", vol. 1, pp. 45–(1997).

In order to impart a preferred alignment state to the mesomorphic mixture comprising the polymeric discotic mesomorphic compound and the rod-shaped liquid crystal composition, after effecting the above-mentioned steps, it is possible to effect heat treatment. By the heat treatment, the polymeric compound (having the discotic mesomorphic molecular unit-containing recurring unit) and/or the rod-shaped liquid crystal composition can effect self-organization to form a desired alignment state in some cases.

The above-mentioned mesomorphic mixture or composition (functional material) comprising the polymeric discotic mesomorphic compound and the rod-shaped liquid crystal composition may comprise 1–99 wt. %, preferably 5–95 wt. %, more preferably 10–90 wt. %, of each of the polymeric discotic mesomorphic compound and the rod-shaped liquid crystal composition, in view of scattering performance and development of their physical properties. The mesomorphic mixture may further contain additives, such as an antioxidant, radical scavenger, photoreaction initiator, polymerization inhibitor, colorant, etc., as desired.

In the present invention, there is provided a polymer matrix-type liquid crystal device preferably using a combination of a rod-shaped mesomorphic compound (liquid crystal) with a polymer matrix formed of the above-mentioned polymeric discotic mesomorphic compound. This liquid crystal device uses the polymeric discotic mesomorphic compound as a polymer constituting the (polymer) matrix shows a high scattering performance in combination with the rod-shaped mesomorphic compound. Accordingly, depending on the combination, it is possible to improve a reflectance, luminance and contrast. Further, the reflectance is directly proportional to a cell thickness, so that a higher reflectance can lead to a smaller cell gap. As a result, it becomes possible to reduce a driving voltage, thus realizing an inexpensive driver IC and reduction of power consumption during the drive of the liquid crystal device.

Figure 2:
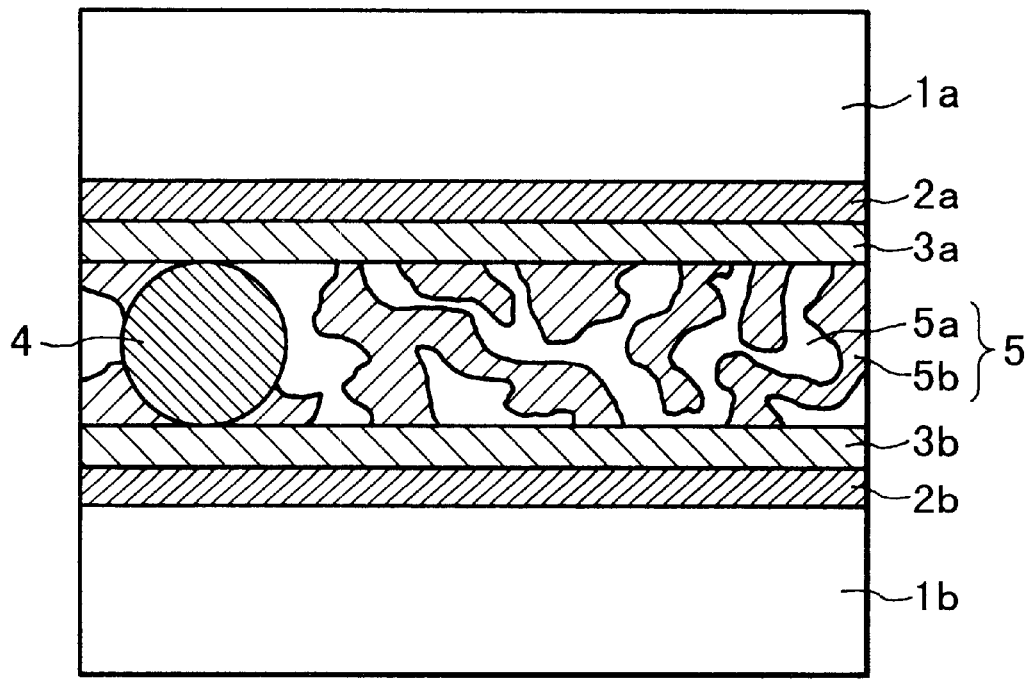
FIG. 2 is a schematic sectional view of an embodiment of the liquid crystal device according to the present invention.

FIG. 2 is a schematic sectional view an embodiment of a cell structure of the liquid crystal device according to the present invention.

Referring to FIG. 2, the liquid crystal cell (device) includes: a pair of substrates $1a$ and $1b$; transparent electrodes $2a$ and $2b$ of ITO (indium tin oxide) disposed on the substrates $1a$ and $1b$, respectively; alignment control layers $3a$ and $3b$ disposed on the transparent electrodes $2a$ and $2b$, respectively; a spacer 4 disposed between the alignment control layers $3a$ and $3b$; and a liquid crystal layer 5 disposed together with the spacer 4 between the alignment control layers $3a$ and $3b$. The liquid crystal layer 5 comprises a polymeric discotic mesomorphic compound $5a$ and a rod-shaped mesomorphic compound $5b$ and may preferably have a thickness (corr. to a cell gap) of 1–100 μm set and regulated by the spacer 4.

The substrate 1a and 1b may be formed of glass, plastic, etc. and at least one substrate (e.g., 1a) may be formed of a transparent material. The alignment control layers 3a and 3b may be omitted. It is possible to optionally form a short-circuit prevention layer, a light-absorbing layer, a (light) reflection layer and/or a color filter. In the case of using the liquid crystal device as a scattering-type device or a reflection-type device, one of the substrate (e.g., 1b) may be omitted or the pair of substrates may be asymmetrical. It is also possible to horizontally dispose electrodes on the substrates as in an in-plain switching device or a fringe-field switching device.

The cell structure of the liquid crystal device of the present invention is not restricted to the above-mentioned cell structures.

The liquid crystal layer 5 of the liquid crystal device of a polymer matrix-type (polymer network-type shown in FIG. 5 in this embodiment) may be prepared by injecting the mesomorphic mixture comprising the above-described polymerizable discotic mesomorphic compound and rod-shaped mesomorphic (liquid crystal composition) into a black cell and subjecting the mesomorphic mixture to UV light irradiation to form a mesomorphic mixture comprising a polymeric compound 5a having a discotic mesomorphic molecular unit-containing recurring unit and a rod-shaped mesomorphic compound 5b. The rod-shaped mesomorphic compound 5b may preferably be a mesomorphic compound (liquid crystal) having a positive or negative dielectric anisotropy (hereinafter, sometimes referred to as "P-type liquid crystal" or "N-type liquid crystal") in order to (optically) modulate transmitted light or reflected light by changing an alignment state of the rod-shaped mesomorphic compound 5b under application of an electric field. Further, a nematic liquid crystal may preferably be used as the rod-shaped mesomorphic compound 5b for allowing a low-voltage drive, a relatively simple cell preparation process and/or a relatively simple cell structure. In a further preferred embodiment, a fluorine-containing nematic liquid crystal may advantageously used in an active-matrix type liquid crystal device.

The alignment control layer(s) (3a or/and 3b) may be provided as a uniaxial alignment control layer by forming a film an inorganic or (insulating) organic material by solution coating, vapor deposition, sputtering, etc., and rubbing the film with a fibrous material, such as velvet, cloth or paper (uniaxial aligning treatment). Examples of the inorganic material may include: silicon monoxide, silicon dioxide, aluminum oxide, zirconium oxide, magnesium fluoride, cerium oxide, cerium fluoride, silicon nitride, silicon carbide and boron nitride. Example of the organic material may include: polyvinyl alcohol, polyimide, polyamideimide, polyester, polyamide, polyesterimide, polyparaxylylene, polycarbonate, polyvinyl acetal, polyvinyl chloride, polystyrene, polysiloxane, cellulosic resin, melamine resin, urea resin and acrylic resin. It is also possible to form such an alignment control layer by oblique vapor deposition, i.e., vapor deposition in an oblique direction onto a substrate, of an oxide, such as SiO, or a nitride, to form a film provided with a uniaxial alignment control force.

Particularly, it is preferred to use a rubbed polyimide film as a uniaxial alignment control layer in order to obtain a good uniaxial alignment characteristic. An ordinary polyimide film may be formed by wet-coating of a polyamic acid (precursor of condensation-crosslinking agent) and curing thereof. The polymeric acid is readily dissolved in a solvent, thus being excellent in producibility. In recent years, a solvent-soluble polyimide may be available as a product, thus being preferably used in view of its good uniaxial alignment performance and high productivity.

Examples of the polyimide may preferably include those having a recurring unit of the following formula:

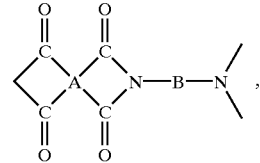

wherein A denotes a tetravalent group having an aromatic ring, a polycyclic aromatic ring, a heterocycle, an alicycle or a condensed polycyclic ring; B denotes a divalent aliphatic group inclusive of acyclic group or a divalent of the formula:

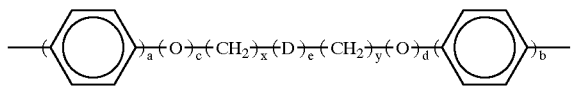

where D is —$CR_1(R_2)$—($R_1$, $R_2$: H or alkyl group optionally substituted); a and b are each 0 or 1; c and d are each 0 when a=b=0 or 0 or 1 when a=b=1; e is 0 or 1; and x and y independently denote an integer of at least 1 satisfying x+y+e=2–10 in combination with e.

The substrates 1a and 1b are disposed opposite to each other via the spacer 4. The spacer 4 determines a cell gap (a distance therebetween) and may generally be formed of silica beads, a partition spacer or a resinous spacer. The cell gap thus determined may vary in its suitable range and upper-limit value depending on the liquid crystal material but may preferably be set to 1.014 100 μm.

When the liquid crystal device shown in FIG. 2 is supplied with a controlled electric field, an alignment state of the rod-shaped liquid crystal was changed to modulate transmitted light and reflected light. The thus-modulated light may be adopted as a display signal, so that the liquid crystal device is formulated as a display device. Further, by using an intermediate voltage signal, it is possible to readily effect an analog-like gradation display.

Referring again to FIG. 2, behind the liquid crystal device or between the lower electrode and substrate, a light-absorbing plate, or, if necessary, a reflection or scattering plate in order to improve luminance or brightness (e.g., as described in IDRC '94, p. 183–) may be disposed, thus realizing a reflection-type liquid crystal display device.

Figure 3:
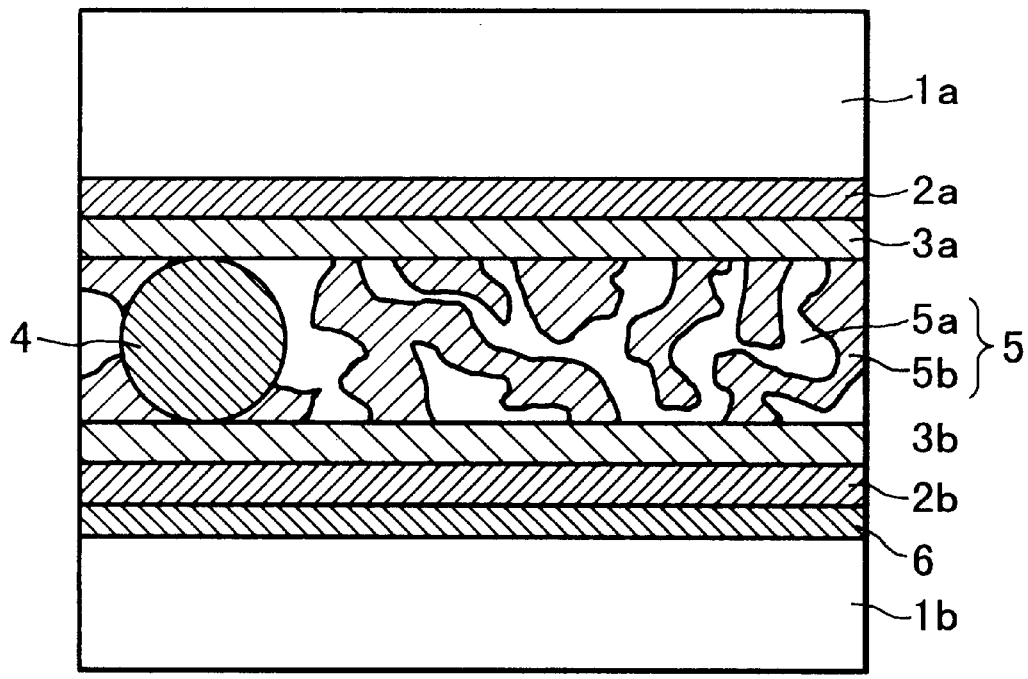
FIG. 3 is a schematic sectional view of another embodiment of the liquid crystal device of the present invention.

FIG. 3 is an embodiment of such a reflection-type liquid crystal display device using a light-absorbing plate 6 in addition to the cell structure of FIG. 2.

When the reflection-type liquid crystal device is formulated as an active matrix-type liquid crystal device described hereinbelow, it is possible to realize a liquid crystal device of large picture area, high definition, high responsiveness and excellent drive characteristics. In the present invention, the liquid crystal device is of the polymer matrix-type as mentioned above (wherein the polymer matrix comprises the polymeric discotic mesomorphic compound), thus providing a high scattering state. As a result, it is possible to realize a high-brightness reflection-type liquid crystal device providing a high reflectance. This type of the reflection liquid crystal device may also be used as a direct viewing-type liquid crystal device utilizing external light or a supplementary light source or as a so-called projection-type liquid crystal device wherein an incident light from the front thereof is modulated and reflected thereby to control optical path of the light, thus being projected onto a screen.

The projection-type liquid crystal device may be used a a liquid crystal device of a transmission-type.

Figure 4:
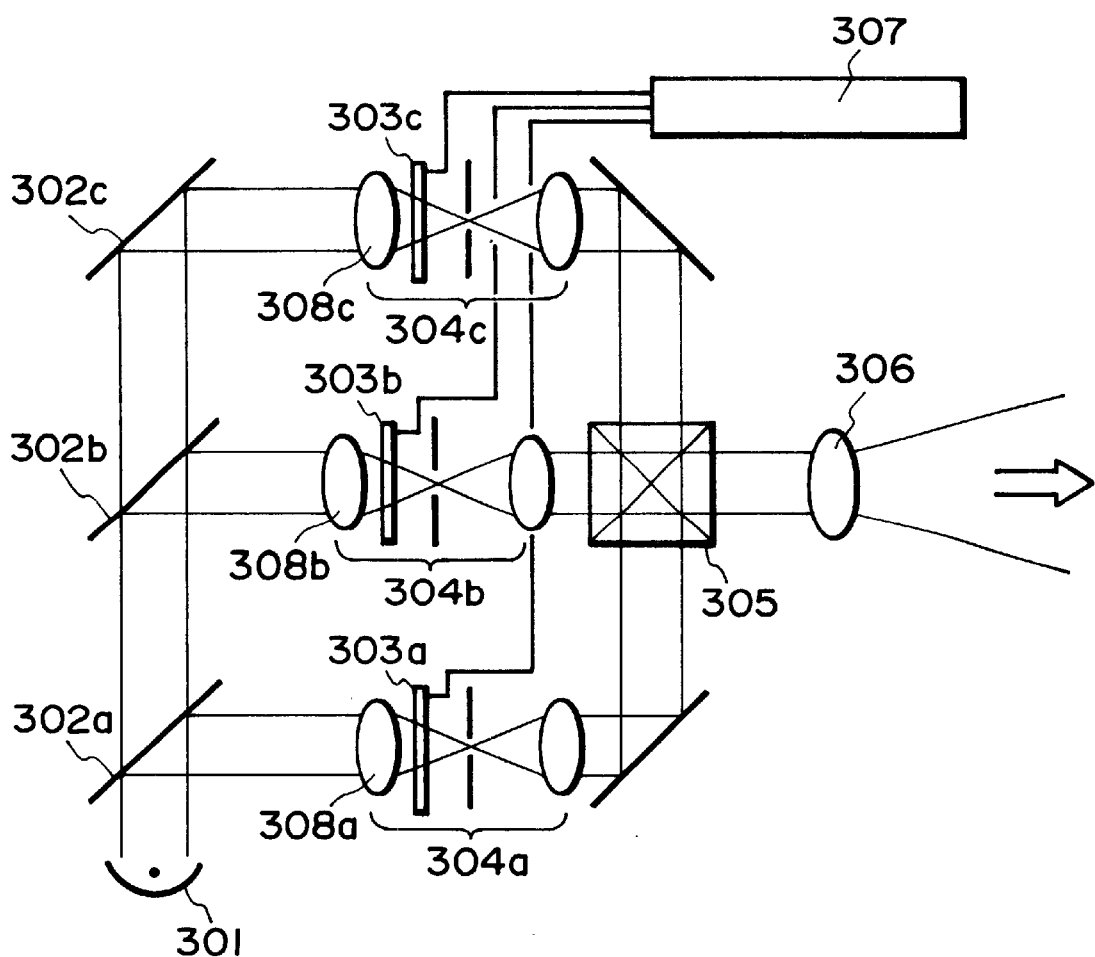
FIG. 4 is a schematic view for illustrating a projection optical system including the liquid crystal device of the present invention.

FIG. 4 illustrates a typical embodiment of the transmission-type projection liquid crystal apparatus using a schlieren optical system.

Referring to FIG. 4, three liquid crystal devices 303a, 303b and 303c for primary colors of R (red), G (green) and B (blue) are each comprised of a liquid crystal device having an electrode matrix (e.g., as an active matrix-type liquid crystal device described below), so that a color image is projected and displayed onto the screen. More specifically, an incident light issued from a light source 301 is selectively reflected and color-separated into light fluxes of R, G and B by dichroic mirrors 302a, 302b and 302c to enter schlieren optical systems 304a, 304b and 304c including a schlieren lens 308a (308b, 308c) and the liquid crystal device 303a (303b, 303c). The light fluxes passing through the schlieren optical systems are focused and reflected by a dichroic prism 305 to pass through a projection lens 306, thus being projected onto the screen as a color image. Each of the liquid crystal devices 303a, 303b and 303c is driven by a liquid crystal driving means 307.

In this case, the liquid crystal device of the present invention is set to display a black state in the scattering state. In the liquid crystal device, it is possible to provide a higher scattering state as described above, thus realizing a higher contrast.

As described above, the liquid crystal device of the present invention may be formed into an active matrix-type liquid crystal device provided with an active (switching) element at each pixel, thus realizing high resolution and performance.

Figure 5:
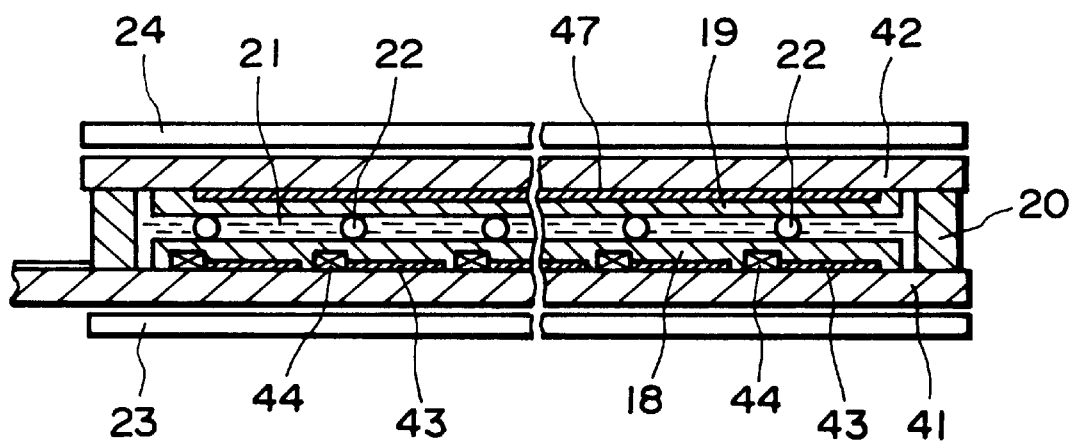
FIG. 5 is a schematic sectional view of an embodiment of a liquid crystal device including active (switching) elements according to the present invention.
Figure 6:
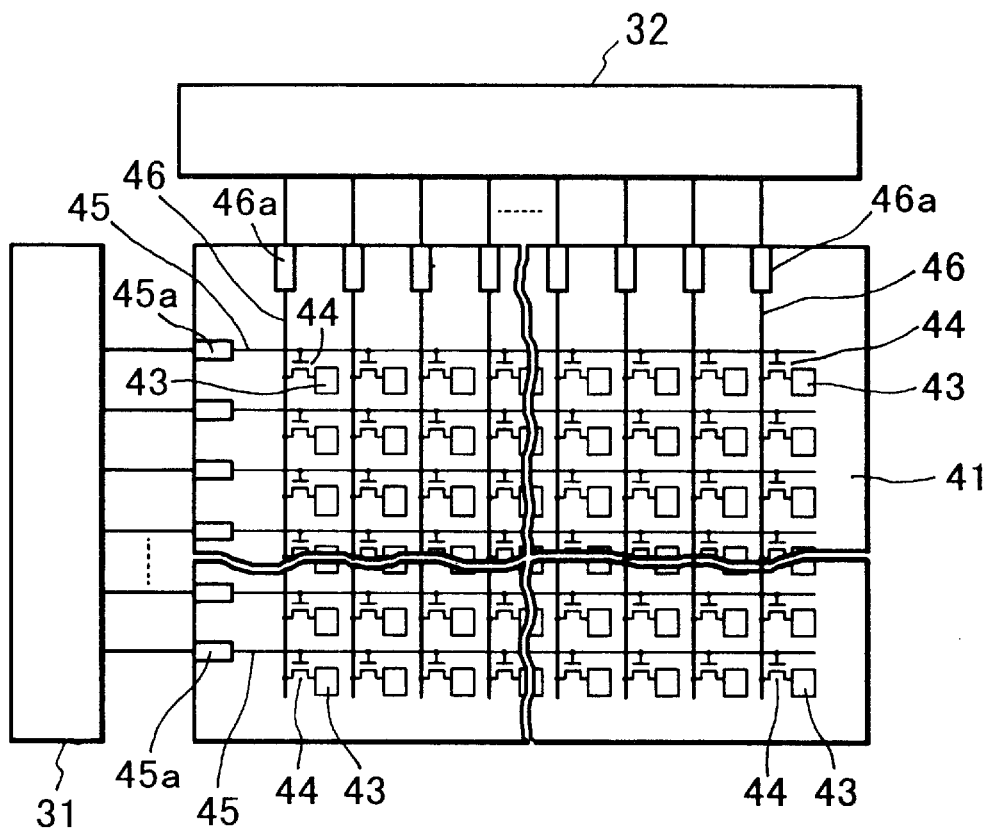
FIG. 6 is a schematic plan view for illustrating a circuit of an active-matrix type liquid crystal apparatus including the liquid crystal device shown in FIG. 5 according to the present invention.

An example of the active matrix-type liquid crystal device having a cell structure for each pixel as shown in FIG. 2 is shown in FIGS. 5 and 6.

Referring to FIGS. 5 and 6, one of a pair of transparent (glass) substrates 41 and 42 (e.g., a lower substrate 41) is provided with a plurality of transparent pixel electrodes 43 and a plurality of active (switching) elements 44 connected with the pixel electrodes, respectively, arranged in a matrix form. Each of the active elements 44 may be formed of, e.g., a thin film transistor (TFT). The TFT may comprise a semiconductor of an amorphous silicon-type, a polycrystalline silicon-type, a microcrystalline-type or a single crystalline silicon-type.

As shown in FIG. 5, on the TFTs 44 and the pixel electrodes 43, an alignment control layer 18 is formed.

On the other substrate 42, a transparent electrode 47 and an alignment control layer 19 are formed.

Between the pair of substrates 41 and 42, a liquid crystal layer 21 is disposed together with a spacer 22 and a sealing agent 20.

Each of the TFTs 44 comprises a gate electrode formed on the substrate 41, a gate insulating film formed on the gate electrode, a semiconductor layer formed on the gate insulating film, and a source electrode and a drain electrode formed on the semiconductor layer.

As shown in FIG. 6, on the (lower) substrate 41, gate (scanning) lines 45 and data signal lines 46 are disposed between the pixel electrodes 43 in a row direction and a column direction, respectively. Each of the source electrodes is connected with a corresponding gate line 45 and a corresponding data signal line 46, respectively. The gate lines 45 are connected to a row driver 31 via their terminal portions 45a and the data signal lines 46 are connected to a column driver 32 via their terminal portions 46a. The gate lines 45 are scanned by application of gate signals from the row driver 31 and the column driver 32 supplies signals corresponding to display data. The gate lines 45 are covered with the gate insulating film of the TFT 44 except for their terminal portions 45a and the data signal lines are formed on the gate insulating film. The pixel electrodes 43 are also formed on the gate insulating film and are connected with corresponding drain electrodes of the TFTs 44, respectively, at their terminal portions.

On the (upper) substrate 42, as shown in FIG. 5, the transparent (opposite) electrode 47 is formed so as to be opposite to the respective pixel electrodes 43. The opposite electrode 47 is a single electrode extending over the entire display region and supplies a reference voltage.

When the liquid crystal device is driven, a resultant transmittance is changed depending on the data signal voltage to effect gradational display. Each of the pixels may frequently be provided with a capacitor for providing an auxiliary (storage) capacitance.

In the above-described active matrix-type liquid crystal device, electric charges are injected into the pixels of the liquid crystal cell in a gate-on period. After the gates are turned off in a short period (of time), a subsequent data is written in the pixels along the subsequent scanning line.

The liquid crystal device of the present invention may also be used as a light valve for printers.

It is possible to constitute liquid crystal apparatus having various functions including the liquid crystal device of the present invention. Examples of such liquid crystal apparatus may include those for mobile computing, PDA (personal digital assistant), desktop personal computer, laptop personal computer, video camera, digital camera, document viewer, copying machine, etc.

The liquid crystal apparatus according to the present invention includes as a display medium the liquid crystal device showing a good switching performance as described above, thus providing excellent driving characteristic and reliability to realize display images with high definition and large picture area at high response speed.

(Second Embodiment)

According to this embodiment, there is provided a liquid crystal composition assuming such an alignment state that directors of a discotic mesomorphic compound and a rod-shaped mesomorphic compound are directed in an identical direction at least one state.

Specifically, a liquid crystal device in this embodiment utilizes such an alignment state that the discotic mesomorphic compound and the rod-shaped mesomorphic compound are co-present in a phase separation state and their directors are directed in an identical direction. The discotic mesomorphic compound used in this embodiment is a mesomorphic compound (liquid crystal compound) assuming mesomorphic phase comprising a disk-shaped compound, e.g., described in "Ekisho (Kisohen)" (in Japanese), pp. 7–9, published by Baihukan K.K. Examples of the mesomorphic phase may include nematic discotic phase, discotic hexagonal phase and discotic rectangular phase.

Examples of a structural unit of the discotic mesomorphic compound may include those having structural formulas shown below.

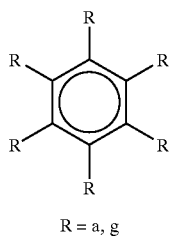
R = a, g
(D-1)
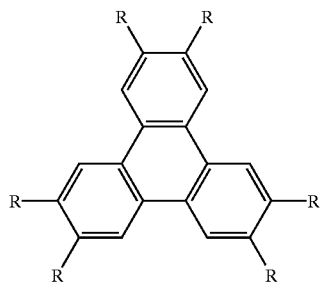
R = b
(D-6)
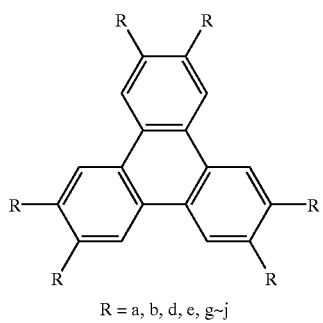
R = a, b, d, e, g~j
(D-2)
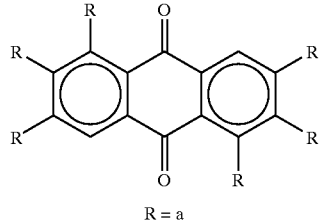
R = a
(D-7)
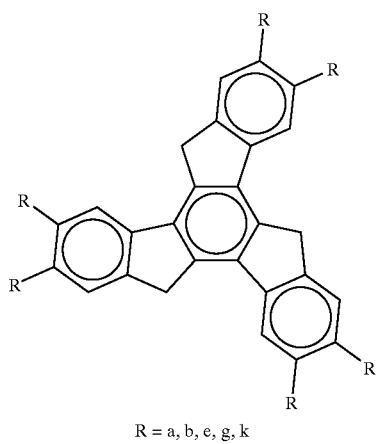
R = a, b, e, g, k
(D-3)
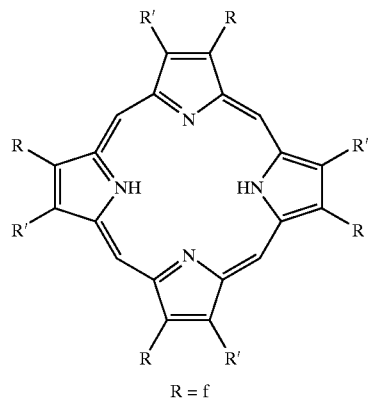
R = f
(D-8)
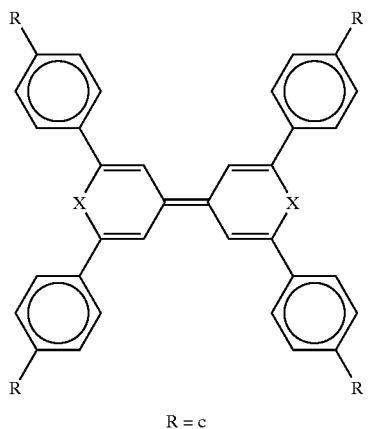
R = c
(D-4)
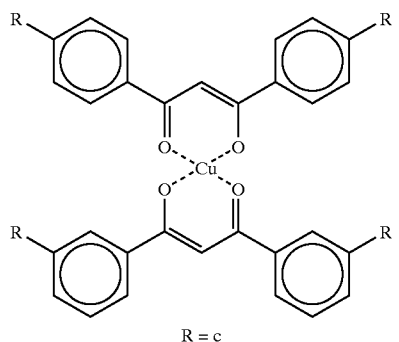
R = c
(D-9)
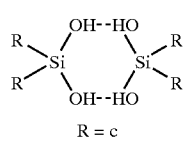
R = c
(D-5)
In (D-1) to (D-9), a to k for each R are groups shown below.
a: 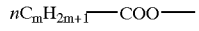
b: 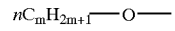
c: 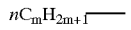

-continued
d: 
e: 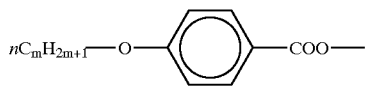
f: 
g: 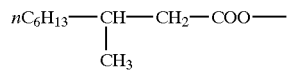
h: 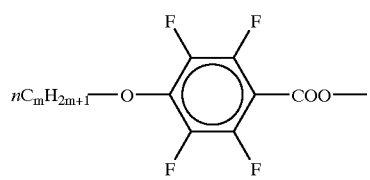
i: 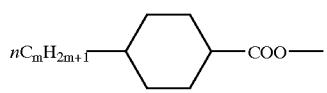
j: 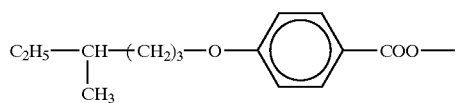
k: 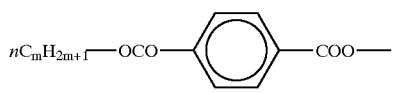
(D-10)
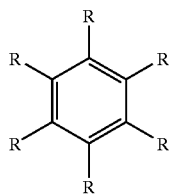
R:
① 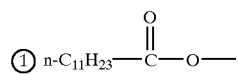
② 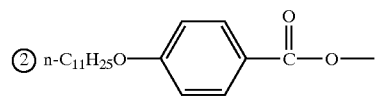
or
③ 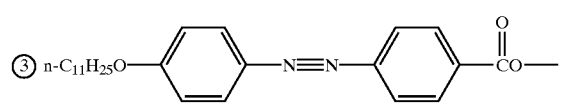
-continued
(D-11)
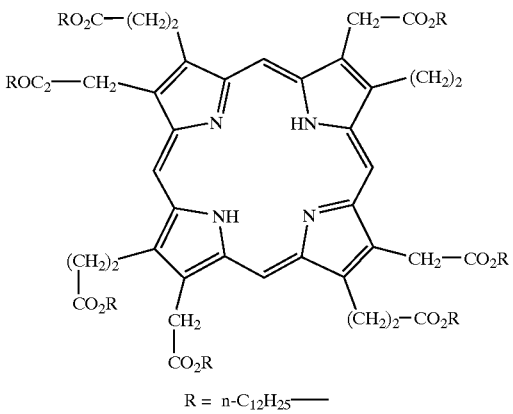
R = n-C$_{12}$H$_{25}$—
(D-12)
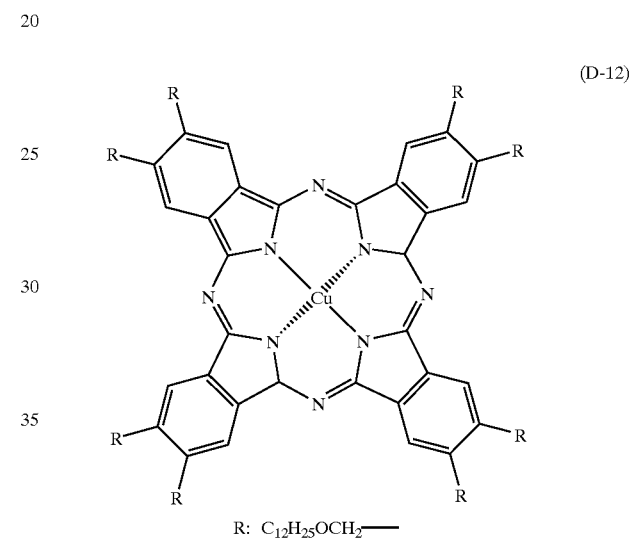
R: C$_{12}$H$_{25}$OCH$_2$—
(D-13)
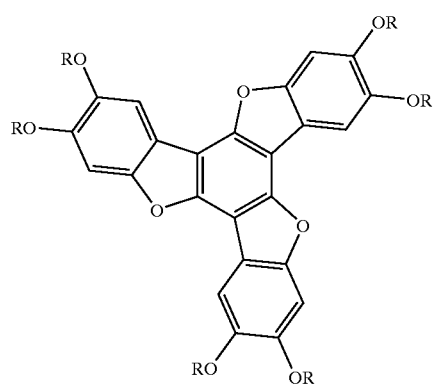
R:
① 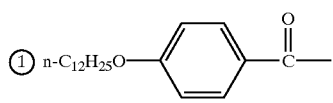
or
② 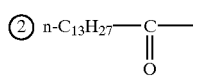

-continued
(D-14)
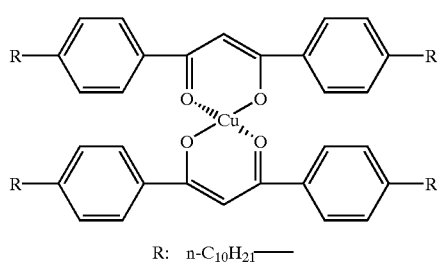
R: n-C₁₀H₂₁—
(D-15)
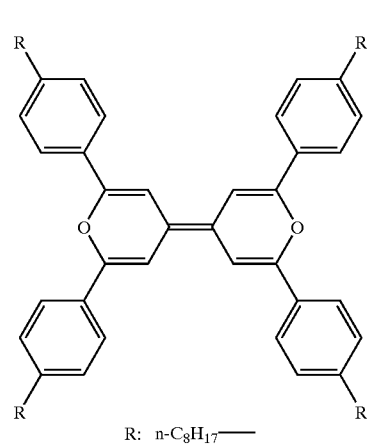
R: n-C₈H₁₇—
(D-16)
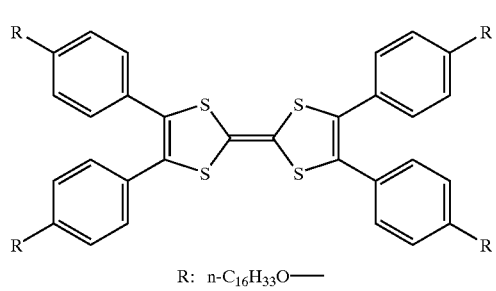
R: n-C₁₆H₃₃O—
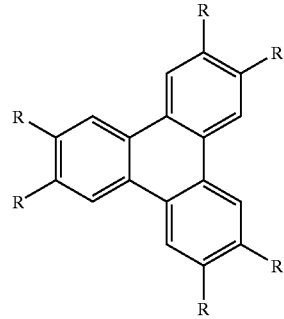
R:
① n-CₘH₂ₘ₊₁O— (m = 2, 3, ... , 15)
② n-C₈H₁₇—C—
         ‖
         O
③ n-C₈H₁₇O—⟨⟩—C(=O)—O—
-continued
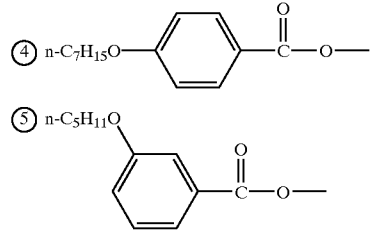
④ n-C₇H₁₅O—⟨⟩—C(=O)—O—
⑤ n-C₅H₁₁O—⟨⟩—C(=O)—O—
⑥ n-CₘH₂ₘ₊₁O—⟨⟩—CH=CH—C(=O)—O—
(m = 7, 8, 9, 10)
⑦ CH₂—CHCₘH₂ₘ—O—⟨⟩—C(=O)—O—
    \O/
(m = 4, 5, ... , 10)
or
⑧ CH₂=CH—C(=O)—OCₘH₂ₘ—O—⟨⟩—C(=O)—O—
(m = 4, 5, ... , 10)
(D-18)
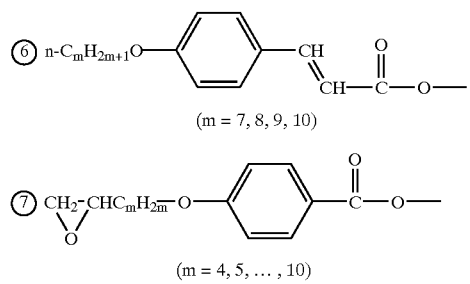
R:
① n-C₁₀H₂₁—C(=O)—O—
② n-C₁₆H₃₃O—⟨⟩—C(=O)—O—
or
③ CH₃O—⟨⟩—NHC(=O)—(CH₂)₈—C(=O)—

(D-19)

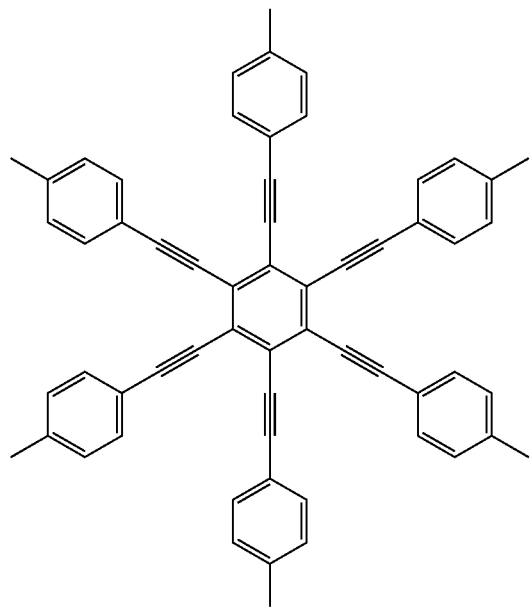

R: C7H15O—

(D-20)

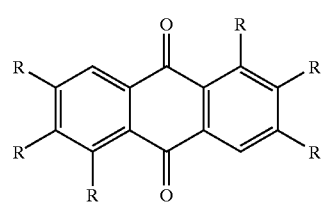

R:

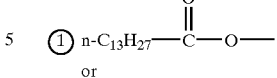

or

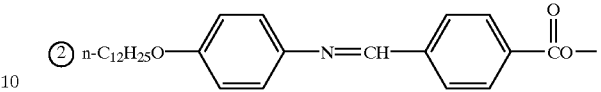

The discotic mesomorphic compound may preferably be a polymeric discotic mesomorphic compound since the compound is liable to cause phase separation with the rod-shaped mesomorphic compound. Examples of such a compound may include those described in, e.g., JP-A 8-27284: "Macromol. Rapid Common.", vol. 18, pp. 93–98 (1997); and "EKISHO", vol. 1, p. 45–(1997).

Specific examples of the compounds may include those having structural formulas shown below.

(PMD-1)

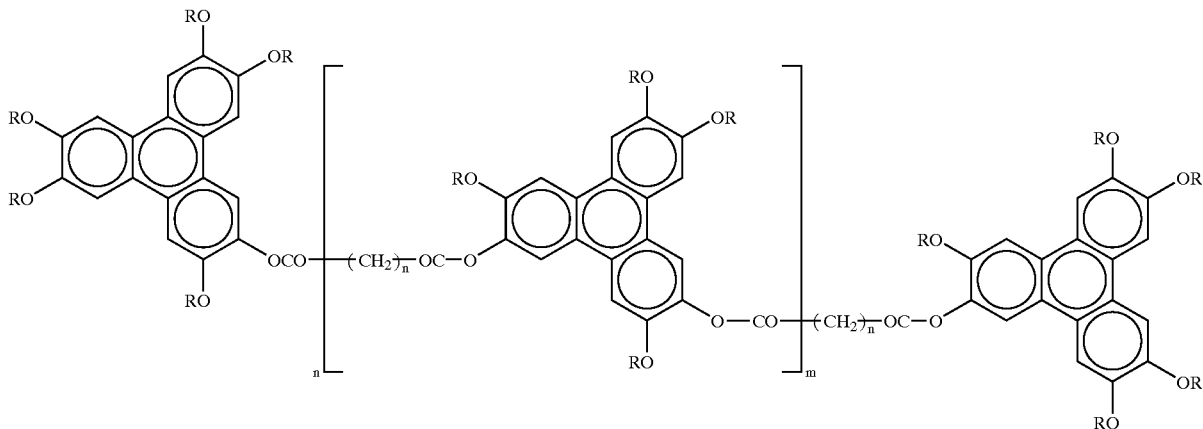

-continued
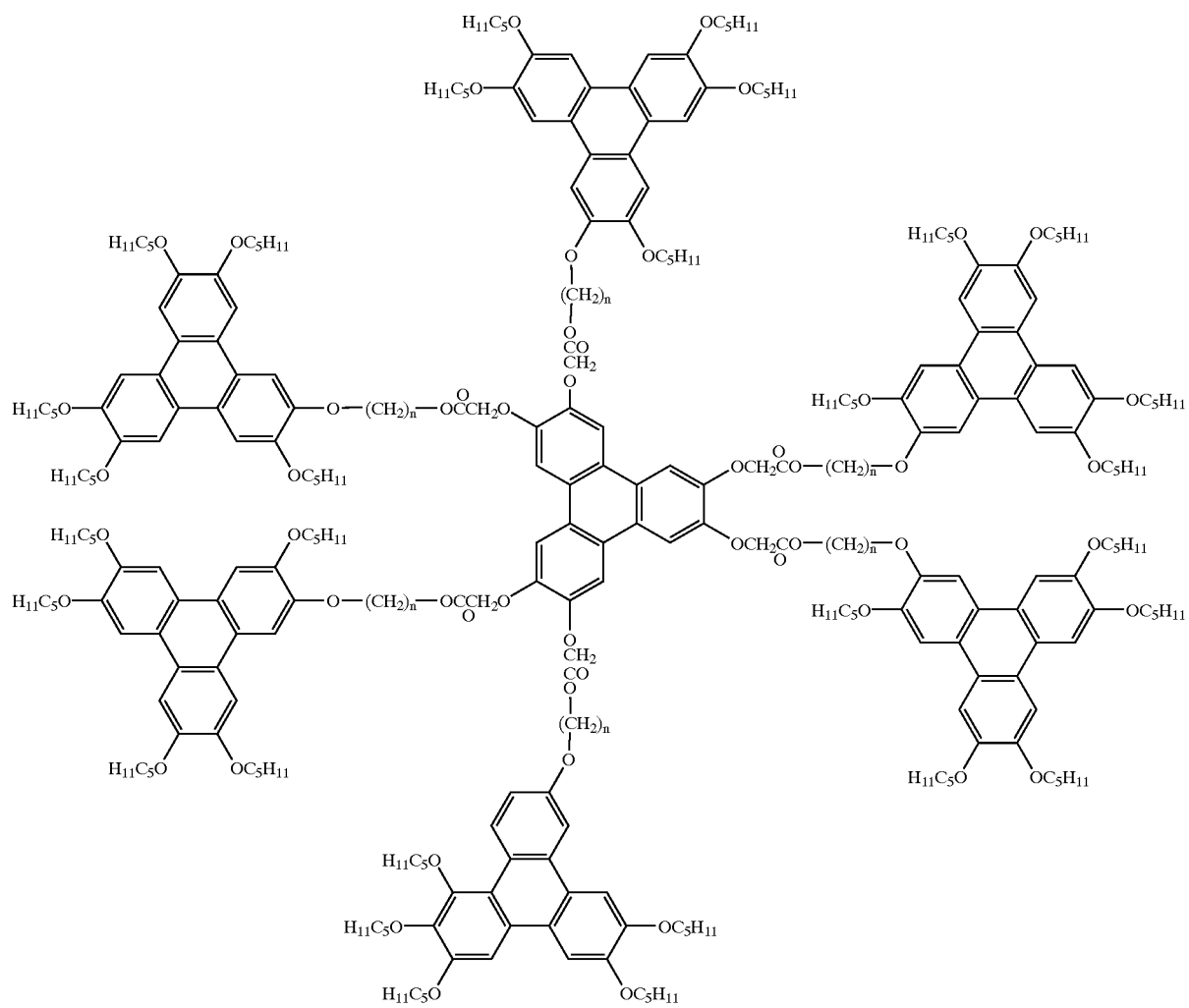
(PMD-2)
n = 6, 9 or 11

(PMD-3)

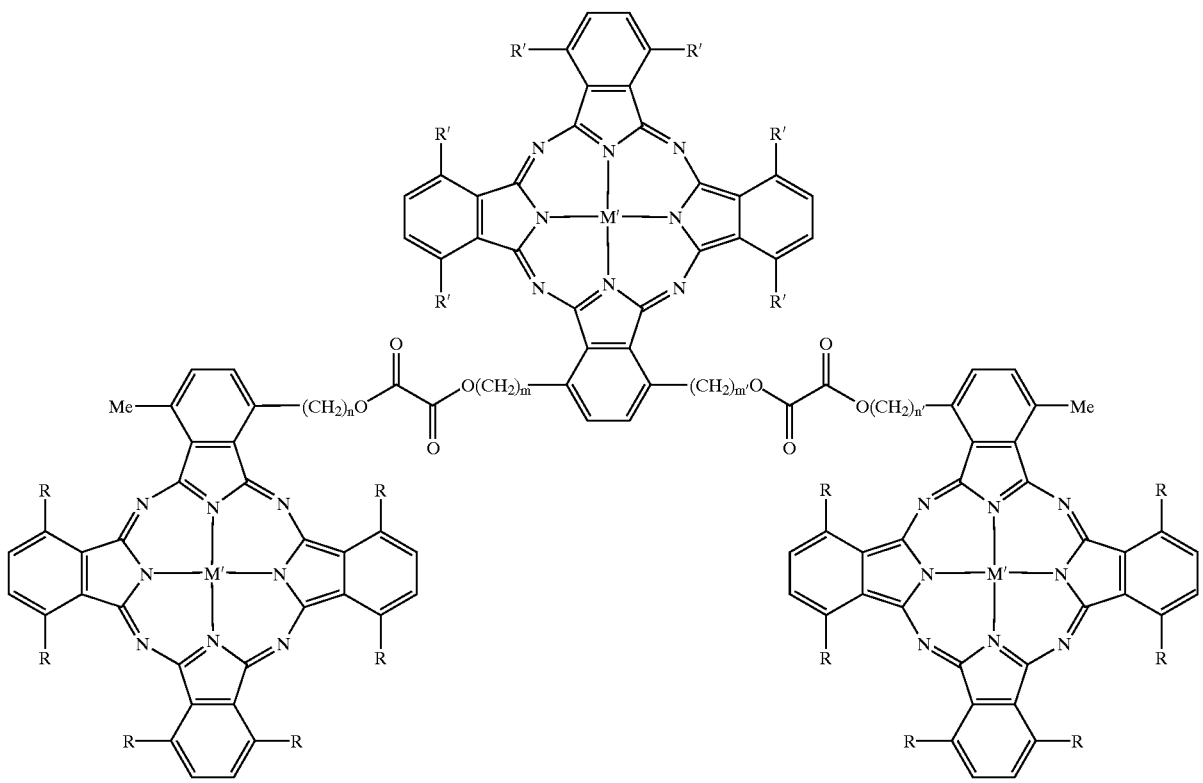

(1) R = R' = C$_8$H$_{17}$: m = n = 6; M = M' = H, H or Cu
(2) R = C$_8$H$_{17}$, R' = C$_7$H$_{15}$: m = 6, n = 5; M = Cu, M' = H, H (PMD-4)

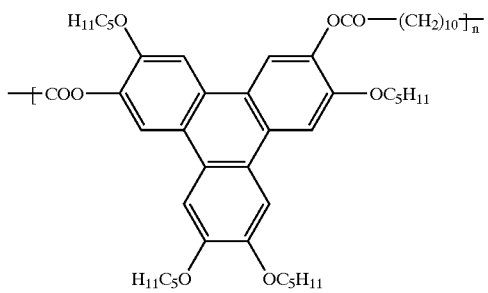

Similarly as in First Embodiment, the rod-shaped mesomorphic compound used in this embodiment comprises a liquid crystal, such as nematic liquid crystal, cholesteric liquid crystal, smectic liquid crystal or chiral smectic liquid crystal.

As the rod-shaped mesomorphic compound, at least one species of the rod-shaped mesomorphic compound is used ordinarily but a rod-shaped liquid crystal composition comprising at least two species of rod-shaped mesomorphic compounds may preferably be used in order to broaden a mesomorphic temperature range and optimize various physical properties.

The liquid crystal device used in this embodiment may have a cell structure identical to that described in First Embodiment except that the discotic mesomorphic compound constituting the discotic liquid crystal phase 5a is not necessarily a polymeric compound (but the polymeric discotic mesomorphic compound may preferably be employed).

In this embodiment, as the rod-shaped mesomorphic compound, a rod-shaped mesomorphic compound having a memory characteristic may preferably be used. Examples of such a rod-shaped mesomorphic compound (having memory characteristic) may preferably include a cholesteric liquid crystal, smectic liquid crystal, chiral smectic liquid crystal and two-frequency drive nematic liquid crystal.

The cholesteric liquid crystal may utilize its alignment state, such as planer alignment or focal conic alignment, as a memory state. As the memory state, the smectic liquid crystal can utilize a combination of a homogeneous alignment state and a homeotropic alignment state and can thermally remove the memory state. The chiral smectic liquid crystal can utilize a bistable state providing a spontaneous polarization as the memory state. The two-frequency drive nematic liquid crystal can exhibit the memory characteristic as a polymer-dispersed type liquid crystal as described in "Shingaku Giho", EID 98–189, OME 98–143 (March 1999).

The rod-shaped mesomorphic compound having a memory characteristic used in this embodiment may preferably be a liquid crystal composition comprising at least one species f the rod-shaped mesomorphic compound, more preferably be a liquid crystal composition comprising at least two species of the rod-shaped mesomorphic compound in order to provide a broader mesomorphic temperature range and optimized physical properties.

As described above, the liquid crystal composition used in the present invention as the functional material can be adopted in a liquid crystal device excellent in luminance without using a backlight being an electric power source requiring a larger energy consumption.

Further, when the liquid crystal (composition) having the memory characteristic is used as a switching liquid crystal, a resultant liquid crystal device is not required to be driven all the time, thus considerably contributing to reduction of drive power consumption. As a result, even compared with known liquid crystal devices of power saving-type, it is considered to be an excellent liquid crystal device.

Referring again to FIG. 2, behind the liquid crystal device according to this embodiment or between the lower electrode and substrate, a light-absorbing plate, or, if necessary, a reflection or scattering plate in order to improve luminance or brightness (e.g., as described in IDRC '94, p. 183–) may be disposed, thus realizing a reflection-type liquid crystal display device.

FIG. 3 is an embodiment of such a reflection-type liquid crystal display device using a light-absorbing plate 6 in addition to the cell structure of FIG. 2.

When the reflection-type liquid crystal device is formulated as an active matrix-type liquid crystal device as described above, it is possible to realize a liquid crystal device of large picture area, high definition, high responsiveness and excellent drive characteristics. In the present invention, the liquid crystal device is formed in a polymer-dispersed type liquid crystal device or a polymer network-type liquid crystal device wherein the polymer network comprises the polymeric discotic mesomorphic compound contained therein, thus providing a high scattering state. As a result, it is possible to realize a high-brightness reflection-type liquid crystal device providing a high reflectance. This type of the reflection liquid crystal device may also be used as a direct viewing-type liquid crystal device utilizing external light or a supplementary light source or as a so-called projection-type liquid crystal device wherein an incident light from the front thereof is modulated and reflected thereby to control optical path of the light, thus being projected onto a screen.

When the liquid crystal device of this embodiment is used a display medium for a liquid crystal apparatus, the liquid crystal device exhibits good switching characteristic as mentioned above, thus providing the liquid crystal apparatus with excellent driving characteristics and reliability and realizing high-definition and large display images at high response speed.

(Third Embodiment)

In this embodiment, there is provided a liquid crystal device by using a liquid crystal composition comprising a polymeric compound having a discotic mesomorphic molecular unit-containing recurring unit and a mesomorphic compound having a memory characteristic, thus realizing a liquid crystal device, optical modulation device, display device and liquid crystal apparatus, of low power consumption, high luminance and high performances.

The liquid crystal composition used in this embodiment comprises a combination of the polymeric compound having a recurring unit comprising a discotic mesomorphic molecular unit with the mesomorphic compound having a memory characteristic.

As the polymeric discotic mesomorphic compound, those having a recurring unit including structural unit of the formula (D-1) to (D-20) enumerated in Second Embodiment described above may suitably be used also in this embodiment.

The recurring unit of the polymeric discotic mesomorphic compound may include a structural unit comprising an acrylate or methacrylate unit, other than the discotic mesomorphic molecular (structural) unit.

In this embodiment, as the mesomorphic compound having a memory characteristic, a rod-shaped mesomorphic compound having a memory characteristic may generally be used. Examples of such a rod-shaped mesomorphic compound (having memory characteristic) may preferably include a cholesteric liquid crystal, smectic liquid crystal, chiral smectic liquid crystal and two-frequency drive nematic liquid crystal.

The cholesteric liquid crystal may utilize its alignment state, such as planer alignment or focal conic alignment, as a memory state. As the memory state, the smectic liquid crystal can utilize a combination of a homogeneous alignment state and a homeotropic alignment state and can thermally remove the memory state. The chiral smectic liquid crystal can utilize a bistable state providing a spontaneous polarization as the memory state. The two-frequency drive nematic liquid crystal can exhibit the memory characteristic as a polymer-dispersed type liquid crystal as described in "Shingaku Giho", EID 98–189, OME 98–143 (March 1999).

The rod-shaped mesomorphic compound having a memory characteristic used in this embodiment may preferably be a liquid crystal composition comprising at least one species of the rod-shaped mesomorphic compound, more preferably be a liquid crystal composition comprising at least two species of the rod-shaped mesomorphic compound in order to provide a broader mesomorphic temperature range and optimized physical properties.

The polymeric compound having a discotic mesomorphic molecular unit in its recurring unit and the mesomorphic compound having a memory characteristic form a phase separation state in a minute region but may include a slight non-phase separation portion in some cases. It order to form a preferred scattering state, the polymeric compound may desirably assume a discotic mesomorphic (liquid crystal) phase and may preferably have a negative refractive index anisotropy. Accordingly, the polymeric compound may preferably comprise at least 50 wt. %, more preferably at least 70 wt. %, of discotic mesomorphic molecular unit. The discotic mesomorphic compound (liquid crystal) may preferably have a negative refractive index anisotropy.

The functional material as the liquid crystal composition of the present invention may preferably be prepared polymerizing a mesomorphic mixture of a photopolymerizable discotic mesomorphic compound and the mesomorphic compound having a memory characteristic with ultraviolet (UV) light to form a polymeric compound having a recurring unit including the discotic mesomorphic molecular unit, with the result that the mesomorphic compound having a memory characteristic is phase-separated in the mesomorphic mixture. In order to provide a preferred scattering state, it is possible to control a diameter of droplet by regulating a phase before or during polymerization similarly as in the ordinary polymer matrix (polymer-dispersed liquid crystal or polymer network)-type liquid crystal device.

It is also possible to prepare the liquid crystal composition (as the functional material used in the present invention) by blending separately prepared the polymeric compound having a recurring unit comprising a discotic mesomorphic molecular unit and the mesomorphic compound having a memory characteristic.

In order to impart a preferred alignment state to the mesomorphic mixture comprising the polymeric compound having discotic mesomorphic molecular unit-containing recurring unit and the mesomorphic compound having a memory characteristic, after effecting the above-mentioned steps, it is possible to effect heat treatment. By the heat treatment, the polymeric compound (having the discotic mesomorphic molecular unit-containing recurring unit) and/or the mesomorphic compound (having the memory characteristic) can effect self-organization to form a desired alignment state in some cases.

In this embodiment, the above-mentioned liquid crystal device having a cell structure shown in FIG. 2 is also usable as a liquid crystal device.

In this embodiment, when the liquid crystal device shown in FIG. 2 is supplied with a controlled electric field, an alignment state of the mesomorphic compound having the memory characteristic was changed to modulate transmitted light and reflected light. The thus-modulated light may be adopted as a display signal, so that the liquid crystal device is formulated as a display device. Further, by using an intermediate voltage signal, it is possible to readily effect an analog-like gradation display.

Referring to FIG. 2, behind the liquid crystal device or between the lower electrode and substrate, a light-absorbing plate, or, if necessary, a reflection or scattering plate in order to improve luminance or brightness (e.g., as described in IDRC '94, p. 183–) may be disposed, thus realizing a reflection-type liquid crystal display device.

FIG. 3 is an embodiment of such a reflection-type liquid crystal display device using a light-absorbing plate 6 in addition to the cell structure of FIG. 2.

(Fourth Embodiment)

According to this embodiment, there is provided a liquid crystal composition comprising a discotic mesomorphic compound and a polymeric rod-shaped mesomorphic compound are directed in an identical direction at least one state.

The discotic mesomorphic compound used in this embodiment is a mesomorphic compound (liquid crystal compound) assuming mesomorphic phase comprising a disk-shaped compound, e.g., described in "Ekisho (Kisohen)" (in Japanese), pp. 7–9, published by Baihukan K.K. Examples of the mesomorphic phase may include nematic discotic phase, discotic hexagonal phase and discotic rectangular phase but are not restricted to these phases.

The liquid crystal composition used in this embodiment may comprise at least one species of the discotic mesomorphic compound, more preferably at least two species of the discotic mesomorphic compounds for controlling various characteristics including a phase transition temperature and optical characteristics.

Examples of the discotic mesomorphic compound may be those having structural units of (D-1) to (D-20) listed above (similarly as in Second Embodiment and Third Embodiment).

The polymeric rod-shaped mesomorphic compound used in this embodiment may include those having a rod-shaped liquid crystal unit linked at a side chain or incorporated in a main chain and include a liquid crystal, such as nematic liquid crystal, cholesteric liquid crystal, smectic liquid crystal or chiral smectic liquid crystal.

The liquid crystal composition used in this embodiment may comprise at least one species of the polymeric rod-shaped mesomorphic compound, preferably at least two species of the rod-shaped mesomorphic compounds in order to provide a broader mesomorphic temperature range an optimized physical properties.

Specific examples of such a polymeric rod-shaped mesomorphic compound may include those having the following structural formulas.

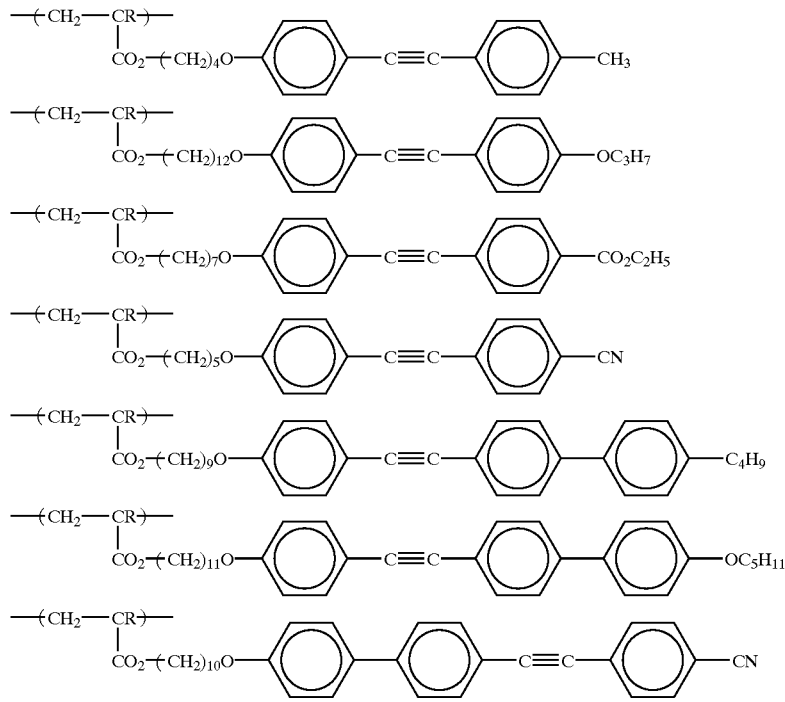

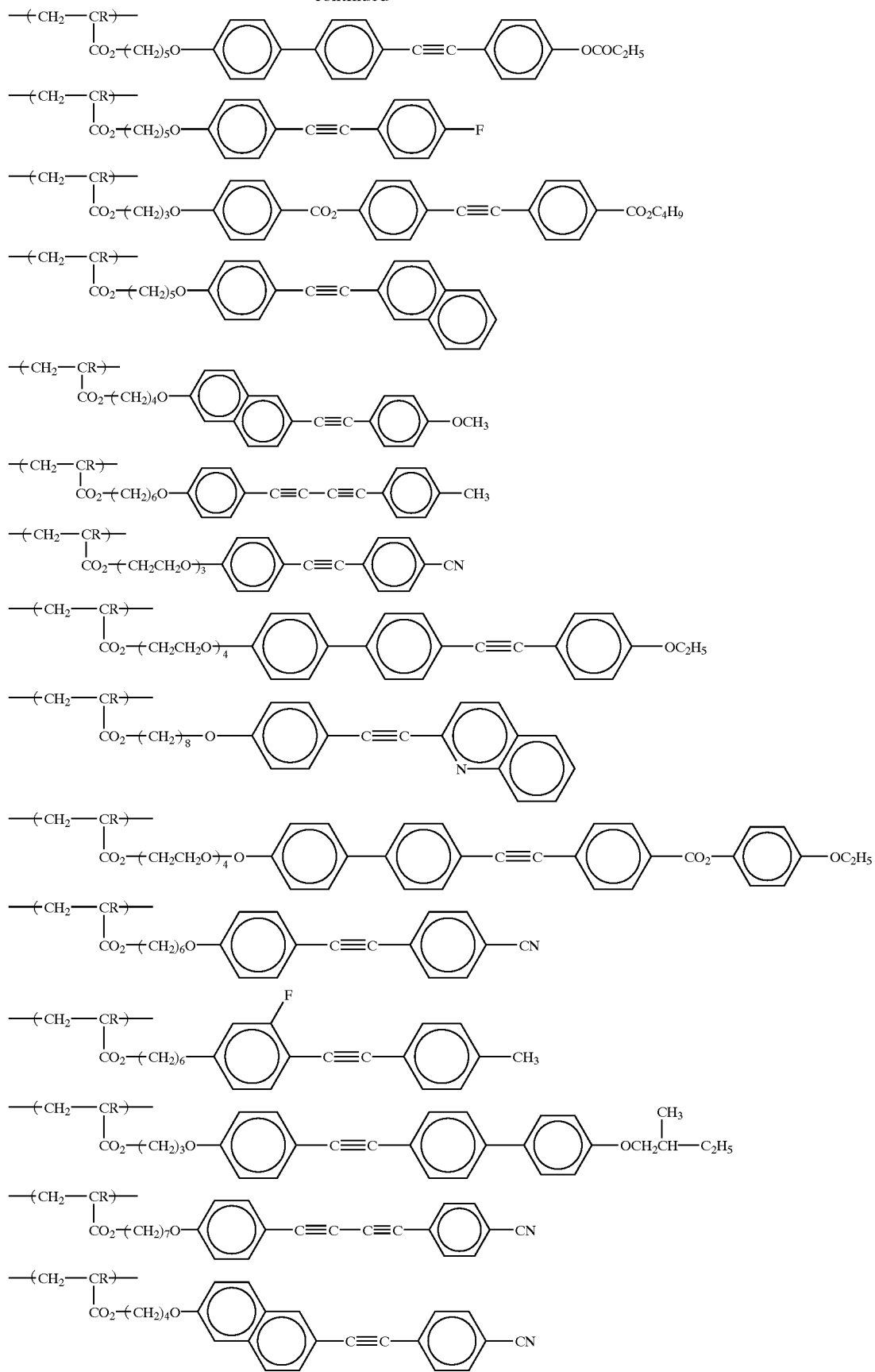

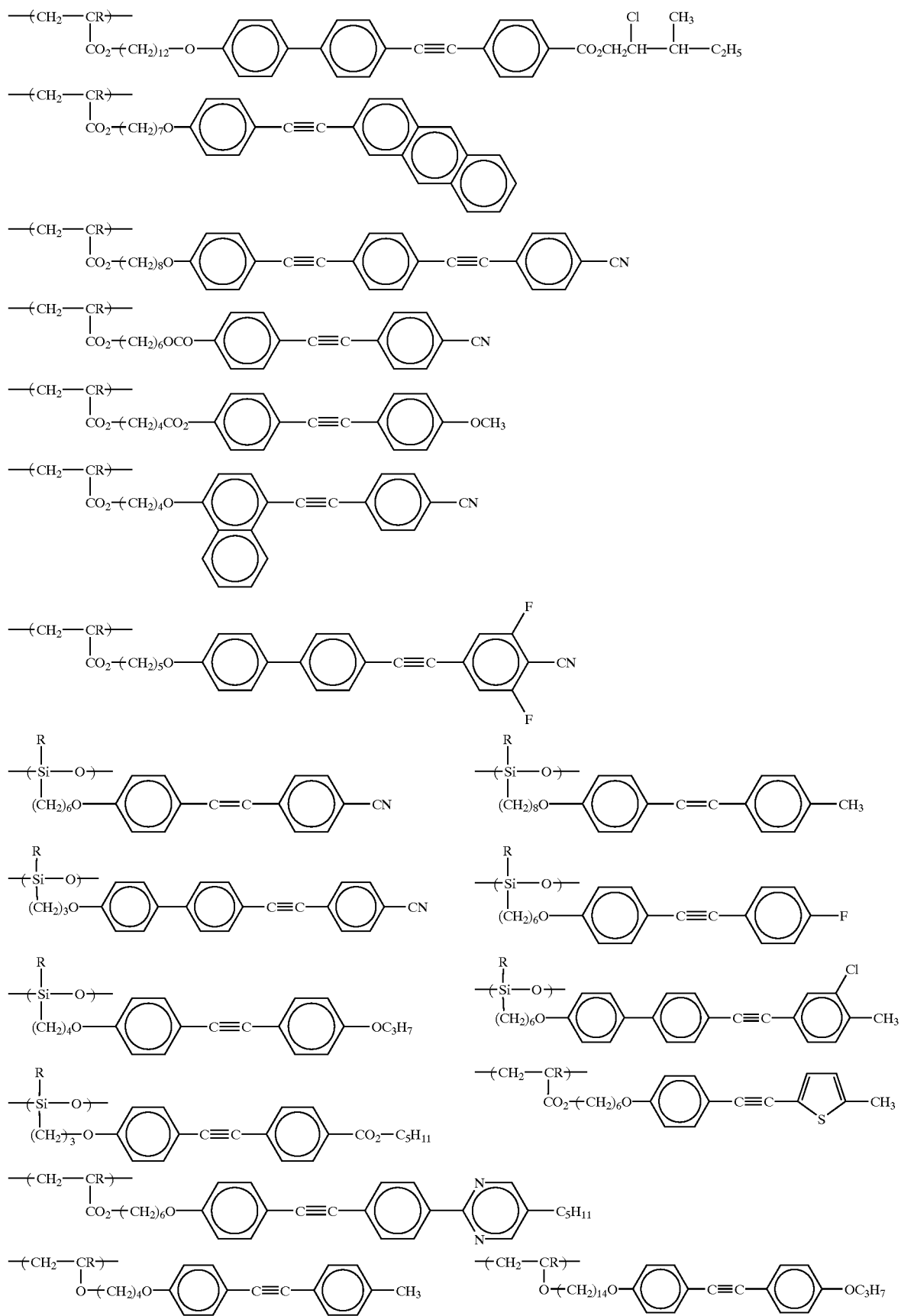

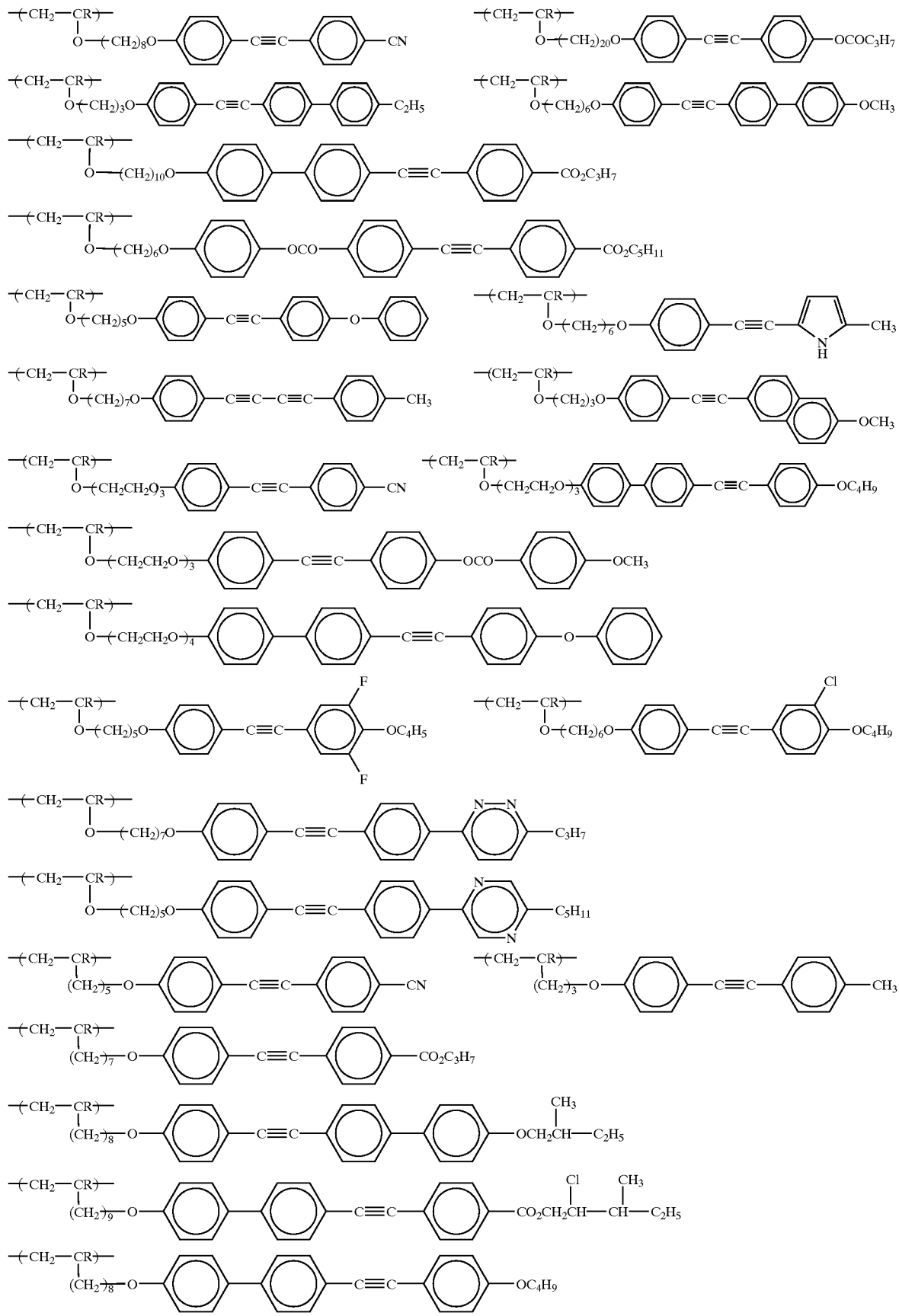

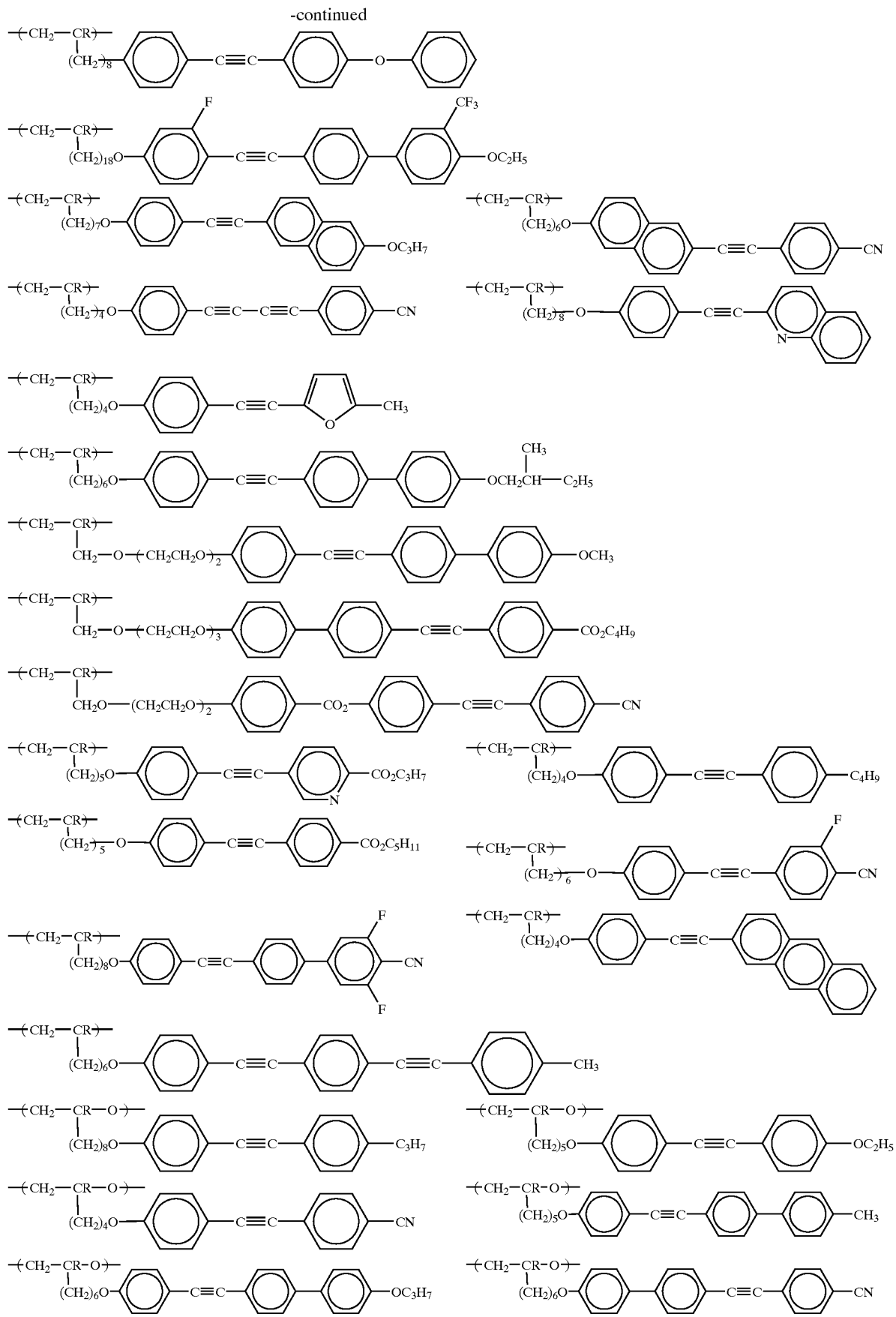

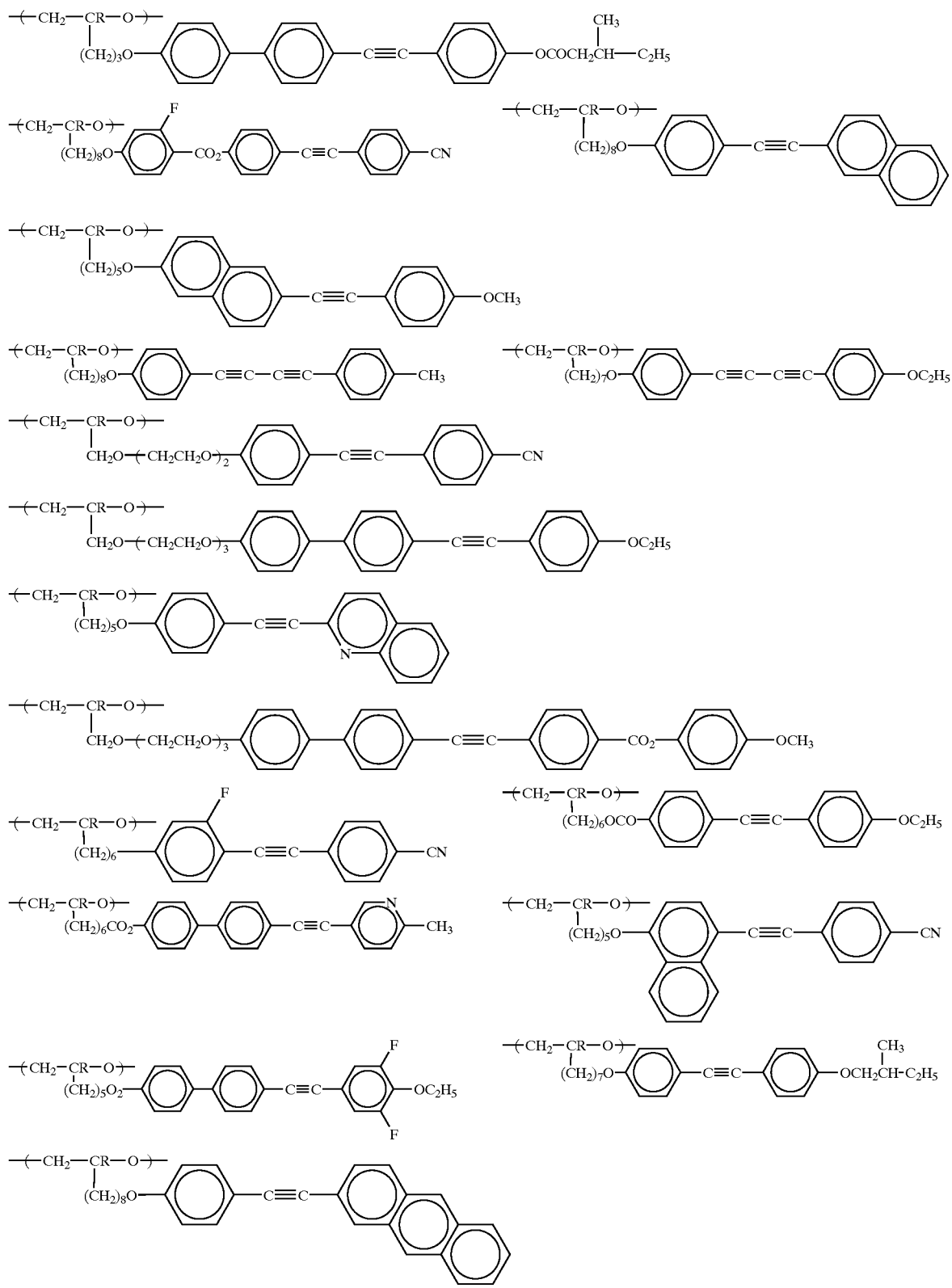

In the above formulas, R is hydrogen, halogen, an alkyl group or a phenyl group.
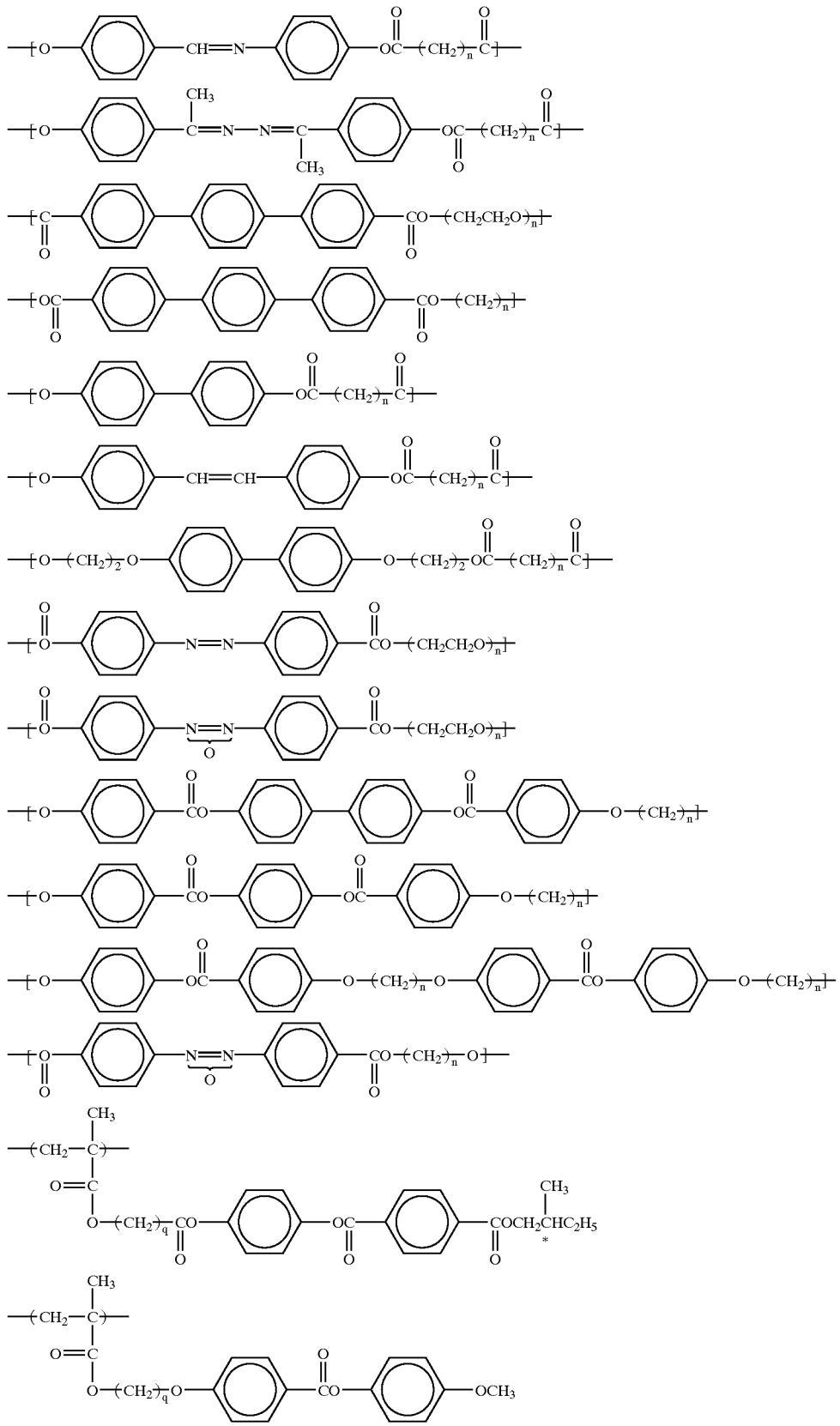

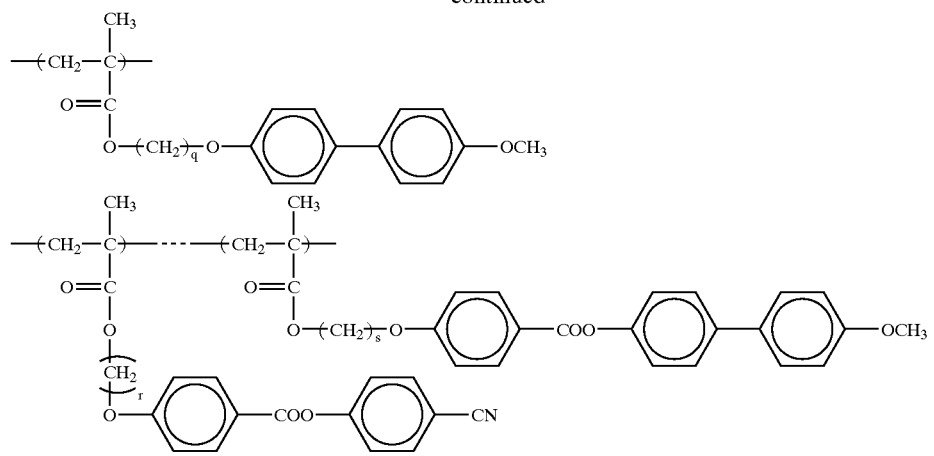
In the above formulas, q=1–18, r=1–18 and s=1–18.
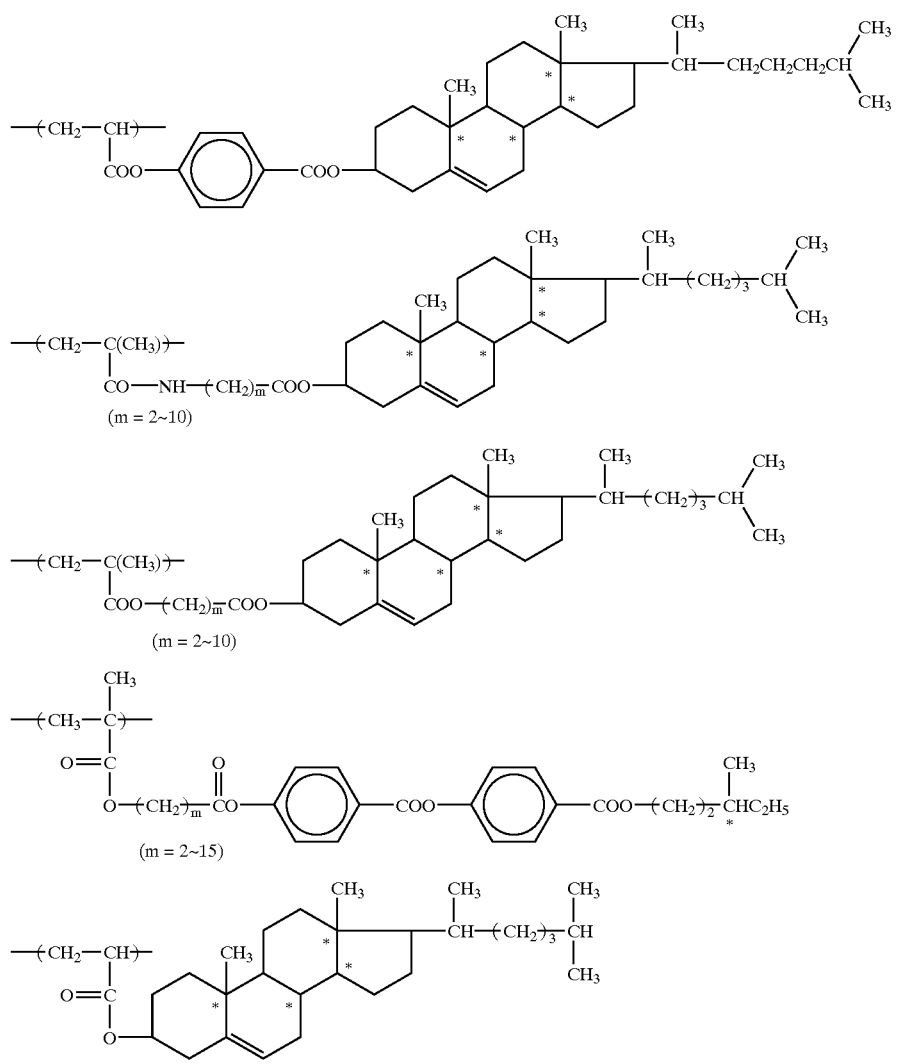

-continued
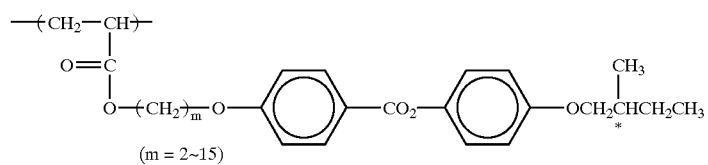
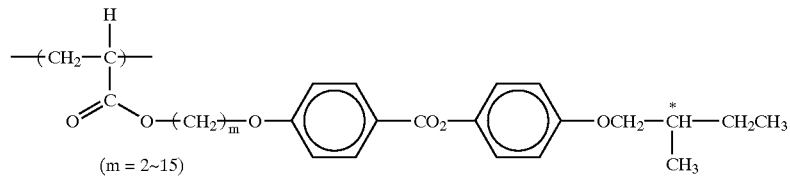
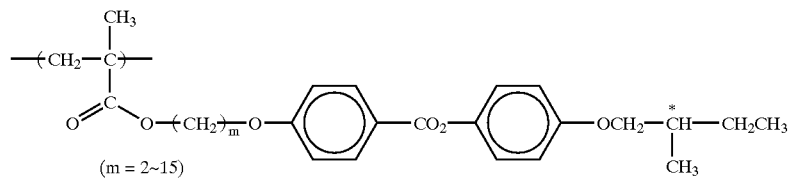
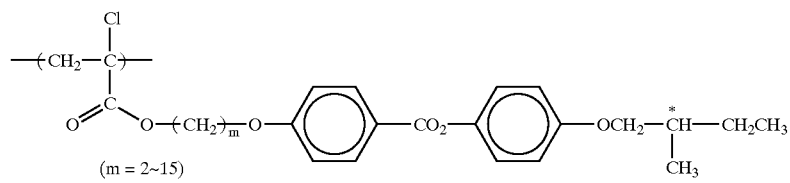
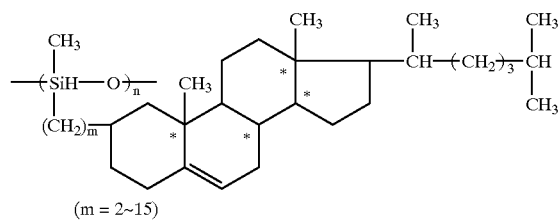
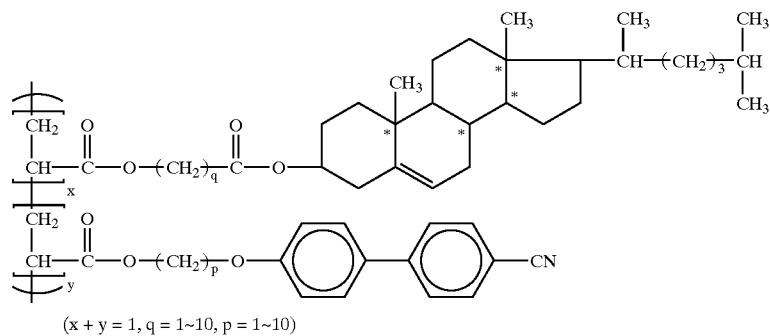
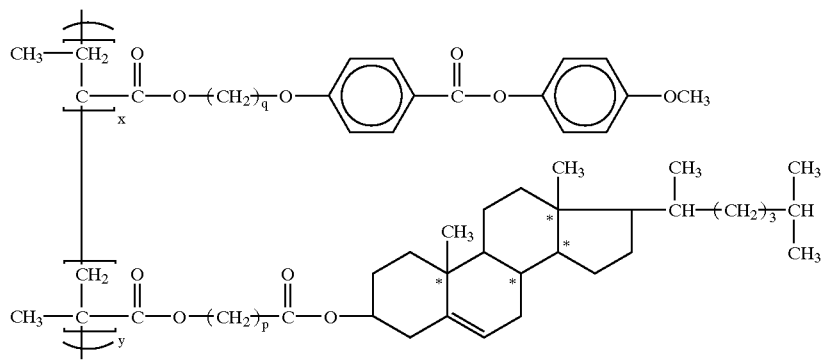

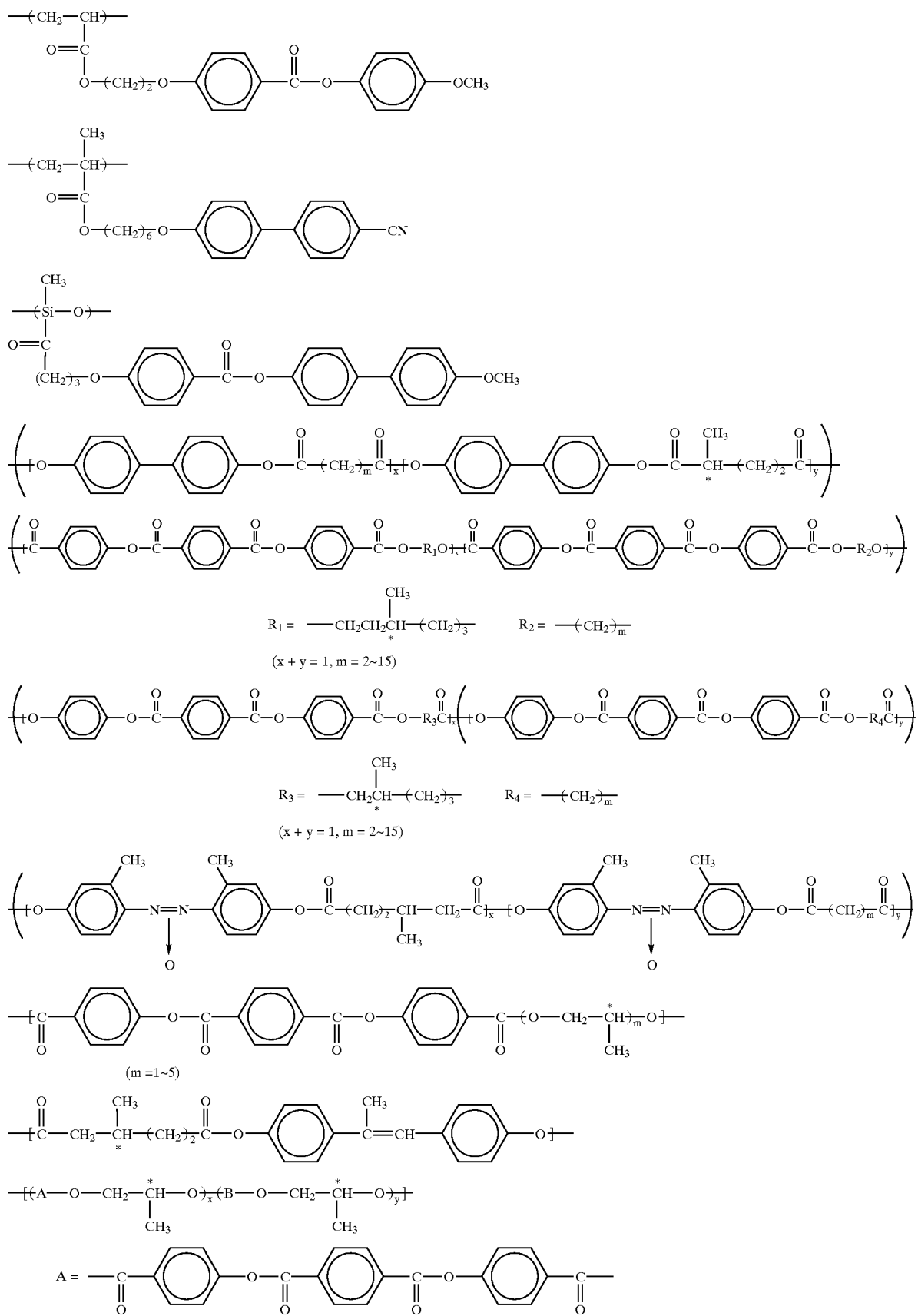

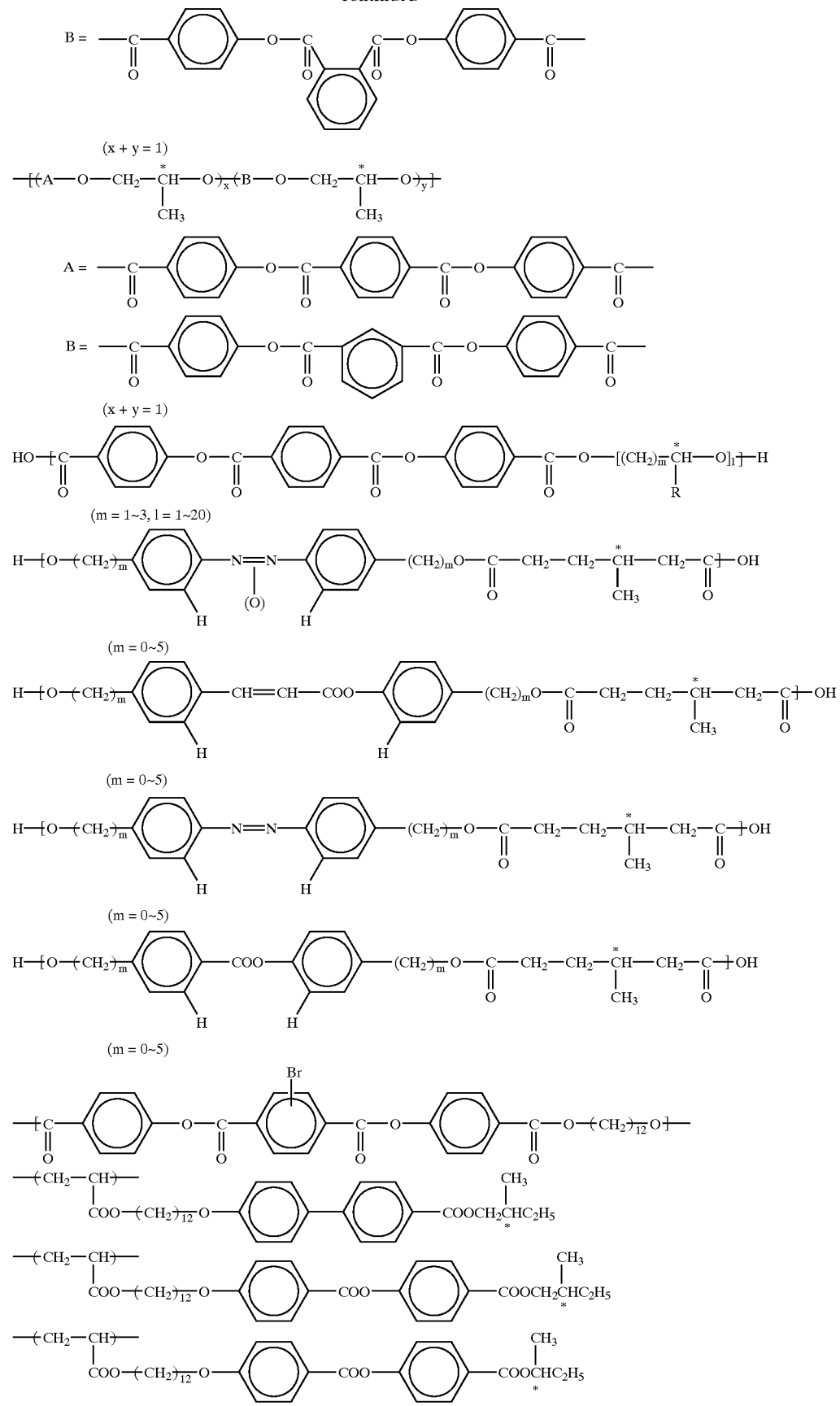

-continued

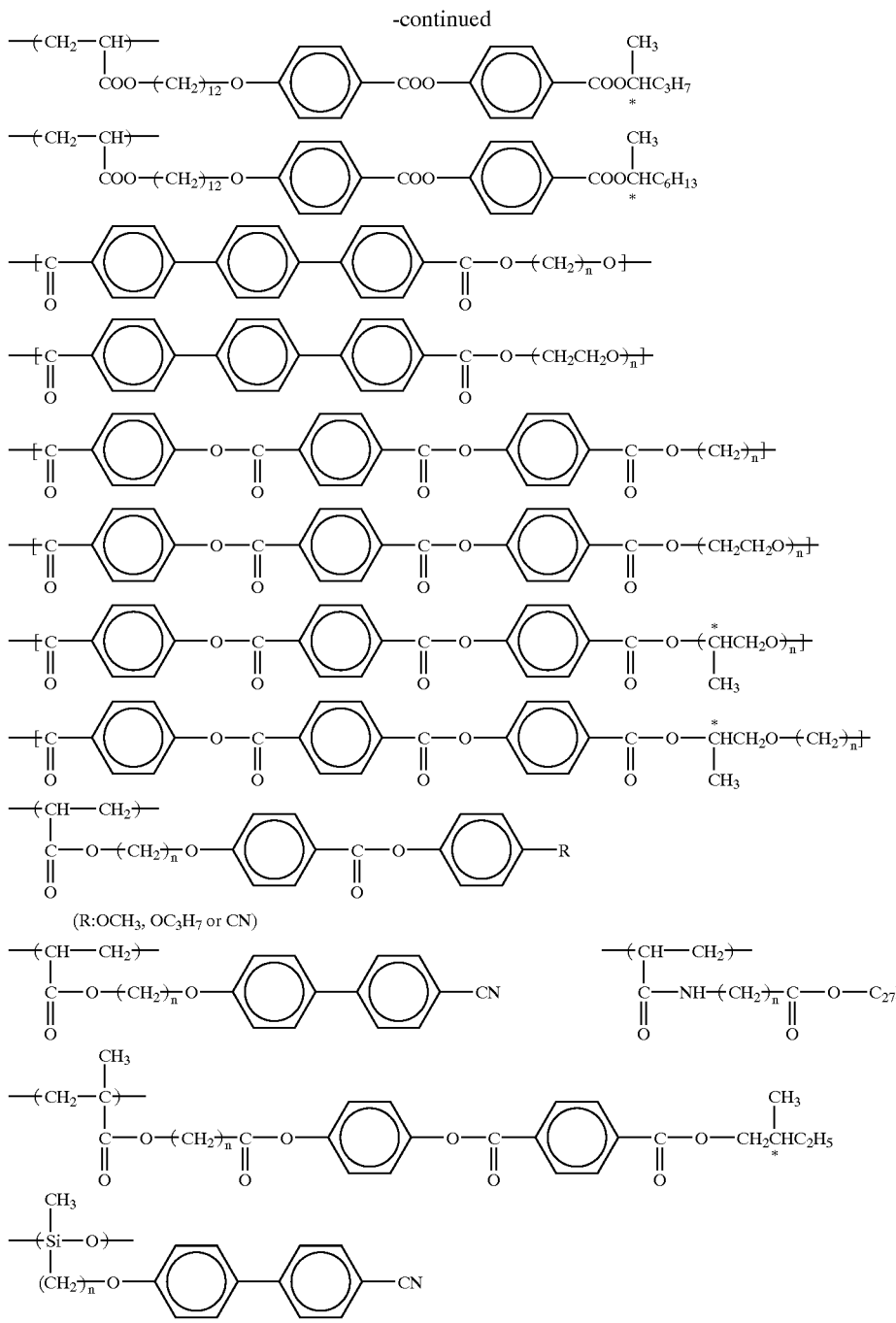

(R:OCH₃, OC₃H₇ or CN)

In the above formulas, * denotes the location of an optically active center (or of asymmetrical carbon atom), and n is an integer of 2–12.

The liquid crystal composition may be prepared in various methods, examples of which may include the following methods (1), (2) and (3):

(1) A discotic mesomorphic compound and a polymeric rod-shaped mesomorphic compound are blended and heated to form a mixture or composition.

(2) A discotic mesomorphic compound and a polymeric rod-shaped mesomorphic compound are blended and dissolved in a common solvent, followed by distilling-off of the solvent to form a mixture.

(3) A discotic mesomorphic compound and a polymerizable rod-shaped mesomorphic compound are blended to form a mixture, followed by polymerization of the polymerizable rod-shaped mesomorphic compound. The polymerization may preferably be photopolymerization with, e.g., UV-light, thus suitably sandwich the liquid crystal composition of the present invention between a pair of substrates. This is because the liquid crystal composition can be injected into a cell comprising the pair of substrates in a low-molecular weight state providing a low viscosity, not a high-molecular weight state providing a high viscosity, in advance, followed by UV light irradiation for polymerization to form a polymeric compound. Further, the low-viscosity mixture prepared by blending the discotic mesomorphic compound with the polymerizable rod-shaped mesomorphic compound is advantageous to alignment control and may particularly preferably used for preparing the liquid crystal device described later.

The discotic mesomorphic compound and the rod-shaped mesomorphic compound may each be contained in the liquid crystal composition in an amount of 1–99 wt. %, preferably 5–95 wt. %, more preferably 10–90 wt. %. Further, in the liquid crystal composition used in the present invention, it is possible to incorporate a polymerizable monomer having no discotic mesomorphism and, as desired, possible to add an antioxidant, radical scavenger, photoreaction initiator, polymerization inhibitor or accelerator, colorant, etc.

Figure 8:
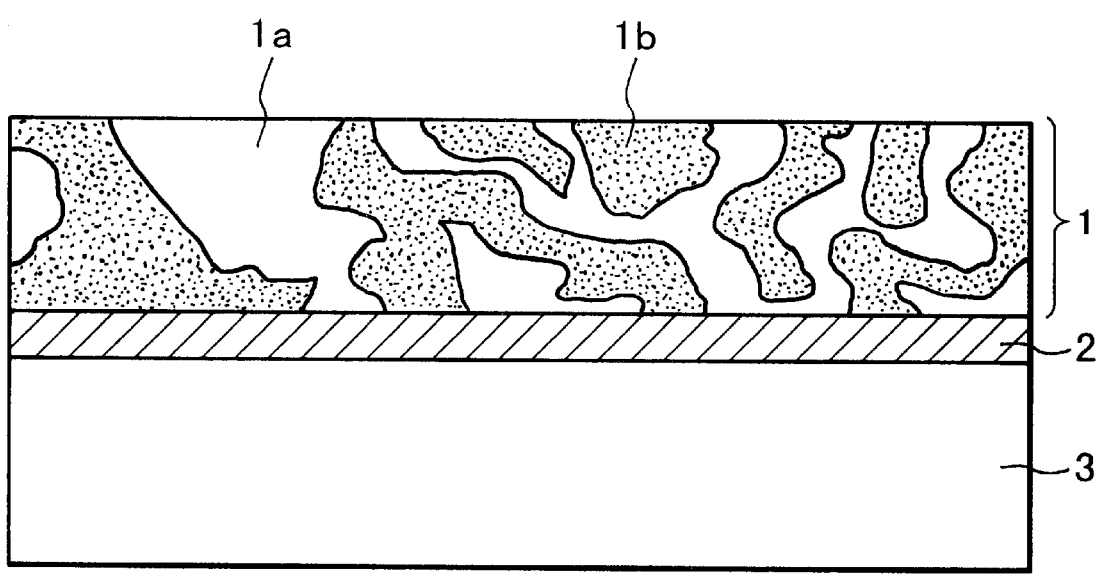
FIG. 8 is a schematic sectional view of the liquid crystal device according to Fourth Embodiment of the present invention.

The liquid crystal composition of the present invention is excellent in film-forming properties and can be disposed on a (single) substrate to provide a liquid crystal device as shown in FIG. 8. The liquid crystal device is excellent in light-scattering performance,i.e., has a high reflectance, based on the above-mentioned performances of the liquid crystal composition. The liquid crystal device of the high reflectance is applicable to a paper display device of a high brightness. FIG. 8 shows an embodiment of such a liquid crystal device.

Referring to FIG. 8, the liquid crystal device includes a substrate 3, an alignment (control) film 2 disposed on the substrate 3, and a liquid crystal layer 1 of the liquid crystal composition disposed on the alignment film 2 comprising a discotic liquid crystal phase 1a and a polymeric rod-shaped liquid crystal phase.

The liquid crystal device may, e.g., be prepared by forming a rubbed polyimide film (uniaxially aligning-treated layer) on a plastic substrate and cast-coating a mixture of a polymerizable rod-shaped mesomorphic compound containing a photopolymerization initiator and a discotic mesomorphic compound, followed by UV-light irradiation to form a liquid crystal composition layer comprising mutually phase-separated discotic mesomorphic compound and polymeric (polymerized) rod-shaped mesomorphic compound on the rubbed polyimide film.

The liquid crystal composition layer may preferably have a thickness of 1–100 μm.

The substrate 3 may be formed of glass but, in view of flexibility like paper and light weight, may preferably be plastic substrate of, e.g., polyethyleneterephthalate (PET) or polyethersulfone (PES).

The liquid crystal composition layer 1 may be disposed between the substrate 3 and another substrate.

In this embodiment, the liquid crystal device may further include a light-absorbing layer, a reflection layer and/or a color filter.

On the substrate 3b, it is possible to form an alignment control layer (e.g., 4a, 4b formed on the substrate 2a, 2b as shown in FIG. 2).

The substrate may be subjected to uniaxial alignment treatment (e.g., rubbing of the alignment control layer), thus controlling an alignment state of the liquid crystal composition. It is also possible to control a viewing angle dependence for light scattering due to a difference in refractive index. Accordingly, such control (or alignment treatment) is effective for providing brighter images in desired viewing direction.

The liquid crystal device of the present invention as shown in FIG. 8 can effect image display through heat treatment or light irradiation. For instance, the image display can be effected by thermal writing with a thermal head, which is like the mechanism described in JP-A 2-576. Specifically, a thermally written portion is once heated to isotropic liquid (phase) state and quickly cooled from the isotropic liquid state to pass through a glass transition temperature at a higher cooling rate. During the rapid cooling step, a liquid crystal (mesomorphic) phase formation of the portion is suppressed, so that the liquid crystal alignment state at the thermally written portion is fixed in a state largely different from that of a portion which has not been thermally written. As a result, the difference in alignment state between the thermally written portion and the other portion leads to a contrast. In this regard, the glass transition temperature of the rod-shaped mesomorphic compound may preferably be at least a room temperature.

It is also possible to effect information (data) writing with laser light.

Further, the above-mentioned fixed written state after the writing can retain a scattering state in a static state under no application of external field such as heating or light irradiation. Thus, it is unnecessary to effect heat treatment or light irradiation at the time other than rewriting or display. As a result, it is possible to apply a low power consumption-type paper display.

(Fifth Embodiment)

In this embodiment, there is provided a liquid crystal device by utilizing such an alignment state that a discotic liquid crystal and a rod-shaped nematic liquid crystal are co-present in a mutual phase separation state and their directors are directed in an identical direction, thus realizing a liquid crystal device, optical modulation device, display device and liquid crystal apparatus, of low power consumption, high luminance and high performances. Further, a mixture of a polymerizable discotic liquid crystal and a rod-shaped liquid crystal composition comprising at least one species of a rod-shaped nematic liquid crystal is subjected to polymerization of the polymerizable discotic liquid crystal in a phase separation state of the rod-shaped nematic liquid crystal or the discotic liquid crystal, thus preparing an excellent polymer-dispersed type or polymer network-type liquid crystal device.

As described above, in the liquid crystal device in this embodiment, the liquid crystal composition is placed in such an alignment state that the discotic liquid crystal and the rod-shaped nematic liquid crystal are co-present in a mutually phase-separated state and their director directions are identical to each other.

Examples of the discotic liquid crystal may include the discotic mesomorphic compound used in Second Embodiment.

The rod-shaped nematic liquid crystal used as another component of the liquid crystal mixture (composition) according to this embodiment may be a nematic liquid crystal assuming nematic phase or cholesteric phase, and at least one species of the rod-shaped nematic liquid crystal may be contained in the mixture. The rod-shaped nematic liquid crystal may preferably be a liquid crystal composition comprising a combination of plural species of rod-shaped nematic liquid crystals in order to broaden a mesomorphic (liquid crystal) temperature range or optimize various physical properties. The nematic liquid crystal may frequently be used in ordinary liquid crystal displays and is a rod-shaped liquid crystal suitable for providing stable driving characteristics under an ordinary operation environment.

Referring again to FIG. 1, the above-mentioned alignment state wherein (alignment) directors of the discotic liquid crystal and the rod-shaped nematic liquid crystal are directed in an identical direction, i.e., a state such that differences in refractive index in the respective directions are made maximum is assumed to be a state providing a very high light-scattering state. Based on such an assumption, we have confirmed that the high light-scattering state can be provided by placing the liquid crystal mixture in such an alignment state that the discotic liquid crystal and the rod-shaped nematic liquid crystal are mutually phase-separated in the liquid crystal mixture layer while retaining their directors in an identical direction.

In this embodiment, the liquid crystal device utilizing the high light-scattering state and a changing the alignment state of the rod-shaped nematic liquid crystal by switching to provide a display signal may preferably be adopted. As a typical example thereof, a polymer-dispersed liquid crystal or polymer network-type liquid crystal may advantageously used. In this case, the above-mentioned alignment state of the liquid crystal mixture requires control of alignment of the discotic mesomorphic compound as a matrix polymer. For this purpose, it is preferred to develop a discotic liquid crystal (mesomorphic) phase before polymerization or in an initial polymerization stage. The thus-developed discotic liquid crystal phase may be alignment-controlled by aligning treatment. In order to place the discotic liquid crystal in, e.g., a side-on alignment state such that a disk-shaped molecular portion is aligned in parallel with the substrates, it is possible to use methods including one using an alignment film providing a low pretilt angle, one setting a smaller cell gap and one using a combination thereof. The smaller cell gap may preferably be at most 50 $\mu$m. In the case where the director of the rod-shaped nematic liquid crystal is aligned with that of the discotic liquid crystal, the rod-shaped nematic liquid crystal is placed in a homeotropic alignment state. In this case, the rod-shaped nematic liquid crystal may preferably have a positive dielectric anisotropy, i.e., P-type liquid crystal, since such a homeotropic alignment state can readily be formed by application of an electric field, thus realizing a desired alignment state as mentioned above with respect to the combination of the discotic liquid crystal and the rod-shaped nematic liquid crystal.

The liquid crystal device used in this embodiment may have a cell structure as shown in FIG. 2 similarly as in First to Fourth Embodiments.

The liquid crystal device in this embodiment may preferably be prepared polymerizing a mesomorphic mixture (liquid crystal composition) of a photopolymerizable discotic liquid crystal and one or two or more species of the rod-shaped nematic liquid crystals (rod-shaped liquid crystal composition) with ultraviolet (UV) light to form a polymeric discotic liquid crystal having a recurring unit including the discotic mesomorphic molecular unit to promote phase separation of the rod-shaped liquid crystal phase, with the result that mutually phase-separated discotic liquid crystal phase and rod-shaped liquid crystal phase and formed in the mesomorphic mixture. In order to provide a preferred scattering state, it is possible to control a diameter of droplet by regulating a phase before or during polymerization similarly as in the ordinary polymer matrix (polymer-dispersed or polymer network)-type liquid crystal device.

It is also possible to prepare the liquid crystal composition (as the functional material used in the present invention) by blending separately prepared the polymeric compound having a recurring unit comprising a discotic mesomorphic molecular unit and the mesomorphic compound having a memory characteristic.

In order to impart a preferred alignment state to the mesomorphic mixture comprising the polymeric discotic mesomorphic compound and the rod-shaped mesomorphic compound (liquid crystal composition), after effecting the above-mentioned steps, it is possible to effect heat treatment. By the heat treatment, the polymeric discotic mesomorphic compound and/or the mesomorphic compound (having the memory characteristic) can effect self-organization to form a desired alignment state in some cases.

The above-mentioned mesomorphic mixture or composition (functional material) comprising the polymeric discotic liquid crystal and the rod-shaped liquid crystal (composition) may comprise 1–99 wt. %, preferably 5–95 wt. %, more preferably 10–90 wt. %, of each of the polymeric discotic liquid crystal and the rod-shaped liquid crystal (composition), in view of scattering performance and development of their physical properties. The mesomorphic mixture may further contain additives, such as an antioxidant, radical scavenger, photoreaction initiator, polymerization inhibitor, colorant, etc., as desired.

In order to provide further preferred scattering state and alignment state, it is effective to perform a step of polymerizing a polymerizable discotic liquid crystal in a phase separation state of a mixture comprising the polymerizable discotic liquid crystal and the rod-shaped nematic liquid crystal (composition) since the alignment control of the discotic liquid crystal can readily be effected as described above and it is possible to further promote the phase separation between the discotic liquid crystal and the rod-shaped liquid crystal to obtain a higher light-scattering state. In the case of insufficient phase separation, isotropic liquid phase due to the discotic liquid crystal and the rod-shaped liquid crystal can still remain in the liquid crystal layer, thus lowering the light-scattering performance.

In order to impart an alignment characteristic to either one or both of the discotic liquid crystal and the rod-shaped nematic liquid crystal, it is also effective to subject the substrates to aligning treatment (e.g., formation of a uniaxial alignment control layer thereon).

The uniaxial alignment control layer may be formed by forming a film an inorganic or (insulating) organic material by solution coating, vapor deposition, sputtering, etc., and rubbing the film with a fibrous material, such as velvet, cloth or paper (uniaxial aligning treatment). Examples of the inorganic material may include: silicon monoxide, silicon dioxide, aluminum oxide, zirconium oxide, magnesium fluoride, cerium oxide, cerium fluoride, silicon nitride, silicon carbide and boron nitride. Example of the organic material may include: polyvinyl alcohol, polyimide, polyamideimide, polyester, polyamide, polyesterimide, polyparaxylylene, polycarbonate, polyvinyl acetal, polyvinyl chloride, polystyrene, polysiloxane, cellulosic resin, melamine resin, urea resin and acrylic resin. It is also possible to form such an alignment control layer by oblique vapor deposition, i.e., vapor deposition in an oblique direction onto a substrate, of an oxide, such as SiO, or a nitride, to form a film provided with a uniaxial alignment control force.

Particularly, it is preferred to use a rubbed polyimide film as the uniaxial alignment control layer in order to obtain a good uniaxial alignment characteristic. An ordinary polyimide film may be formed by wet-coating of a polyamic acid (precursor of condensation-crosslinking agent) and curing thereof. The polymeric acid is readily dissolved in a solvent, thus being excellent in producibility. In recent years, a solvent-soluble polyimide may be available as a product, thus being preferably used in view of its good uniaxial alignment performance and high productivity.

In this embodiment, as the rod-shaped nematic liquid crystal, a liquid crystal having a memory characteristic, such as two-frequency drive nematic liquid crystal. The two-frequency drive nematic liquid crystal can exhibit the memory characteristic as a polymer-dispersed type liquid crystal as described in "Shingaku Giho", EID 98-189, OME 98-143 (March 1999).

The rod-shaped nematic liquid crystal having a memory characteristic used in this embodiment may preferably be a liquid crystal composition comprising at least one species f the rod-shaped nematic liquid crystal, more preferably be a liquid crystal composition comprising at least two species of the rod-shaped nematic liquid crystals in order to provide a broader mesomorphic temperature range and optimized physical properties.

As described above, the liquid crystal composition used in the present invention as the functional material can be adopted in a liquid crystal device excellent in luminance without using a backlight being an electric power source requiring a larger energy consumption.

Further, when the liquid crystal (composition) having the memory characteristic is used as a switching liquid crystal, a resultant liquid crystal device is not required to be driven all the time, thus considerably contributing to reduction of drive power consumption. As a result, even compared with known liquid crystal devices of power saving-type, it is considered to be an excellent liquid crystal device.

Hereinbelow, the present invention will be specifically described based on examples.

(For First Embodiment)

EXAMPLE 1

A mesomorphic mixture (1) was prepared by mixing a polymerizable discotic mesomorphic compound A shown below with a rod-shaped mesomorphic compound B shown below in a weight ratio A/B=50/50, and a mesomorphic mixture (2) was prepared by mixing the polymerizable discotic mesomorphic compound A with a nematic liquid crystal composition (as rod-shaped mesomorphic compound) shown below in a weight ratio A/C=50/50. The respective compounds (or composition) were mixed in an isotropic liquid state. The mesomorphic mixture (2) showed isotropic phase at room temperature.

<Polymerizable Discotic Mesomorphic Compound A>

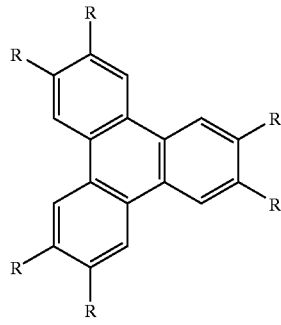

R: —O(CH$_2$)$_6$—OCOCH=CH$_2$

Phase Transition Temperature (° C.)

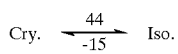

Cry.: crystal phase
Iso.: isotropic phase

<P-type Rod-shaped Mesomorphic Compound B>

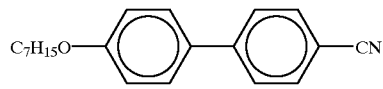

Phase Transition Temperature (° C.)

N: nematic phase.

<Nematic Liquid Crystal Composition C>
Fluorine-containing nematic liquid crystal composition ("KN-5030", mfd. by Chisso K.K.)
Phase Transition Temperature (° C.)

Δ∈ (dielectric anisotropy)=+10
Black cells AA, AB and B were prepared in the following manner.

<Cell AA>
Two 1.1 mm-thick glass substrates were each coated with ca. 70 nm-thick ITO (indium tin oxide) film as a transparent electrode.

On one of the glass substrates, 0.01 wt. %-dispersion of resinous spacer beads (average particle size=6 μm) in isopropyl alcohol (IPA) was spin-coated for 10 sec. at a speed of 1500 rpm and a dispersion density of 100 (particles)/mm$^2$ and thereon, a thermosetting-type liquid adhesive was coated by printing method. Thereafter, the other glass substrate provided with the ITO film was superposed on the above-treated glass substrate, followed by hot curing in an oven at 150° C. for 90 min. to prepare a (black) cell AA.

<Cell AB>
A cell AB was prepared in the same manner as in Cell AA except that the particle size (6 μm) of the resinous spacer beads was changed to 10 μm.

<Cell B>
Two 1.1 mm-thick glass substrates were each coated with a 2.1 wt. %-solution of a polyamic acid (polyimide precursor) having a recurring unit shown below by spin coating at 500 rpm for 5 sec. (1st coating) and at 1500 rpm for 30 sec. (2nd coating).

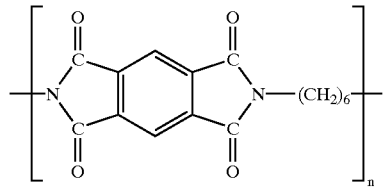

Thereafter, each of the wet coating on the glass substrates was pre-dried at 80° C. for 5 min. and hot baking at 220° C. for 1 hour, followed by rubbing treatment (as uniaxial aligning treatment) with a nylon cloth to form a polyimide alignment control film.

On one of the glass substrates, 0.01 wt. %-dispersion of resinous spacer beads (average particle size=6 μm) in isopropyl alcohol (IPA) was spin-coated for 10 sec. at a speed of 1500 rpm and a dispersion density of 100 (particles)/mm$^2$ and thereon, a thermosetting-type liquid adhesive was coated by printing method. Thereafter, the other glass substrate provided with the ITO film was superposed on the above-treated glass substrate so that their rubbing axes were directed in parallel and identical to each other, followed by hot curing in an oven at 150° C. for 90 min. to prepare a (black) cell B.

Six liquid crystal devices were prepared based on combinations of the mesomorphic mixtures (1) and (2) with the (blank) cells AA, AB and B in the following manner.

To each of the mesomorphic mixtures (1) and (2), 200 ppm of 2,6-ditertiallybutyl-4-methylphenol and 2 wt. % of a photopolymerization initiator ("Irgacure 184", mfd. by Ciba-Geigy Corp.). Into each of the cells AA, AB and B, each of the mesomorphic mixtures (1) and (2) was injected at 60° C. under normal pressure and then exposed to ultraviolet (UV) light (ca. 12 mW/cm$^2$, center wavelength= 365 nm) for 3 min. to prepare a polymer matrix-type liquid crystal cell (device).

In all the liquid crystal cells, it was confirmed that the resultant rod-shaped mesomorphic compound (liquid crystal) was well phase-separated from the resultant polymer matrix. Further, when each of the liquid crystal cells was observed through a polarizing microscope while heating with a hot stage (mfd. by Metlar Co.), a phase transition from nematic phase to isotropic phase of the rod-shaped mesomorphic compound was confirmed at a temperature substantially identical to the phase transition temperature before mixing with the polymerizable discotic mesomorphic compound A. Accordingly, it was formed that the polymerizable discotic mesomorphic compound A was polymerized substantially completely to form a polymeric compound comprising a discotic mesomorphic (liquid crystal) component as a recurring unit.

In the liquid crystal cells using the blank cells B (including the mesomorphic mixtures (1) and (2)), it was confirmed under the polarizing microscope observation that molecules of the rod-shaped mesomorphic compound were uniaxially aligned sufficiently.

Thereafter, when each of the liquid crystal cells was heated to 220° C. and then gradually cooled to room temperature at 0.5° C./min., a good scattering state was confirmed by eye observation in all the liquid crystal cells.

In both the liquid crystal cells using the blank cells B, the uniaxial alignment state was maintained after the cycle of heating and cooling.

Comparative Example 1

A comparative mesomorphic mixture was prepared by mixing hexylenediarylate (in place of the polymerizable discotic mesomorphic compound A) with the nematic liquid crystal composition (rod-shaped mesomorphic compound) C in a weight ratio (hexylenediacrylate/C)=50/50.

A comparative polymer matrix-type liquid crystal cell (device) was prepared in the same manner as in Example 1 except that the comparative mesomorphic mixture was injected into the (blank) cell AB.

Each of the thus-prepared seven liquid crystal cells was provided with a black light-absorbing plate at the back thereof and subjected to eye observation under room light (fluorescent lighting) condition with respect to scattered light and reflected light.

As a result, compared with the comparative liquid crystal cell (prepared in Comparative Example 1), other six liquid crystal cells (prepared in Example 1) were found to provide a higher scattering state observable by eyes as a clear difference from that of the comparative liquid crystal cell.

Further, when the comparative liquid crystal cell and three liquid crystal cells using the mesomorphic mixture (2) (in combination with the blank cells AA, AB and B) each provided with the black light-absorbing plate were subjected to measurement of reflected light intensity in a direction (at an incident angle of 30 degrees and a reflection angle of 37 degrees) by using an automatic polarizing photometer ("GP-200", mfd. by K.K. Murakami Sikisaigijutsu Kenkyusho).

As result, the liquid crystal cells using the blank cells AA, AB and B showed reflected light intensities which were 2.8 times, 4.5 times and 3.0 times, respectively, that of the comparative liquid crystal cell (prepared in Comparative Example 1).

Further, when the liquid crystal cell using the blank cell B (in combination with the mesomorphic mixture (2)) was supplied with an electric field (10 V, 60 Hz), the resultant reflected light intensity was increased by 28% compared with that under no electric field application. Accordingly, it was confirmed that the scattered light was optically modulated by the application of the electric field.

EXAMPLE 2

The liquid crystal cell (device) using the blank cell B filled with the mesomorphic mixture (2) prepared in Example 1 was used as liquid crystal devices 303a, 303b and 303c for a projection optical system shown in FIG. 4.

When light from a light source 301 was projected onto a screen through the liquid crystal devices 303a, 303b and 303c under application of an electric field (5 V, 60 Hz) and under no electric field application.

As a result, a clear change in luminance on the screen was confirmed between the electric field application state and the state of no electric field application was confirmed.

EXAMPLE 3

Figure 7:
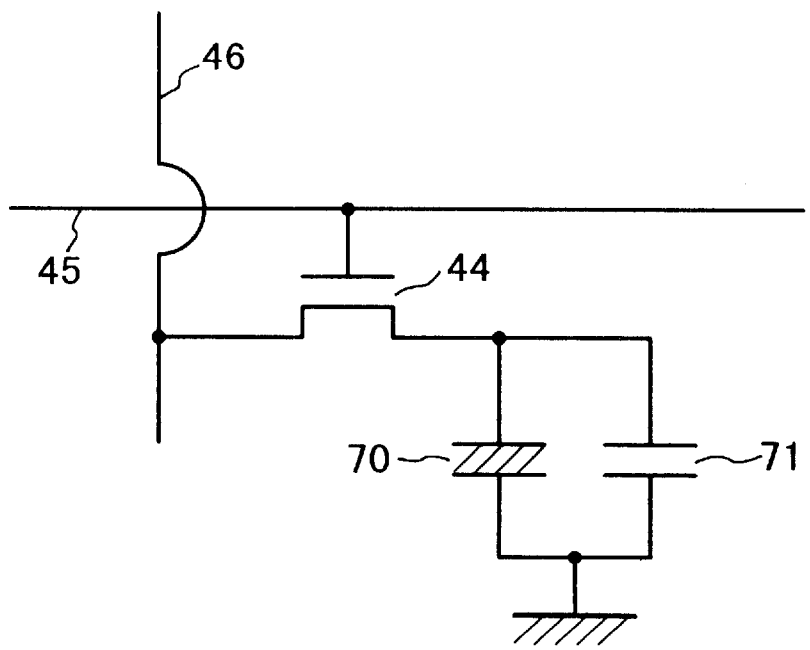
FIG. 7 is an equivalent circuit view for one pixel of the liquid crystal (using the active elements) of the present invention.

An active liquid crystal device having an equivalent circuit as shown in FIG. 7 was prepared by using a single-crystalline silicon transistor 44 (on-resistance of 50 ohm), a liquid crystal cell (pixel size: 0.9 cm$^2$) 70 using the blank cell B in combination with the mesomorphic mixture (2) (used in Example 1), and a ceramic capacitor 71 (2 nF).

When the thus-prepared liquid crystal device was supplied with a voltage signal (frame frequency=10 Hz) comprising a gate signal (selection period=30 μsec) from a gate signal line 45 and a voltage signal (in sequence of 6 V, −6 V, 6 V, −6 V, 0 V, 0 V, 0 V and 0 V) from a data signal line 46, modulated light was observed through a polarizing microscope.

As described above, according to the present invention, it is possible to provide a polymer matrix-type liquid crystal device which does not require a polarizer and can be driven with a higher brightness (luminance) and at a lower power consumption compared with the conventional polymer matrix-type liquid crystal device. Further, it is also possible to provide a mesomorphic mixture as a functional material suitable for the polymer matrix-type liquid crystal device according to the present invention.

(For Second Embodiment)

EXAMPLE 4

A mesomorphic mixture (3) was prepared by mixing a polymerizable discotic mesomorphic compound A shown below with a rod-shaped mesomorphic compound B shown below in a weight ratio A/B=50/50, and a mesomorphic mixture (4) was prepared by mixing the polymerizable discotic mesomorphic compound A with the rod-shaped mesomorphic compound B in a weight ratio A/B=25/75. The respective compounds (or composition) were mixed in an isotropic liquid state.

<Polymerizable Discotic Mesomorphic Compound A>

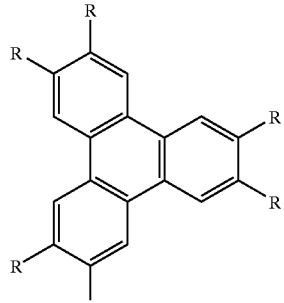

R: R$_1$ or R$_2$
R$_1$: —OCOPhO (CH$_2$)$_7$CH$_3$
R$_2$: —OCOPhO (CH$_2$)$_{11}$—OCOCH═CH$_2$
Ph=

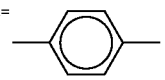

The mesomorphic compound A was a mixture of a1 (R$_1$/R$_2$=5/1 by mol), a2 (R$_1$/R$_2$=4/2) and a3 (R$_1$/R$_2$=3/3) in a weight ratio (a1:a2:a3)=22:59:16.

Phase Transition Temperature (° C.)

Dr: discotic rectangular phase,
Nd: nematic discotic phase.

<Rod-shaped Mesomorphic Compound B>

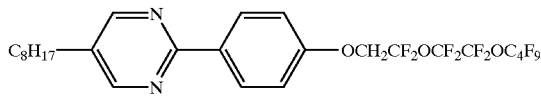

Phase Transition Temperature (° C.)

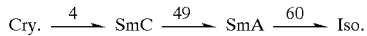

SmC: smectic C phase,
SmA: smectic A phase.

Three blank cells α1 and three blank cells α2 were each prepared in the following manner.

Two 1.1 mm-thick glass substrates were each coated with ca. 70 nm-thick ITO film (transparent electrode) and further coated with a 2.1 wt. %-solution of a polyamic acid (polyimide precursor) having a recurring unit shown below by spin coating at 500 rpm for 5 sec. (1st coating) and at 1500 rpm for 30 sec. (2nd coating).

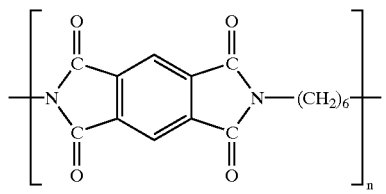

Thereafter, each of the wet coating on the glass substrates was pre-dried at 80° C. for 5 min. and hot baking at 220° C. for 1 hour, followed by rubbing treatment (as uniaxial aligning treatment) or no rubbing treatment to form a rubbed or non-rubbed polyimide alignment control film.

On one of the glass substrates, 0.01 wt. %-dispersion of resinous spacer beads (average particle size=6 μm) in IPA was spin-coated for 10 sec. at a speed of 1500 rpm and a dispersion density of 100 (particles)/mm$^2$ and thereon, a thermosetting-type liquid adhesive was coated by printing method. Thereafter, the other glass substrate provided with the ITO film was superposed on the above-treated glass substrate so that their ribbing axes were directed in parallel and identical to each other (in the case of using the rubbed polyimide films), followed by hot curing in an oven at 150° C. for 90 min. to prepare six blank cells including three rubbing-treated cells α1 and three cells α2 which had not been subjected to rubbing treatment.

Six liquid crystal devices were prepared based on combinations of the mesomorphic mixtures (3) and (4) with the (blank) cells α1 and α2 in the following manner.

To each of the mesomorphic mixtures (3) and (4), 200 ppm of 2,6-ditertiallybutyl-4-methylphenol and 2 wt. % of a photopolymerization initiator ("Irgacure 184", mfd. by Ciba-Geigy Corp.). Into each of the cells α1 and α2, each of the mesomorphic mixtures (3) and (4) was injected at room temperature, 40° C. and 50° C. under normal pressure and then exposed to ultraviolet (UV) light (ca. 12 mW/cm$^2$, center wavelength=365 nm) for 10 min. to prepare a polymer matrix-type liquid crystal cell (device).

In all the liquid crystal cells, it was confirmed that the resultant rod-shaped mesomorphic compound (liquid crystal) was well phase-separated from the resultant polymer matrix. Further, when each of the liquid crystal cells was observed through a polarizing microscope while heating with a hot stage (mfd. by Metlar Co.), a phase transition from smectic A phase to isotropic phase of the rod-shaped mesomorphic compound was confirmed at a temperature substantially identical to the phase transition temperature before mixing with the polymerizable discotic mesomorphic compound A. Further, slight polarized light due to the discotic liquid crystal phase was observed also at a temperature higher than the phase transition temperature to isotropic phase of the rod-shaped mesomorphic compound B. Thus, the resultant discotic polymer was found to assume a mesomorphism. The polarized light intensity was considerably decreased when compared with a state such that the rod-shaped mesomorphic compound was placed in a mesomorphic phase. Further, the slight polarized light due to the discotic mesomorphic compound was still retained at 200° C. Accordingly, it was formed that the polymerizable discotic mesomorphic compound A was polymerized substantially completely to form a polymeric compound comprising a discotic mesomorphic (liquid crystal) component as a recurring unit.

In all the liquid crystal cells, a good scattering state was confirmed by eye observation. It seemed that the rod-shaped mesomorphic compound assumed a homogeneous random alignment, but as a result of measurement of light quantity with a photomultiplier, it provided a slight contrast. Accordingly, it was assumed that a uniaxial alignment characteristic was slightly imparted to the rod-shaped mesomorphic compound.

Comparative Example 2

A comparative mesomorphic mixture was prepared by mixing hexylenediarylate (in place of the polymerizable discotic mesomorphic compound A) with a nematic liquid crystal composition ("KN5030", mfd. by Chisso K.K.) (in place of the rod-shaped mesomorphic compound B) in a weight ratio (hexylenediacrylate/KN5030)=50/50.

A comparative polymer matrix-type liquid crystal cell (device) was prepared in the same manner as in Example 4 except that the comparative mesomorphic mixture was injected into the (blank) cell α2.

Each of the thus-prepared seven liquid crystal cells was provided with a black light-absorbing plate at the back thereof and subjected to eye observation under room light (fluorescent lighting) condition with respect to scattered light and reflected light.

As a result, compared with the comparative liquid crystal cell (prepared in Comparative Example 2), other six liquid crystal cells (prepared in Example 4) were found to provide a higher scattering state observable by eyes as a clear difference from that of the comparative liquid crystal cell.

Further, when the comparative liquid crystal cell and liquid crystal cells prepared in Example 4 through the room temperature polymerization of the mesomorphic mixture (4) (in combination with the blank cells α1 and α2) each provided with the black light-absorbing plate were subjected to measurement of reflected light intensity in a direction (at an incident angle of 30 deg. and a reflection angle of 0 deg.) by using an automatic polarizing photometer ("GP-200", mfd. by K.K. Murakami Sikisaigijutsu Kenkyusho).

As result, the liquid crystal cells using the blank cells α1 and α2 showed reflected light intensities which were 3.6 times, and 3.5 times, respectively, that of the comparative liquid crystal cell using the blank cell α2 (prepared in Comparative Example 2).

Further, when the liquid crystal cell using the blank cell α1 (prepared through the room temperature polymerization of the mesomorphic mixture (4)) was supplied with an electric field (40 V, 2 kHz) at 65° C. to place the rod-shaped mesomorphic compound in homeotropic alignment state, it was confirmed that the rod-shaped mesomorphic compound portion provided the darkest state under observation through a polarizing microscope. The resultant reflected light intensity was increased by 23% compared with that under no electric field application. Accordingly, it was formed that the scattered light was optically modulated by the application of the electric field. When the liquid crystal cells using the blank cells α1 polymerized at 40° C. and 50° C. were similarly subjected to the electric field application, similar observation results as in the case of the room temperature polymerization and the reflected light intensities were increased by 17% and 18%, respectively, compared with those under no electric field application.

The texture of the discotic mesomorphic polarized light intensity while assuming a polarizing texture suggested that the disk-shaped discotic mesomorphic compound were oriented substantially in parallel with the substrates. Further, as described above, in either polymerization condition, the reflected light intensity of the rod-shaped mesomorphic compound in the homeotropic alignment state was ca. 20% larger than that in the random homogeneous alignment state. Accordingly, it was found that the polymeric discotic mesomorphic compound was surely aligned substantially in parallel with the substrates.

Further to say as to the reflected light intensity, in the case where the discotic mesomorphic compound is randomly aligned, not uniformly, with respect to the substrates, the reflected light intensity of the rod-shaped mesomorphic compound ought to provide no difference between the homogeneous alignment and the homeotropic alignment in view of its large dependence upon a difference in refractive index in response directions. On the other hand, in the case where the discotic mesomorphic compound is vertically aligned to the substrates, the reflected light intensity of the rod-shaped mesomorphic compound ought to provide results opposite to those described above. Also from this respect, based on the results of Example 4 and Comparative Example 2, the polymeric discotic mesomorphic compound is considered to be substantially aligned in parallel with the substrates. Accordingly, when the rod-shaped mesomorphic compound in placed in the homeotropic alignment state, the discotic mesomorphic compound and the rod-shaped mesomorphic compound provide such a characteristic alignment state that they are co-present in a phase separation state and directors of these compounds are oriented in an identical direction.

EXAMPLE 5

The liquid crystal cell using the blank cell α2 prepared in Example 4 through the room temperature polymerization of the mesomorphic mixture (4) was supplied with an electric field (40 V, 2 kHz) at 65° C. and then the supplied electric field was removed. As a result, even under no electric application, the light scattering state in the electric field application state was retained. Further, it was confirmed that the alignment state was also retained under observation of a polarizing microscope, thus exhibiting a memory characteristic. The alignment state was little changed even at room temperature. When the liquid crystal cell α2 was heated to 80° C. and then restored to room temperature, the alignment state was restored to that before the electric field application. Accordingly, it was found that it was possible to cause a reversible change in alignment state.

EXAMPLE 6

By using the mesomorphic mixture (4) and the blank cell α2 prepared in Example 4, a liquid crystal cell was prepared by effecting polymerization at room temperature similarly as in Example 4.

As a result, an alignment state similar to that in Example 4 including the phase separation state of the discotic mesomorphic compound and the rod-shaped mesomorphic compound.

When the liquid crystal device was supplied with an electric field (40 V, 2 kHz) at 65° C. and cooled to room temperature in the same manner as in Example 4, a reflected light intensity was increased by 28% compared with that before the application of the electric field.

Similarly as in Example 4, in this example, it was possible to realize an alignment state such that the discotic mesomorphic compound and the rod-shaped mesomorphic compound were co-present in a phase separation state and their directors were directed in an identical direction.

EXAMPLE 7

The liquid crystal cell (device) using the blank cell α1 filled with the mesomorphic mixture (4) prepared through the room temperature polymerization in Example 4 was used as liquid crystal devices 303*a*, 303*b* and 303*c* for a projection optical system shown in FIG. 4.

When light from a light source 301 was projected onto a screen through the liquid crystal devices 303*a*, 303*b* and 303*c* under application of an electric field (40 V, 2 kHz) and under no electric field application.

As a result, a luminance on the screen was changed between before and after the electric field application.

(For Third Embodiment)

EXAMPLE 8

A mesomorphic mixture (5) was prepared by mixing a polymerizable discotic mesomorphic compound A shown below with a rod-shaped mesomorphic compound B shown below in a weight ratio A/B=50/50. The respective compounds (or composition) were mixed in an isotropic liquid state.

<Polymerizable Discotic Mesomorphic Compound A>

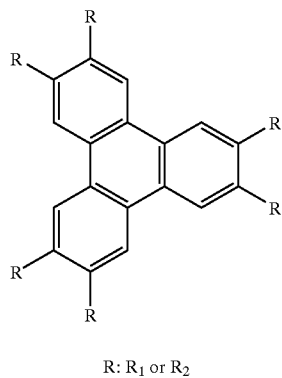

R: $R_1$ or $R_2$

R1: OCOPhO (CH$_2$)$_7$CH$_3$
R2: OCOPhO (CH$_2$)$_{11}$OCOCH=CH$_2$
Ph:

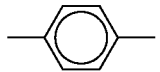

The mesomorphic compound A was a mixture of a1 ($R_1/R_2$=5/1 by mol), a2 ($R_1/R_2$=4/2) and a3 ($R_1/R_2$=3/3) in a weight ratio (a1:a2:a3)=22:59:16.

Phase Transition Temperature (° C.)

<Rod-shaped Mesomorphic Compound B>

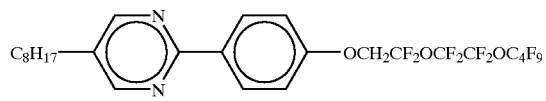

Phase Transition Temperature (° C.)

Black cells AA, AB and B were prepared in the following manner.

<Cell AA>

Two 1.1 mm-thick glass substrates were each coated with ca. 70 nm-thick ITO (indium tin oxide) film as a transparent electrode.

On one of the glass substrates, 0.01 wt. %-dispersion of resinous spacer beads (average particle size=6 μm) in isopropyl alcohol (IPA) was spin-coated for 10 sec. at a speed of 1500 rpm and a dispersion density of 100 (particles)/mm$^2$ and thereon, a thermosetting-type liquid adhesive was coated by printing method. Thereafter, the other glass substrate provided with the ITO film was superposed on the above-treated glass substrate, followed by hot curing in an oven at 150° C. for 90 min. to prepare a (black) cell AA.

<Cell AB>

A cell AB was prepared in the same manner as in Cell AA except that the particle size (6 μm) of the resinous spacer beads was changed to 10 μm.

<Cell B>

Two 1.1 mm-thick glass substrates were each coated with a 2.1 wt. %-solution of a polyamic acid (polyimide precursor) having a recurring unit shown below by spin coating at 500 rpm for 5 sec. (1st coating) and at 1500 rpm for 30 sec. (2nd coating).

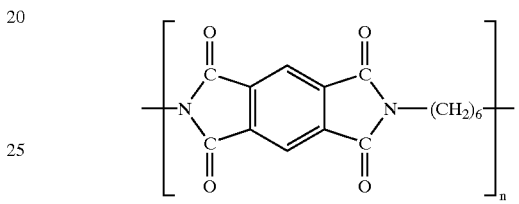

Thereafter, each of the wet coating on the glass substrates was pre-dried at 80° C. for 5 min. and hot baking at 220° C. for 1 hour, followed by rubbing treatment (as uniaxial aligning treatment) with a nylon cloth to form a polyimide alignment control film.

On one of the glass substrates, 0.01 wt. %-dispersion of resinous spacer beads (average particle size=6 μm) in isopropyl alcohol (IPA) was spin-coated for 10 sec. at a speed of 1500 rpm and a dispersion density of 100 (particles)/mm$^2$ and thereon, a thermosetting-type liquid adhesive was coated at the periphery of the substrate by printing method. Thereafter, the other glass substrate provided with the ITO film was superposed on the above-treated glass substrate so that their rubbing axes were directed in parallel and identical to each other, followed by hot curing in an oven at 150° C. for 90 min. to prepare a (black) cell B.

Three liquid crystal devices were prepared based on combinations of the mesomorphic mixture (5) with the (blank) cells AA, AB and B in the following manner.

To the mesomorphic mixture (5), 200 ppm of 2,6-ditertiallybutyl-4-methylphenol and 2 wt. % of a photopolymerization initiator ("Irgacure 184", mfd. by Ciba-Geigy Corp.). Into each of the cells AA, AB and B, each of the mesomorphic mixture (5) was injected at 60° C. under normal pressure and then exposed to ultraviolet (UV) light (ca. 12 mW/cm$^2$, center wavelength=365 nm) for 10 min. to prepare three polymer matrix-type liquid crystal cells (device).

In all the liquid crystal cells, it was confirmed that the resultant rod-shaped mesomorphic compound (liquid crystal) was well phase-separated from the resultant polymer matrix. Further, when each of the liquid crystal cells was observed through a polarizing microscope while heating with a hot stage (mfd. by Metlar Co.), a phase transition from nematic phase to isotropic phase of the rod-shaped mesomorphic compound was confirmed at a temperature substantially identical to the phase transition temperature before mixing with the polymerizable discotic mesomorphic compound A. Further, polarized light due to the discotic liquid crystal phase was observed also at a temperature higher than the phase transition temperature to isotropic phase of the rod-shaped mesomorphic compound B. Thus, the resultant discotic polymer was found to assume a mesomorphism. Further, the slight polarized light due to the discotic mesomorphic compound was still retained at 200° C. Accordingly, it was formed that the polymerizable discotic mesomorphic compound A was polymerized substantially completely to form a polymeric compound comprising a discotic mesomorphic (liquid crystal) component as a recurring unit.

In all the liquid crystal cells, a good scattering state was confirmed by eye observation.

Comparative Example 3

A comparative mesomorphic mixture was prepared by mixing hexylenediarylate (in place of the polymerizable discotic mesomorphic compound A) with a nematic liquid crystal composition ("KN5030", mfd. by Chisso K.K.) (in place of the rod-shaped mesomorphic compound B) in a weight ratio (hexylenediacrylate/KN5030)=50/50.

A comparative polymer matrix-type liquid crystal cell (device) was prepared in the same manner as in Example 4 except that the comparative mesomorphic mixture was injected into the (blank) cell AB.

Each of the thus-prepared four liquid crystal cells was provided with a black light-absorbing plate at the back thereof and subjected to eye observation under room light (fluorescent lighting) condition with respect to scattered light and reflected light.

As a result, compared with the comparative liquid crystal cell (prepared in Comparative Example 3), other three liquid crystal cells (prepared in Example 8) were found to provide a higher scattering state observable by eyes as a clear difference from that of the comparative liquid crystal cell.

Further, when the comparative liquid crystal cell and liquid crystal cells using the mesomorphic mixture (5) (in combination with the blank cells AA, AB and B) each provided with the black light-absorbing plate were subjected to measurement of reflected light intensity in a direction (at an incident angle of 37 deg. and a reflection angle of 0 deg.) by using an automatic polarizing photometer ("GP-200", mfd. by K.K. Murakami Sikisaigijutsu Kenkyusho).

As result, the liquid crystal cells using the blank cells AA, AB and B showed reflected light intensities which were 2.1 times, and 2.2 times, and 1.7 times, respectively, that of the comparative liquid crystal cell (prepared in Comparative Example 3).

Further, when the liquid crystal cell using the blank cell B was supplied with an electric field (40 V, 2 kHz) at 65° C., the resultant reflected light intensity was increased by 23% compared with that under no electric field application. Accordingly, it was formed that the scattered light was optically modulated by the application of the electric field.

EXAMPLE 9

The liquid crystal cell using the blank cell B prepared in Example 8 was supplied with an electric field (40 V, 2 kHz) at 65° C. and then the supplied electric field was removed. As a result, even under no electric application, the light scattering state in the electric field application state was retained. Further, it was confirmed that the alignment state was also retained under observation of a polarizing microscope, thus exhibiting clearly a memory characteristic. The alignment state was little changed even at room temperature. When the liquid crystal cell B was heated to 80° C. and then restored to room temperature, the alignment state was restored to that before the electric field application. Accordingly, it was found that it was possible to cause a reversible change in alignment state.

EXAMPLE 10

The liquid crystal cell (device) using the blank cell B filled with the mesomorphic mixture (5) prepared in Example 8 was used as liquid crystal devices 303a, 303b and 303c for a projection optical system shown in FIG. 4.

When light from a light source 301 was projected onto a screen through the liquid crystal devices 303a, 303b and 303c under application of an electric field (40 V, 2 kHz) and under no electric field application.

As a result, a luminance on the screen was changed between before and after the electric field application.

(For Fourth Embodiment)

EXAMPLE 11

A mesomorphic mixture (6) was prepared by mixing a discotic mesomorphic compound A1 shown below with a rod-shaped mesomorphic compound B1 shown below in a weight ratio A1/B1=50/50, in a solvent of THF (tetrahydrofuran), followed by distilling-off of the solvent TFT.

<Discotic Mesomorphic Compound A1>

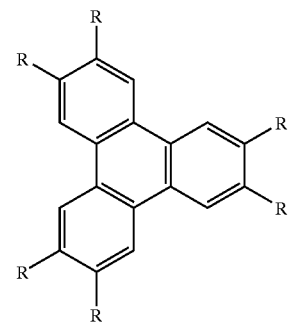

R: —OC(CH$_2$)$_5$CH$_3$

Phase Transition Temperature (° C.)

Cry. $\xrightarrow{67.3}$ Dh $\xrightarrow{96.9}$ Iso.

Dh: discotic hexagonal phase

<Rod-shaped Mesomorphic Compound B1>

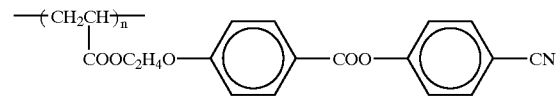

Phase transition temperature (° C.)

Cry. $\xrightarrow{75}$ N $\xrightarrow{110}$ Iso.

Weight-average molecular weight: 18,000

Liquid crystal devices (cells) a, b, c and d were prepared in the following manner.

<Device a>

A device a was prepared by cast-coating a 10 wt. %-solution of the mesomorphic mixture (6) in TFT on a 1.1 mm-thick glass substrate, followed by hot-drying at 130° C. in an oven to form a 5 μm-thick liquid crystal composition layer.

<Device b>

A device b was prepared in the same manner as in Device a except that the glass substrate was changed to a 200 mm-thick film of polyether sulfone.

<Device c>

A device c was prepared as follows.

A 1.1 mm-thick glass substrates was coated with a 2.1 wt. %-solution of a polyamic acid (polyimide precursor) having a recurring unit shown below by spin coating at 500 rpm for 5 sec. (1st coating) and at 1500 rpm for 30 sec. (2nd coating).

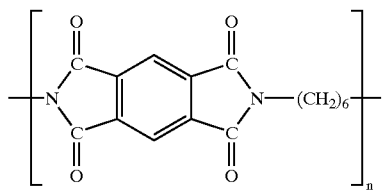

Thereafter, the wet coating on the glass substrates was pre-dried at 80° C. for 5 min. and hot baking at 220° C. for 1 hour, followed by rubbing treatment (as uniaxial aligning treatment) with a nylon cloth to form a polyimide alignment control film.

On the polyimide alignment control film, a 5 μm-thick liquid crystal composition layer was formed similarly as in Device a (by using the liquid crystal composition (6)).

<Device d> (As Comparative Device)

A (comparative) device d was prepared as follows.

A mesomorphic mixture was prepared by mixing hexylenediacrylate and nematic liquid crystal ("KN5030", mfd. by Chisso K.K.).

The mesomorphic mixture was injected together with 2 wt. % of a photopolymerization initiator ("Irgacure 184", mfd. by Ciba-Geigy Corp.) into a blank cell comprising a pair of glass substrates disposed opposite to each other with a spacing (cell gap) of 5 μm, followed by UV light irradiation to prepare a conventional polymer-dispersed type liquid crystal device.

The thus-prepared liquid crystal devices (Devices a, b, c and d) were subjected to measurement of reflected light intensity (light-scattering intensity) in a direction (at an incident angle of 37 degrees and a reflection angle of 37 degrees) by using an automatic polarizing photometer ("GP-200", mfd. by K.K. Murakami Sikisaigijutsu Kenkyusho). The measurement for Device c was performed by setting the ribbing axis so as to be perpendicular to the light incidence direction.

As a result, compared with the light scattering (reflected light) intensity of the (comparative) Device d, Devices a, b and c provided light intensities which were 74%, 68% and 70%, respectively, larger than that of Device d.

EXAMPLE 12

A device e was prepared and evaluated in the same manner as in Device c prepared in Example 11 except that the mesomorphic mixture (6) was changed to a mesomorphic mixture (7) prepared in the following manner.

The mesomorphic mixture (7) was prepared by mixing a discotic mesomorphic compound A2 shown below with a rod-shaped mesomorphic compound B2 shown below in a weight ratio A2/B2=50/50, in a solvent of THF (tetrahydrofuran), followed by distilling-off of the solvent TFT.

<Discotic Mesomorphic Compound A2>

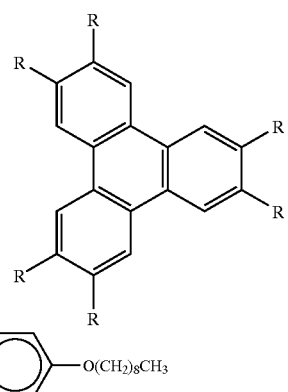

R: —OCO—⌬—O(CH$_2$)$_8$CH$_3$

Phase Transition Temperature (° C.)

Cry. $\xrightarrow{113}$ Dx $\xrightarrow{148}$ Dr $\xrightarrow{179}$ Nd $\xrightarrow{183}$ Iso.

Dx: un-identified discotic phase

<Rod-shaped Mesomorphic Compound B2>

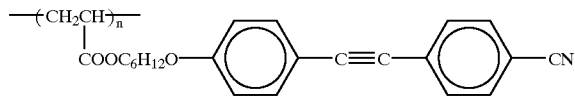

Phase Transition Temperature (° C.)

Cry. $\xrightarrow{34}$ N $\xrightarrow{136}$ Iso.

Weight-average molecular weight: 13,500

As a result, Device e showed 98% larger light scattering intensity than that of Device d (comparative).

When the above measurement was performed under such a condition that the rubbing axis was set to be perpendicular to that in the above measurement (i.e., set to be parallel to the light incidence direction, the resultant light scattering intensity was 110% larger than that of Device d. Accordingly, it was confirmed that the light scattering intensity had an angle-dependent characteristic.

EXAMPLE 13

Device b prepared in Example 11 was subjected to image writing using a thermal head. As a result, the written region was made transparent compared with other regions.

Accordingly, it was found that Device b was advantageous for a display medium.

The above phenomenon may be attributable to suppression of liquid crystal phase formation due to a heat treatment cycle of heating and rapid cooling in the written region.

EXAMPLE 14

A device f was prepared and evaluated in the same manner as in Device d prepared in Example 11 except that the mesomorphic mixture (6) was changed to a mesomorphic mixture (8) prepared in the following manner.

The mesomorphic mixture (8) was prepared by mixing a discotic mesomorphic compound A2 shown below with a polymerizable rod-shaped mesomorphic compound B3 shown below in a weight ratio A2/B3=50/50.

73

<Discotic Mesomorphic Compound A2>

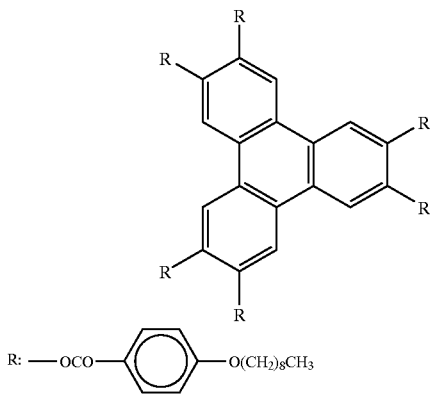

R: —OCO—⟨Ph⟩—O(CH$_2$)$_8$CH$_3$

Phase Transition Temperature (° C.)

Cry. $\xrightarrow{113}$ Dx $\xrightarrow{148}$ Dr $\xrightarrow{179}$ Nd $\xrightarrow{183}$ Iso.

Dx: un-identified discotic phase

<Polymerizable Rod-shaped Mesomorphic Compound B3>

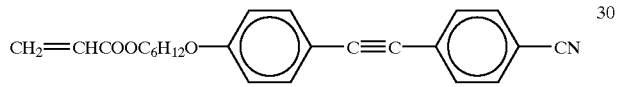

CH$_2$=CHCOOC$_6$H$_{12}$O—⟨Ph⟩—C≡C—⟨Ph⟩—CN

As a result, Device f showed 102% larger light scattering intensity than that of Device d (comparative).

As described above, the liquid crystal composition (mesomorphic mixture) according to the present invention is excellent in light-scattering performance, thus allowing image writing through heat treatment or light irradiation. The liquid crystal composition can retain the light scattering state even in a state where an external field is not applied, thus being applicable to various display mediums. Further, according to the liquid crystal device using the liquid crystal composition of the present invention, it is possible to provide a display device or apparatus realizing a high contrast and reduction of electric power consumption (which is required only at the time of rewriting operation).

(For Fifth Embodiment)

EXAMPLE 15

A mesomorphic mixture (9) was prepared by mixing a polymerizable discotic mesomorphic compound A shown below with a rod-shaped mesomorphic compound B (nematic liquid crystal composition) shown below in a weight ratio A/B=50/50, and a mesomorphic mixture (10) was prepared by mixing the polymerizable discotic mesomorphic compound A with the rod-shaped mesomorphic compound B in a weight ratio A/B=55/45. The respective compounds (or composition) were mixed in an isotropic liquid state.

74

<Polymerizable Discotic Mesomorphic Compound A>

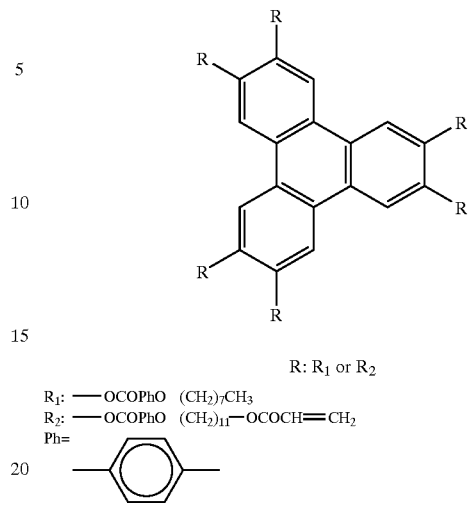

R: R$_1$ or R$_2$
R$_1$: —OCOPhO (CH$_2$)$_7$CH$_3$
R$_2$: —OCOPhO (CH$_2$)$_{11}$—OCOCH=CH$_2$
Ph= —⟨Ph⟩—

The mesomorphic compound A was a mixture of a1 (R$_1$/R$_2$=5/1 by mol), a2 (R$_1$/R$_2$=4/2) and a3 (R$_1$/R$_2$=3/3) in a weight ratio (a1:a2:a3)=22:59:16.

Phase Transition Temperature (° C.)

Dr $\xrightarrow{131}$ Nd $\xrightarrow{200}$ Iso.

Dr: discotic rectangular phase,
Nd: nematic discotic phase.

<Rod-shaped Mesomorphic Compound B>

Fluorine-containing nematic liquid crystal composition ("KN-5030", mfd. by Chisso K.K.)

Phase Transition Temperature (° C.)

Cry. $\xrightarrow{<-30}$ N $\xrightarrow{80}$ Iso.

Δn (refractive index anisotropy)=0.13
Δ∈ (dielectric anisotropy)=+10

Three blank cells α1 and three blank cells α2 were each prepared in the following manner.

Two 1.1 mm-thick glass substrates were each coated with ca. 70 nm-thick ITO film (transparent electrode) and further coated with a 2.1 wt. %-solution of a polyamic acid (polyimide precursor) having a recurring unit shown below by spin coating at 500 rpm for 5 sec. (1st coating) and at 1500 rpm for 30 sec. (2nd coating).

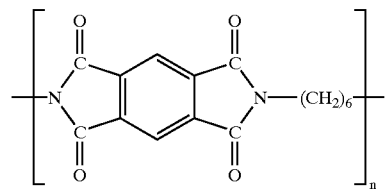

Thereafter, each of the wet coating on the glass substrates was pre-dried at 80° C. for 5 min. and hot baking at 220° C. for 1 hour, followed by rubbing treatment (as uniaxial aligning treatment) or no rubbing treatment to form a rubbed or non-rubbed polyimide alignment control film.

On one of the glass substrates, 0.01 wt. %-dispersion of resinous spacer beads (average particle size=10 μm) in IPA was spin-coated for 10 sec. at a speed of 1500 rpm and a dispersion density of 100 (particles)/mm$^2$ and thereon, a thermosetting-type liquid adhesive was coated by printing method. Thereafter, the other glass substrate provided with the ITO film was superposed on the above-treated glass substrate so that their ribbing axes were directed in parallel and identical to each other (in the case of using the rubbed polyimide films), followed by hot curing in an oven at 150° C. for 90 min. to prepare four blank cells including two rubbing-treated cells α1 and two cells α2 which had not been subjected to rubbing treatment.

Four liquid crystal devices were prepared based on combinations of the mesomorphic mixtures (9) and (10) with the (blank) cells α1 and α2 in the following manner.

To each of the mesomorphic mixtures (9) and (10), 200 ppm of 2,6-ditertiallybutyl-4-methylphenol and 2 wt. % of a photopolymerization initiator ("Irgacure 184", mfd. by Ciba-Geigy Corp.). Into each of the cells α1 and α2, each of the mesomorphic mixtures (9) and (10) was injected at isotropic phase temperature, under normal pressure and after cooled to −40° C. exposed to ultraviolet (UV) light (ca. 12 mW/cm$^2$, center wavelength=365 nm) for 10 min. to prepare a polymer matrix-type liquid crystal cell (device). During the above cooling step, it was confirmed that the nematic liquid crystal was phase-separated from the liquid crystal composition at 19° C.

In all the liquid crystal cells, it was confirmed that the resultant rod-shaped mesomorphic compound (liquid crystal) was well phase-separated from the resultant polymer matrix. Further, when each of the liquid crystal cells was observed through a polarizing microscope while heating with a hot stage (mfd. by Metlar Co.), a phase transition from nematic A phase to isotropic phase of the rod-shaped mesomorphic compound was confirmed at a temperature substantially identical to the phase transition temperature before mixing with the polymerizable discotic mesomorphic compound A. Further, slight polarized light due to the discotic liquid crystal phase was observed also at a temperature higher than the phase transition temperature to isotropic phase of the rod-shaped mesomorphic compound B. Thus, the resultant discotic polymer was found to assume a mesomorphism. The polarized light intensity was considerably decreased when compared with a state such that the rod-shaped mesomorphic compound was placed in a mesomorphic phase. Further, the slight polarized light due to the discotic mesomorphic compound was still retained at 200° C. Accordingly, it was formed that the polymerizable discotic mesomorphic compound A was polymerized substantially completely to form a polymeric compound comprising a discotic mesomorphic (liquid crystal) component as a recurring unit.

In all the liquid crystal cells, a good scattering state was confirmed by eye observation.

In both the liquid crystal cells using the rubbed blank cells α2, the uniaxial alignment characteristic along the rubbing direction was confirmed when light-quantity measurement through a photomultiplier was performed.

When the device using the mesomorphic mixture (9) in combination with the blank cell α2 was supplied with an alternating electric field (30 V, 1 kHz) to place the rod-shaped mesomorphic compound in a homeotropic alignment state, a degree of light scattering was clearly increased compared with that before the electric field application.

When the electric field application was terminated, the degree of light scattering was restored to the ordinal level (before the application of the electric field).

When the application and removal of the electric field were successively repeated, the above optical modulation state was repetitively observed with a good reproducibility.

Similar behaviors described above were also observed with respect to other devices (combinations of the composition (10) and the cell α2, the composition (10) and the cell α1, and the composition (9) and the cell α1).

The texture of the discotic mesomorphic compound which was a state providing a slight polarized light intensity while assuming a polarizing texture suggested that the disk-shaped discotic mesomorphic compound were oriented substantially in parallel with the substrates. Further, as described above, in either polymerization condition, the reflected light intensity of the rod-shaped mesomorphic compound in the homeotropic alignment state was confirmed to be ca. 20% larger than that in the random homogeneous alignment state. Accordingly, it was found that the polymeric discotic mesomorphic compound was surely aligned substantially in parallel with the substrates.

Further to say as to the reflected light intensity, in the case where the discotic mesomorphic compound is randomly aligned, not uniformly, with respect to the substrates, the reflected light intensity of the rod-shaped mesomorphic compound ought to provide no difference between the homogeneous alignment and the homeotropic alignment in view of its large dependence upon a difference in refractive index in response directions. On the other hand, in the case where the discotic mesomorphic compound is vertically aligned to the substrates, the reflected light intensity of the rod-shaped mesomorphic compound ought to provide results opposite to those described above. Also from this respect, based on the above results, the polymeric discotic mesomorphic compound is considered to be substantially aligned in parallel with the substrates. Accordingly, when the rod-shaped mesomorphic compound in placed in the homeotropic alignment state, the discotic mesomorphic compound and the rod-shaped mesomorphic compound provide such a characteristic alignment state that they are co-present in a phase separation state and directors of these compounds are oriented in an identical direction.

Comparative Example 4

A comparative mesomorphic mixture was prepared by mixing hexylenediarylate (in place of the polymerizable discotic mesomorphic compound A) with a nematic liquid crystal composition ("KN5030", mfd. by Chisso K.K.) B in a weight ratio (hexylenediacrylate/KN5030)=50/50.

A comparative polymer matrix-type liquid crystal cell (device) was prepared in the same manner as in Example 15 except that the comparative mesomorphic mixture was injected into the (blank) cell α1.

The thus-prepared liquid crystal cell was provided with a black light-absorbing plate at the back thereof and subjected to measurement of reflected light intensity in a direction (at an incident angle of 30 deg. and a reflection angle of 0 deg.) by using an automatic polarizing photometer ("GP-200", mfd. by K.K. Murakami Sikisaigijutsu Kenkyusho) under application of the electric field (30 V, 1 kHz).

As result, the liquid crystal cells using the blank cell α1 and the compositions (9) and (10) showed reflected light intensities which were 3.1 times, and 3.3 times, respectively, that of the comparative liquid crystal cell using the blank cell α1 (prepared in Comparative Example 4).

EXAMPLE 16

The liquid crystal cell (device) using the blank cell al filled with the mesomorphic mixture (9) prepared through the room temperature polymerization in Example 15 was used as liquid crystal devices 303a, 303b and 303c for a projection optical system shown in FIG. 4.

When light from a light source 301 was projected onto a screen through the liquid crystal devices 303*a*, 303*b* and 303*c* under application of an electric field (40 V, 2 kHz) and under no electric field application.

As a result, a luminance on the screen was changed between before and after the electric field application.

Comparative Example 5

A comparative mesomorphic mixture was prepared by mixing a low-molecular weight discotic mesomorphic compound D shown below with a rod-shaped mesomorphic compound B (low-molecular weight nematic liquid crystal composition) shown below in a weight ratio D/B=50/50.
<Low-molecular Weight Discotic Mesomorphic Compound D>

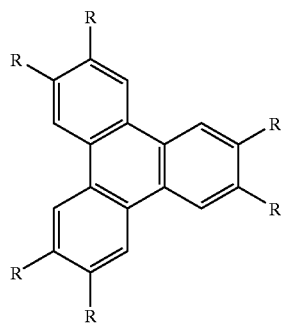

R: —O(CH$_2$)$_6$CH$_3$
<Low-molecular Weight Rod-shaped Mesomorphic Compound B>
Fluorine-containing nematic liquid crystal composition ("KN-5030", mfd. by Chisso K.K.)
Phase Transition Temperature (° C.)

$$\text{Cry.} \xrightarrow{<-30} \text{N} \xrightarrow{80} \text{Iso.}$$

Δ∈(dielectric anisotropy)=+10
A blank cell was prepared in the following manner.

On one of two 1.1 mm-thick glass substrates, a ca. 70 nm-thick ITO film (transparent electrode) was formed.

On one of the glass substrates, 0.01 wt. %-dispersion of resinous spacer beads (average particle size=10 μm) in IPA was spin-coated for 10 sec. at a speed of 1500 rpm and a dispersion density of 100 (particles)/mm$^2$ and thereon, a thermosetting-type liquid adhesive was coated by printing method. Thereafter, the other glass substrate provided with the ITO film was superposed on the above-treated glass substrate, followed by hot curing in an oven at 150° C. for 90 min. to prepare a blank cell.

Into the thus-prepared blank cell, the above-prepared comparative mesomorphic mixture was injected to form a liquid crystal device.

In the thus-formed liquid crystal device, both of nematic phase and discotic phase were not confirmed, and the low-molecular weight discotic mesomorphic compound D and the low-molecular weight nematic mesomorphic compound B were not phase-separated. In other words, the comparative mesomorphic mixture assumed a transparent isotropic (uniform) liquid state at room temperature, thus failing to provide a light-scatteringmedium.

As described hereinabove, according to the present invention, it is possible to realize a liquid crystal device, optical modulation device, and display device, of a high brightness and a high performance, compared with a conventional polymer-dispersed or polymer network type liquid crystal device. According to the present invention, it is also possible to provide a liquid crystal apparatus using the liquid crystal device with a high brightness and high performance.

What is claimed is:

1. A liquid crystal device, having a liquid crystal layer of a liquid crystal composition comprising a discotic mesomorphic compound and a rod-shaped mesomorphic compound, wherein the discotic mesomorphic compound and the rod-shaped mesomorphic compound are co-present in the liquid crystal layer in a mutual phase separation state.

2. A device according to claim 1, wherein the discotic mesomorphic compound is a polymeric discotic mesomorphic compound having a recurring unit comprising a discotic mesomorphic molecular unit.

3. A device according to claim 2, wherein the polymeric discotic mesomorphic compound comprises a polymer matrix, whereby the device is a polymer matrix-type device.

4. A device according to claim 3, wherein the polymer matrix comprises at least 50 wt. % of the polymeric discotic mesomorphic compound.

5. A device according to any one of claims 1–4, wherein the rod-shaped mesomorphic compound comprises a nematic liquid crystal.

6. A device according to claim 5, wherein the rod-shaped mesomorphic compound has a positive or negative dielectric anisotropy.

7. A device according to claim 6, wherein the liquid crystal layer is disposed between a pair of substrates.

8. A device according to claim 7, wherein at least one of the substrates is subjected to alignment treatment.

9. A device according to claim 8, wherein the alignment treatment is uniaxial alignment treatment.

10. A device according to claim 9, wherein at least one of the substrates is provided with an electrode which supplies an electrical signal so as to modulate a scattering state of an incident light entering the device.

11. A device according to any one of claims 1–4, wherein a reflected light from the device is adopted to a display signal.

12. A device according to claim 11, wherein the device further comprises a light-absorbing plate at the back thereof.

13. A device according to claim 7, wherein at least one of the substrates is provided with a plurality of active elements.

14. A device according to claim 1, wherein a director of the discotic mesomorphic compound and a director of the rod-shaped mesomorphic compound are directed in an identical direction.

15. A device according to claim 14, wherein both of the directors of the discotic and rod-shaped mesomorphic compounds are directed perpendicular to a surface plane of the liquid crystal layer.

16. A device according to claim 14, wherein the discotic mesomorphic compound is a polymeric compound.

17. A device according to claim 14, wherein the device is of a polymer-dispersed liquid crystal type or a polymer network-type.

18. A device according to claim 17, wherein the polymer network comprises at least 50 wt. % of the polymeric discotic mesomorphic compound.

19. A device according to claim 14, wherein the rod-shaped mesomorphic compound has a positive or negative dielectric anisotropy.

20. A device according to claim 14, the liquid crystal layer is disposed between a pair of substrates.

21. A device according to claim 20, wherein at least one of the substrates is subjected to alignment treatment.

22. A device according to claim 20, wherein at least one of the substrates is provided with an electrode which supplies an electrical signal so as to modulate a scattering state of a light passing through the liquid crystal layer.

23. A device according to claim 20, wherein a reflected light from the device is adopted to a display signal.

24. A device according to claim 23, wherein the device further comprises a light-absorbing plate at the back thereof.

25. A device according to claim 20, wherein the device is of a projection-type.

26. A device according to claim 1, wherein the rod-shaped mesomorphic compound has a memory characteristic.

27. A device according to claim 26, wherein the rod-shaped mesomorphic compound has a positive or negative dielectric anisotropy.

28. A device according to claim 26, wherein the device is of a polymer-dispersed type or a polymer network-type wherein the discotic mesomorphic compound comprises a polymeric compound having a recurring unit comprising at least one species of a discotic mesomorphic molecular unit in a polymer network.

29. A device according to claim 28, wherein the polymer network comprises at least 50 wt. % of the polymeric discotic mesomorphic compound.

30. A device according to claim 26, the liquid crystal layer is disposed between a pair of substrates.

31. A device according to claim 30, wherein at least one of the substrates is subjected to alignment treatment.

32. A device according to claim 30, wherein at least one of the substrates is provided with an electrode which supplies an electrical signal so as to modulate a scattering state of a light passing through the liquid crystal layer.

33. A device according to claim 30, wherein a reflected light from the device is adopted to a display signal.

34. A device according to claim 33, wherein the device further comprises a light-absorbing plate at the back thereof.

35. A device according to claim 30, wherein the device is of a projection-type.

36. A device according to claim 1, wherein the rod-shaped mesomorphic compound is a polymeric compound.

37. A device according to claim 36, wherein the device further comprises at least one substrate contacting the liquid crystal layer.

38. A device according to claim 37, wherein a light issued from a side of the liquid crystal layer is reflected to effect display.

39. A device according to claim 37, wherein said substrate comprises a plastic substrate.

40. A device according to claim 37, wherein said substrate contacting the liquid crystal layer is subjected to alignment treatment at its surface.

41. A device according to claim 37, wherein the liquid crystal layer is a light-scattering layer adopted to change a light scattering state in the liquid crystal layer by heat treatment or light irradiation.

42. A device according to claim 41, wherein the light scattering state is maintained in a static state of no application of an external field.

43. A device according to claim 1, wherein the discotic mesomorphic compound comprises a nematic liquid crystal.

44. A device according to claim 43, wherein the discotic mesomorphic compound is a polymeric compound.

45. A device according to claim 43, wherein the device is of a polymer-dispersed liquid crystal type or a polymer network-type.

46. A device according to claim 45, wherein the polymer network comprises at least 50 wt. % of the polymeric discotic mesomorphic compound.

47. A device according to claim 43, wherein the rod-shaped mesomorphic compound has a positive or negative dielectric anisotropy.

48. A device according to claim 43, the liquid crystal layer is disposed between a pair of substrates.

49. A device according to claim 48, wherein at least one of the substrates is subjected to alignment treatment.

50. A device according to claim 48, wherein at least one of the substrates is provided with an electrode which supplies an electrical signal so as to modulate a scattering state of a light passing through the liquid crystal layer.

51. A device according to claim 48, wherein a reflected light from the device is adopted to a display signal.

52. A device according to claim 51, wherein the device further comprises a light-absorbing plate at the back thereof.

53. A device according to claim 48, wherein the device is of a projection-type.

54. A liquid crystal apparatus, comprising:
   a liquid crystal device according to any one of claims 1, 14, 26, 36 and 43, and
   drive means for driving the liquid crystal device.

55. An apparatus according to claim 54, further comprising a projection optical system including the liquid crystal device.

56. A device according to any one of claims 1–4, wherein the rod-shaped mesomorphic compound has a positive or negative dielectric anisotropy.

57. A device according to any one of claims 1–4, wherein the liquid crystal layer is disposed between a pair of substrates.

58. A device according to claim 5, wherein the liquid crystal layer is disposed between a pair of substrates.

59. A device according to claim 57, wherein at least one of the substrates is subjected to alignment treatment.

60. A device according to claim 58, wherein at least one of the substrates is subjected to alignment treatment.

61. A device according to claim 7, wherein at least one of the substrates is provided with an electrode which supplies an electrical signal so as to modulate a scattering state of an incident light entering the device.

62. A device according to claim 57, wherein at least one of the substrates is provided with an electrode which supplies an electrical signal so as to modulate a scattering state of an incident light entering the device.

63. A device according to claim 58, wherein at least one of the substrates is provided with an electrode which supplies an electrical signal so as to modulate a scattering state of an incident light entering the device.

64. A device according to claim 8, wherein at least one of the substrates is provided with an electrode which supplies an electrical signal so as to modulate a scattering state of an incident light entering the device.

65. A device according to claim 59, wherein at least one of the substrates is provided with an electrode which supplies an electrical signal so as to modulate a scattering state of an incident light entering the device.

66. A device according to claim 60, wherein at least one of the substrates is provided with an electrode which supplies an electrical signal so as to modulate a scattering state of an incident light entering the device.

67. A device according to claim 57, wherein at least one of the substrates is provided with a plurality of active elements.

68. A device according to claim 58, wherein at least one of the substrates is provided with a plurality of active elements.

* * * * *

UNITED STATES PATENT AND TRADEMARK OFFICE
CERTIFICATE OF CORRECTION

PATENT NO. : 6,497,928 B1
DATED : December 24, 2002
INVENTOR(S) : Koichi Sato et al.

It is certified that error appears in the above-identified patent and that said Letters Patent is hereby corrected as shown below:

Column 2,
Line 45, "optical," should read -- optical --;
Line 46, "extures" should read -- states --;
Line 47, "is" should read -- are --; and
Line 53, "determie" should read -- determine --.

Column 3,
Line 54, "to" should read -- to the --.

Column 4,
Line 18, "high" should read -- highly --.

Column 5,
Line 63, "shown" should read -- are shown --.

Column 12,
Line 54, "view" should read -- view, --.

Column 15,
Line 4, "a a" should read -- as a --.

Column 19,
Line 65, should read

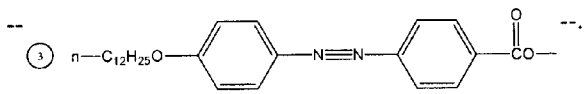

Column 29,
Line 4, "f" should read -- of --; and
Line 50, "used" should read -- used as --.

UNITED STATES PATENT AND TRADEMARK OFFICE
CERTIFICATE OF CORRECTION

PATENT NO. : 6,497,928 B1
DATED : December 24, 2002
INVENTOR(S) : Koichi Sato et al.

It is certified that error appears in the above-identified patent and that said Letters Patent is hereby corrected as shown below:

Column 32,
Line 35, "an" should read -- and --.

Column 36,
Line 4, "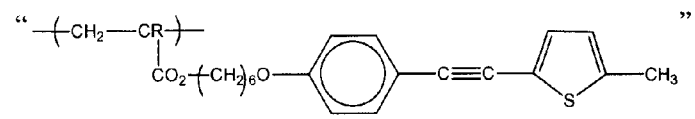"

should read

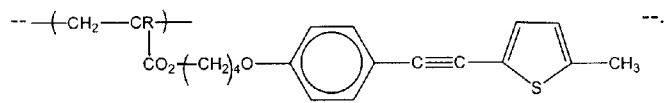

Column 38,
Line 2, "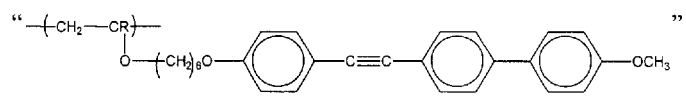"

should read

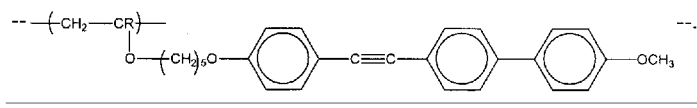

Column 41,
Line 2, "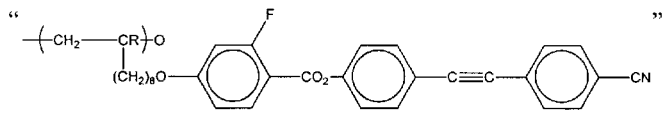"

should read

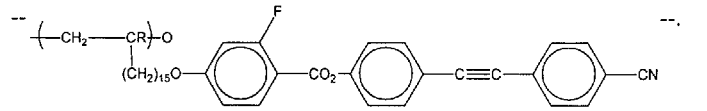

UNITED STATES PATENT AND TRADEMARK OFFICE
CERTIFICATE OF CORRECTION

PATENT NO. : 6,497,928 B1
DATED : December 24, 2002
INVENTOR(S) : Koichi Sato et al.

It is certified that error appears in the above-identified patent and that said Letters Patent is hereby corrected as shown below:

Column 49,
Line 4, should read

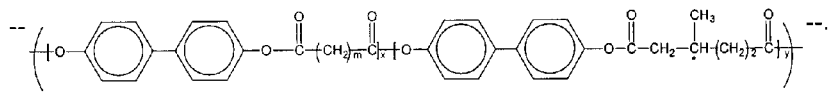

Column 55,
Line 18, "performance,i.e.," should read -- performance, i.e., --.

Column 58,
Line 36, "film" should read -- film from --.

Column 59,
Line 6, "f" should read -- of --.

Column 66,
Line 21, "in" (first occurrence) should read -- is --.

Column 76,
Line 32, "in" (first occurrence) should read -- is --; and
Line 63, "a1" should read -- $\alpha$1 --.

Column 77,
Line 64, "light-scatteringmedium." should read -- light-scattering medium. --.

Column 78,
Line 64, "claim 14," should read -- claim 14, wherein --.

UNITED STATES PATENT AND TRADEMARK OFFICE
CERTIFICATE OF CORRECTION

PATENT NO. : 6,497,928 B1
DATED : December 24, 2002
INVENTOR(S) : Koichi Sato et al.

It is certified that error appears in the above-identified patent and that said Letters Patent is Column 79,
Line 24, "claim 26," should read -- claim 26, wherein --.

Column 80,
Line 4, "claim 43," should read -- claim 43, wherein --; and
Line 19, "and 43," should read -- 43; --.

Signed and Sealed this

Thirtieth Day of March, 2004

JON W. DUDAS
*Acting Director of the United States Patent and Trademark Office*